United States Patent
Weber

(10) Patent No.: US 12,277,193 B1
(45) Date of Patent: Apr. 15, 2025

(54) SYNTHESIZING TRAINING DATA FOR TRAINING A CHANGE DETECTION MODEL

(71) Applicant: EarthDaily Analytics USA, Inc., Maple Grove, MN (US)

(72) Inventor: Manuel Weber, San Francisco, CA (US)

(73) Assignee: EarthDaily Analytics USA, Inc., Maple Grove, MN (US)

( * ) Notice: Subject to any disclaimer, the term of this patent is extended or adjusted under 35 U.S.C. 154(b) by 445 days.

(21) Appl. No.: 17/412,602

(22) Filed: Aug. 26, 2021

Related U.S. Application Data

(60) Provisional application No. 63/071,963, filed on Aug. 28, 2020.

(51) Int. Cl.
  *G06F 18/214* (2023.01)
  *G06N 3/045* (2023.01)
  *G06N 3/088* (2023.01)
  *G06T 7/00* (2017.01)
  *G06V 20/13* (2022.01)

(52) U.S. Cl.
  CPC ........... *G06F 18/214* (2023.01); *G06N 3/045* (2023.01); *G06N 3/088* (2013.01); *G06T 7/97* (2017.01); *G06V 20/13* (2022.01); *G06T 2207/10032* (2013.01)

(58) Field of Classification Search
  CPC ..... G06F 18/214; G06T 7/97; G06T 2207/10032; G06V 20/13; G06N 3/045; G06N 3/088
  See application file for complete search history.

(56) References Cited

U.S. PATENT DOCUMENTS

| | | | |
|---|---|---|---|
| 2015/0310306 A1* | 10/2015 | Song ................... | G06V 10/75 382/159 |
| 2018/0025257 A1* | 1/2018 | van den Oord ..... | G06F 18/2113 375/240.14 |
| 2018/0204111 A1* | 7/2018 | Zadeh .................. | G06V 10/764 |
| 2018/0330198 A1* | 11/2018 | Harary ................ | G06V 10/44 |
| 2019/0034754 A1* | 1/2019 | Aschenbeck .......... | G06F 18/24 |
| 2020/0184278 A1* | 6/2020 | Zadeh ................... | G06N 3/044 |

OTHER PUBLICATIONS

Shaham et al. SinGAN: Learning a Generative Model from a Single Natural Image. Sep. 4, 2019.

* cited by examiner

*Primary Examiner* — Chan S Park
*Assistant Examiner* — D J Dhooge
(74) *Attorney, Agent, or Firm* — Scale LLP

(57) ABSTRACT

Synthesizing training data for training a change detection model includes receiving a patched image comprising a background image with a patch pasted into the background image. It further includes synthesizing a harmonized patched image at least in part by harmonizing the patched image using a machine learning model trained on the background image. It further includes providing as output a synthetic training sample usable to train a change detection model. The synthetic training sample includes a reference image, at least a portion of the harmonized patched image, and a corresponding mask.

17 Claims, 43 Drawing Sheets

Obtain list of images to download

Optional [
    filter list of images [
        obtain metadata for images
        apply filter to select images of a given type or in a given region
            or for a given period of time
        ]
    ]

Download data
For each image in list:
    Check if we have already retrieved image
    If not [
      Download image
      copy image to long-term cloud storage
      if download or copy fails:
        retry until success
    ]

FIG. 6

Pre-process data
For each new image in cloud storage:
    Tile image
    Optional [ interpolate / reproject / convert to reflectance ]
    Copy processed image tiles to cloud storage
    if anything fails:
        retry until success
    Put metadata entry in key/value store for each image tile
]

FIG. 7

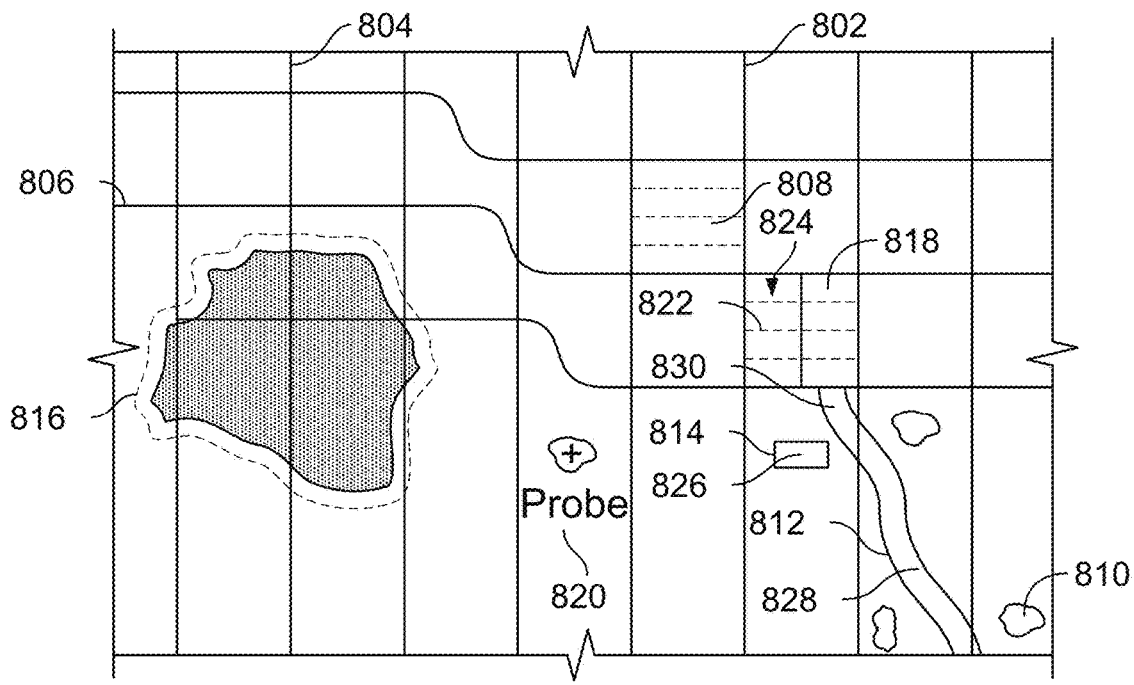
FIG. 8A
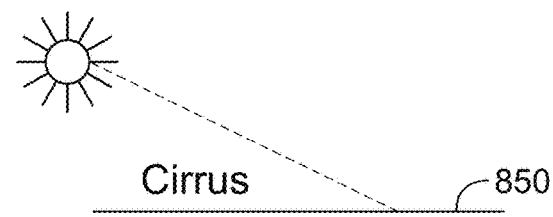
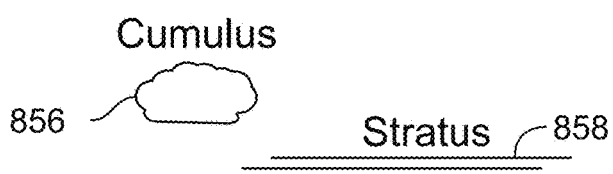
FIG. 8B
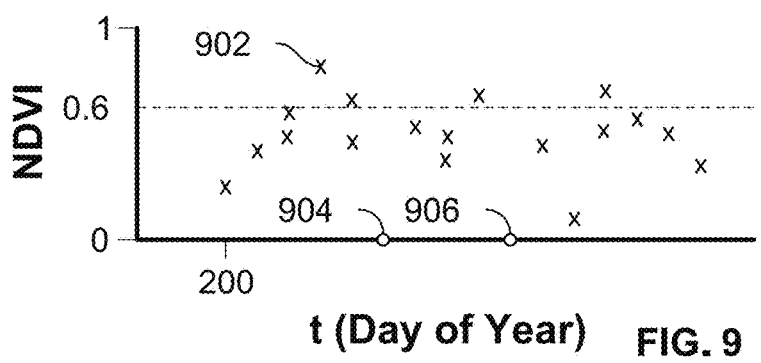
FIG. 9

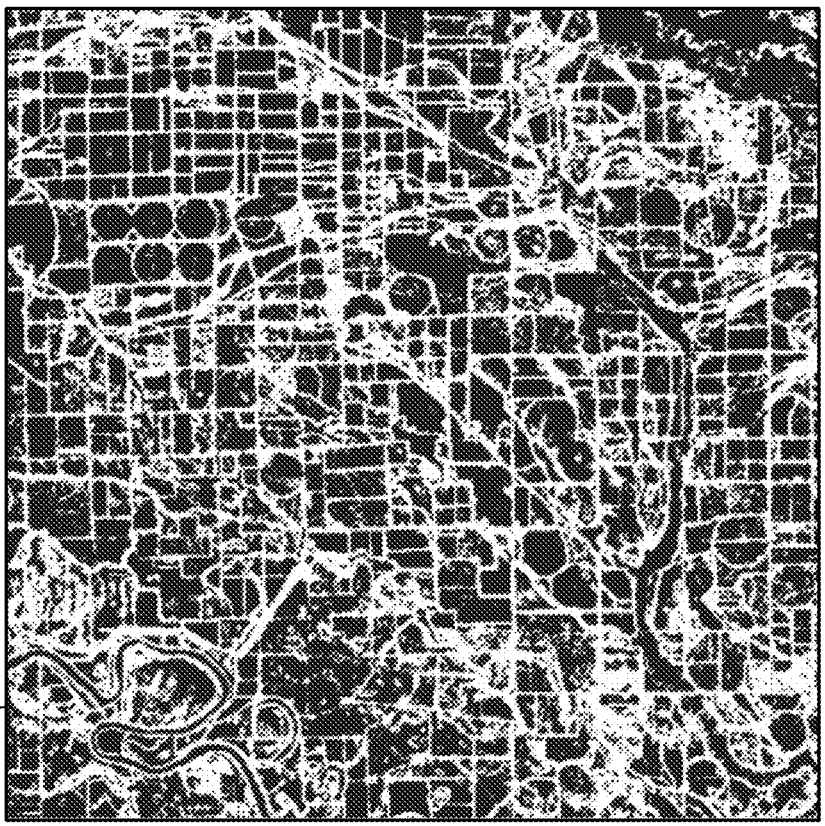
FIG. 14

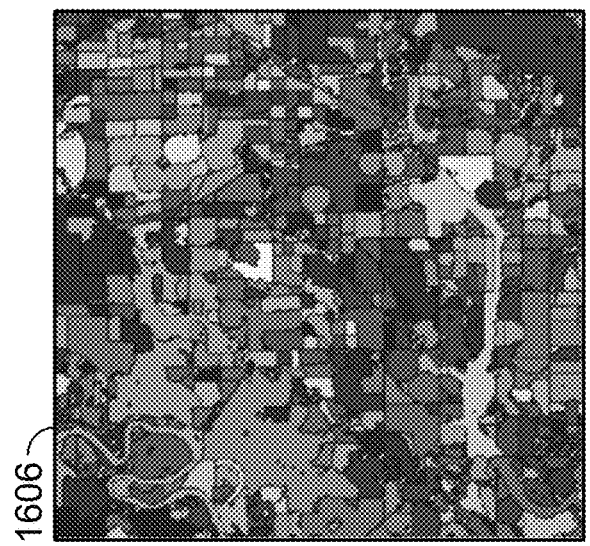
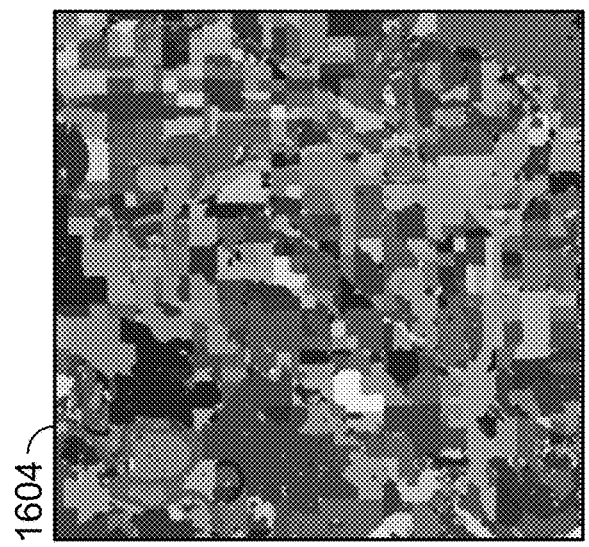
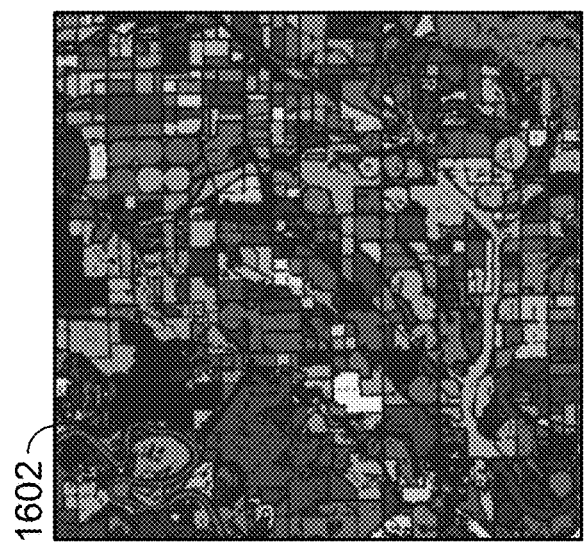
FIG. 16

2230

2200

2450 →

2500

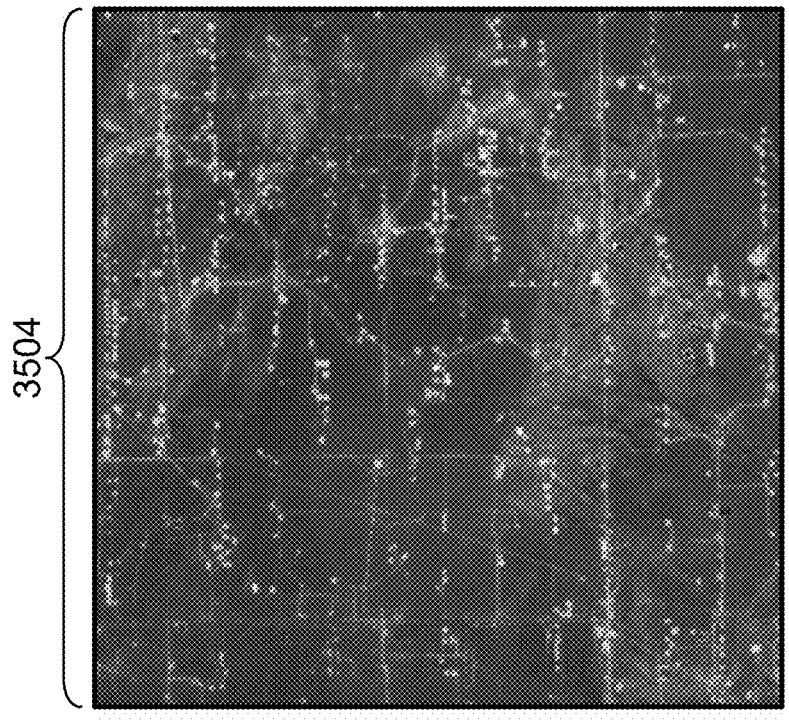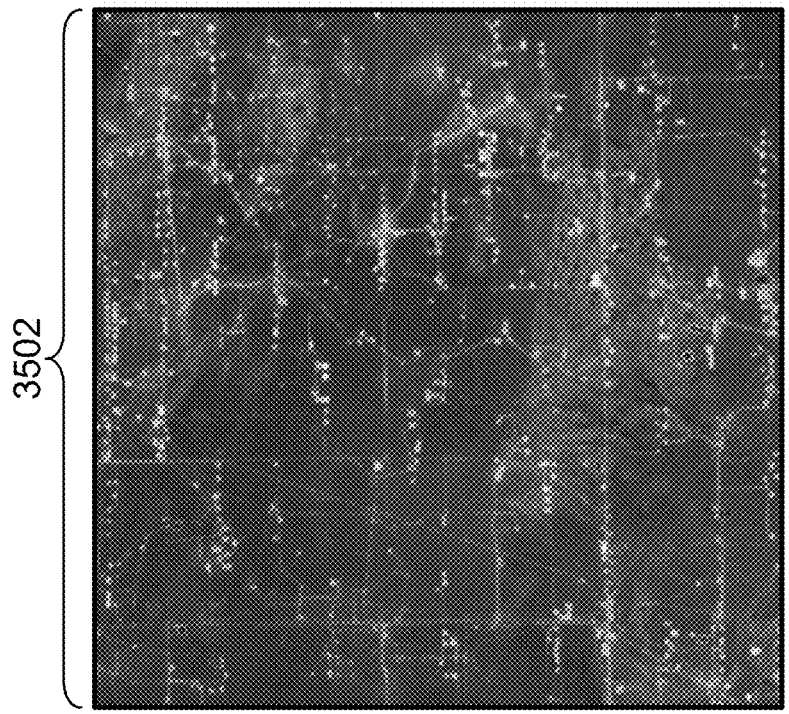
FIG. 35A

SYNTHESIZING TRAINING DATA FOR TRAINING A CHANGE DETECTION MODEL

CROSS REFERENCE TO OTHER APPLICATIONS

This application claims priority to U.S. Provisional Patent Application No. 63/071,963 entitled CHANGE DETECTION filed Aug. 28, 2020 which is incorporated herein by reference for all purposes.

BACKGROUND OF THE INVENTION

Existing change detection techniques typically focus on identifying specific types of changes. This can be limiting. Further, obtaining sufficient training data for training change detection models can be challenging.

BRIEF DESCRIPTION OF THE DRAWINGS

Various embodiments of the invention are disclosed in the following detailed description and the accompanying drawings.

FIG. 6 depicts an example of pseudocode for ingesting data.

FIG. 7 depicts an example of pseudocode for preprocessing data.

FIG. 8A illustrates an example portion of the Earth as viewed from above (e.g., by a satellite).

FIG. 8B illustrates an example portion of the Earth as viewed from the side.

FIG. 9 illustrates a set of NDVI values for a given pixel in a sixteen day period.

FIG. 14 depicts gradient presence images.

FIG. 16 depicts boundary maps.

FIG. 35A illustrates an embodiment of inputs to a change detector.

DETAILED DESCRIPTION

Figure 1:
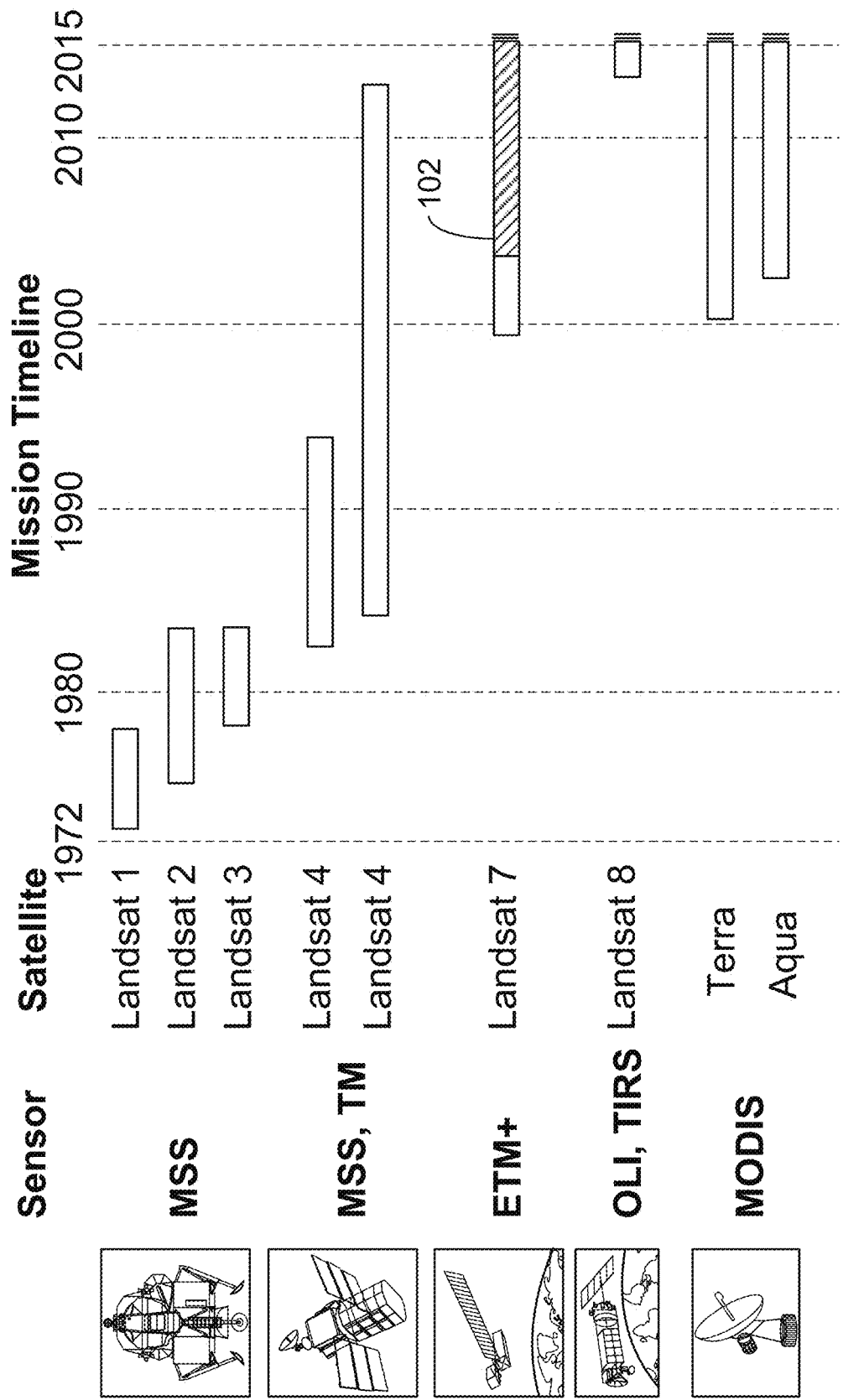
FIG. 1 shows NASA/USGS Landsat and MODIS satellites and sensors providing data that can be processed using embodiments of techniques described herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques described herein can be used to process and analyze data such as multi-decadal observations of the Earth by constellations of satellites. For example, described herein are techniques for operating on over a petabyte (8×1015 bits) of compressed raw data from 2.8 quadrillion pixels (2.8 petapixels) acquired by sources such as the U.S. Landsat and MODIS Earth remote sensing programs over the past forty years. As described herein, such data can be converted from a raw form to a calibrated, georeferenced, and multi-resolution tiled format suitable for further additional processing/analysis, facilitating further space and time-domain analysis, including fusion of the Landsat and MODIS (and other) datasets, as applicable. The techniques described herein are efficient-allowing, in various embodiments, for the detection, in real time, of events that occur anywhere on the globe. The techniques described herein can be deployed using commodity cloud computing resources (using a "Cloud architecture"), but can also be deployed using other architectures, including traditional high-performance computing architectures, in various embodiments, as applicable.

I. Overview

A. Overview of Example Data Sources

The NASA/USGS Landsat program has routinely collected approximately monthly snapshots of the world's land surface since 1972. The Landsat program has evolved over its lifetime, with the eight Landsat satellites hosting a series of moderate-resolution multispectral imaging systems, from the Multispectral Scanner (MSS), to the Thematic Mapper (TM) and Enhanced Thematic Mapper (ETM+), and most recently the Operational Land Imager (OLI) and Thermal Infrared Sensor (TIRS). FIG. 1 shows NASA/USGS Landsat and MODIS satellites and sensors providing data that can be processed using embodiments of techniques described herein. Landsat 6 failed on launch, and a failure in the Landsat 7 scanline corrector (SLC) is indicated in region 102. Complementing the Landsat program is a range of lower-spatial resolution systems optimized for daily global imaging, of which the most widely used is the Moderate Resolution Imaging Spectroradiometer (MODIS) instrument on the NASA satellites EOS Terra (launched 1999) and Aqua (launched 2002). Landsat and MODIS are two examples of sources of observational data. Other sources can also be processed/analyzed in addition to/instead of Landsat/MODIS data in accordance with various embodiments. For example, observational data collected from other constellations (e.g., PlanetScope, RapidEye, Dove, Sentinel-1, and Sentinel-2), as well as higher-resolution imagery (e.g., collected via airplane/drones) can also be used in accordance with embodiments of techniques described herein.

Figure 2:
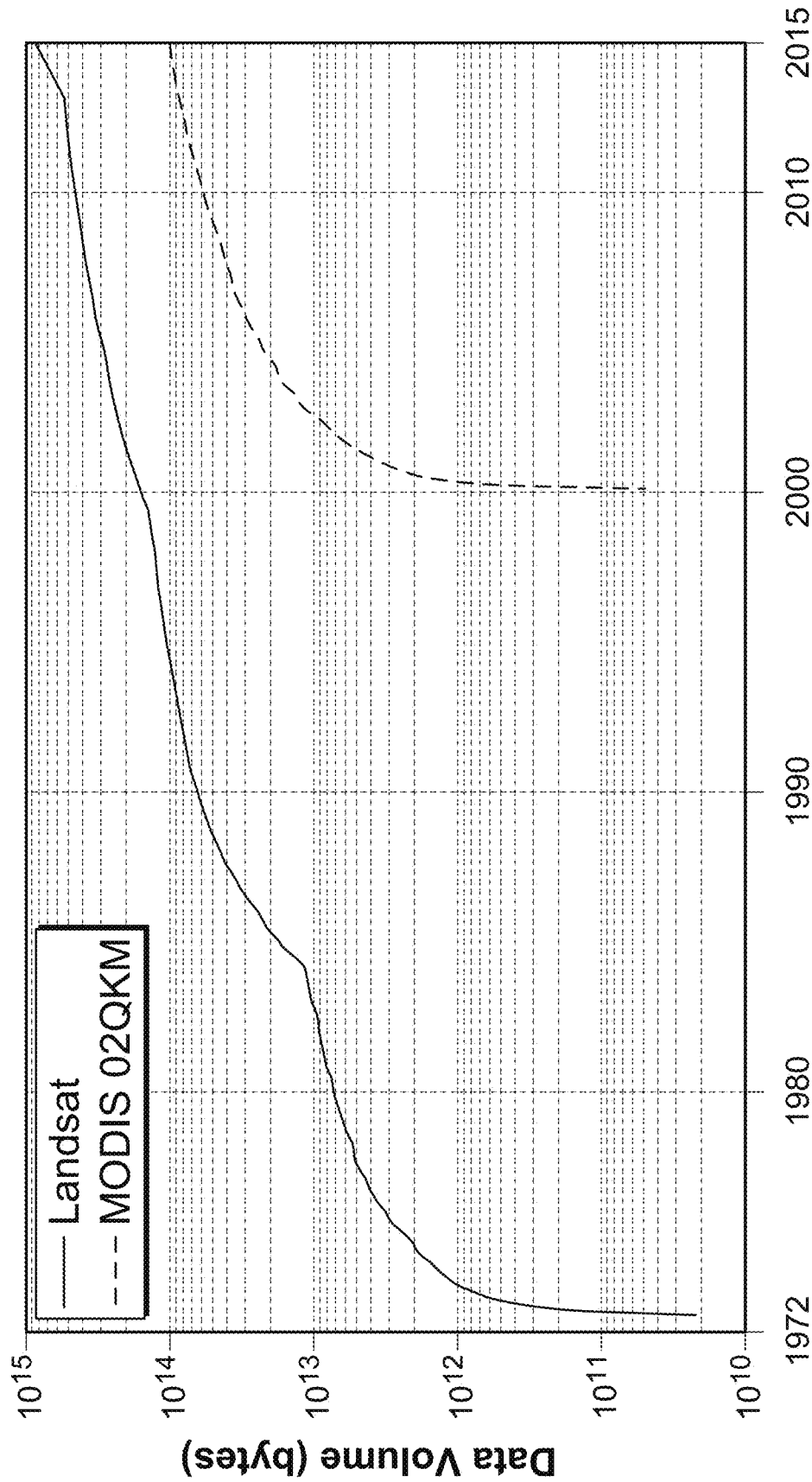
FIG. 2 shows the growth of Landsat and MODIS data volume over time.

FIG. 2 shows the growth of Landsat and MODIS data volume over time. To be most useful (e.g., to the community of researchers and policy makers), the Landsat and MODIS datasets need to be available globally on data systems that support high-bandwidth access, and the data itself needs to be stored in a data format that supports scientific analysis and is compatible with common visualization tools. At the time of the Landsat 1 launch on Jul. 23, 1972, the fastest computer in the world was the CDC 7600, capable of approximately 10 Mflops. Each Landsat 1 MSS scene consisted of 20 Mpixels (170 km×185 km image at 79 m ground sample distance in 4 spectral bands). The long-term storage options for these huge images involved magnetic tape and conversion to large-format photographic film. Hundreds of thousands of frames of photographic film remain in the USGS Eros data center, and efforts were taken in the early 1990s to convert the film data from Landsat 1 through 5 MSS and TM observations back to a digital format.

Google Earth Engine and the Amazon-NASA Earth Exchange (NEX) have placed historical (and are continuing to place newly-collected) Landsat and MODIS data into freely accessible storage in the cloud. Unfortunately, this data is often provided to the public in a format which requires more resources to store and process than necessary, and can prevent some forms of analysis entirely. As one example, bzip compressed tar files (often used to store such imagery) prevent random access to the data within them. Additionally, if answering a specific question requires access to the entire time series of data within a relatively small region (e.g., tens of kilometers), more than 1000 large image files spanning 185 km would need to be decompressed in their entirety, and then further spatially subdivided in order to fit within the memory of a processing node. However, if, as will be described in more detail below, the data is provided in a multi-resolution tiled format, only the data of interest needs to be accessed, reducing the cost and complexity by a large factor.

B. Overview of Example Infrastructure

1. Hardware

A variety of infrastructural approaches can be used to process data at a petabyte scale. One option is to purchase hardware, and install and maintain one's own computing center. One drawback of this approach is that, where the peak requirements are very large, but the typical workload is much smaller, resources will often go wasted through idleness. Further, this approach requires an appropriate knowledge of how to design and provision the hardware and software environment, possibly before having a complete understanding of the resources required to solve the data processing problem at hand. This solution also potentially comes with a multi-year commitment, since there is not much of a market for slightly used supercomputers.

A second option is to use shared supercomputing resources (e.g., provided by one's company, university, or national supercomputing facility). There are hundreds of supercomputing installations with more than 10,000 cores that could potentially provide for the on-node processing of the datasets described herein. Unfortunately, the associated storage and network resources are not so readily available. One major limitation to processing very large datasets using traditional supercomputing hardware is the difficulty of transferring the data to a parallel file system where it can be processed. At typical supercomputing center transfer rates, retrieving a petabyte from an archival storage location over the Internet could take a month or more.

Another issue is how to store the data while it is being collected. Parallel file systems commonly attached to supercomputers, such as Lustre and Panasas, have been designed for high performance, and their high cost limits their utility for long-term data storage. They are typically reserved for temporary, scratch storage. Lower cost archival storage such as magnetic tapes are available, but are not designed to support the use case of staging a petabyte at a time onto a parallel datastore. Yet another issue is how to perform further analysis and/or distribute results after a large data processing run has completed. Supercomputing centers typically do not provide a friendly environment for interactive data analysis and visualization, and additional infrastructure to provide web-enabled public or private access to large amounts of processed data can run afoul of traditional security models.

Instead of purchasing dedicated hardware to perform calculations, and/or performing them at an existing supercomputing center, an alternate approach is to leverage public cloud computing resources. Cloud computing represents a further step in the commoditization of computational resources, with associated benefits in agility, elasticity, and reliability. One aspect of cloud computing is that its pay-as-you-go model promotes transparency of resource costs, and thus allows free-market economic feedback loops which are largely suppressed in the traditional supercomputing environment. In the following Specification reference is made to Google Compute Engine, which is the Infrastructure as a Service (IaaS) component of Google Cloud Platform. Other platforms provided by other companies can also be used, and the techniques adapted as applicable.

Figure 3:
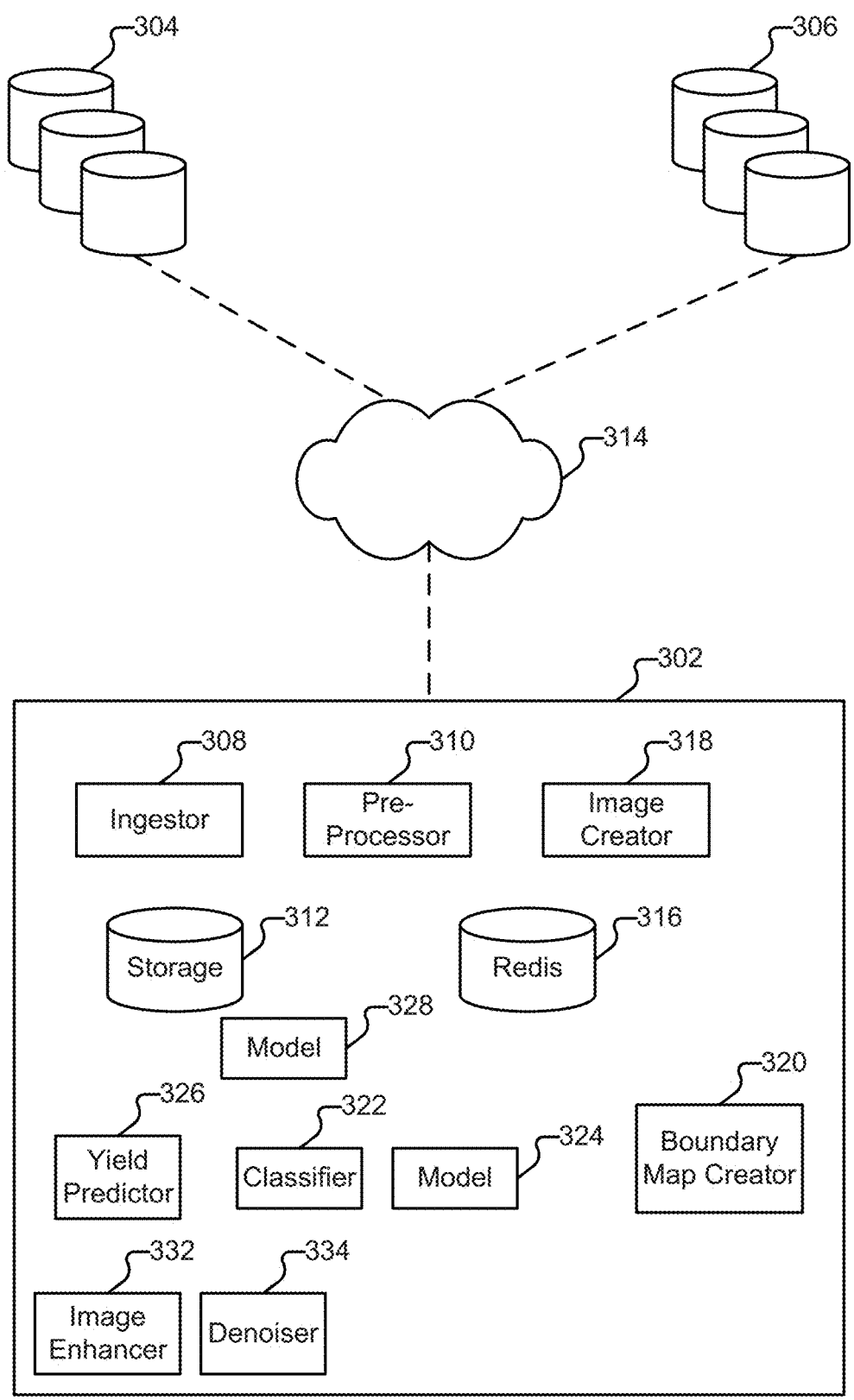
FIG. 3 depicts an example environment for processing and analyzing data in accordance with various techniques described herein.

FIG. 3 (described in more detail below) depicts an example environment for processing and analyzing data in accordance with various techniques described herein. As explained throughout the Specification, platform 302 (and/or various elements thereof) can be implemented using traditional server hardware, and can also be implemented using cloud computing resources. Various elements of the environment shown in FIG. 3 are depicted as individual units (e.g., ingestor 308 and pre-processor 310). It is to be understood that such elements need not be implemented on a single node, but can also be implemented across multiple nodes configured to cooperate to perform tasks (e.g., leveraging various industry standard cloud computing techniques, as well as various approaches described herein). Further, whenever platform 302 is described as performing a task, a single component, a subset of components, or all components of platform 302 may cooperate to perform the task. Similarly, whenever a component of platform 302 is described as performing a task, a subcomponent may perform the task and/or the component may perform the task in conjunction with other components. Various logical components and/or features of platform 302 may be omitted and the techniques described herein adapted accordingly. Similarly, additional logical components/features can be added to embodiments of platform 302 as applicable.

2. Software

The availability of useful, high-quality, and interoperable software packages continually increases (e.g., as the knowledge and effort of many software developers integrates over time in a code base counted in hundreds of millions of lines). The ecosystem that has developed around the collaborative development of software is a remarkable example of how the solution to a problem can be scaled across a large number of people. A corollary to the observation that there is vastly more high-quality open source software available now than there was in the past, is that much of the complexity of managing software has moved from writing one's own code to interfacing one's code with software written by others.

Python offers a good compromise between rapid code development and high performance. Accordingly, in various embodiments, various pipelines (and/or components thereof) are predominantly written in Python, leveraging Numpy for numerical array operations. Cython is used as a glue to interface to other software libraries, and the Geospatial Data Abstraction Library (GDAL) is also used. The code is revision controlled with Git, which is also used as the vehicle for code deployment to worker nodes. Other languages/packages/etc. can also be used in accordance with various embodiments of the techniques described herein. As one example, a Landsat metadata file parser from the Landsat ecosystem disturbance adaptive processing system (LEDAPS) can be written in the C programming language, comprising approximately 500 lines of code, supporting either the old or new Landsat metadata format, depending on the version used. A Python metadata file parser in accordance with embodiments of the techniques described herein requires less than 40 lines, and can support both old and new Landsat metadata formats with the addition of an 80 line translation dictionary. Landsat metadata information can be propagated into an XML container within JPEG 2000 output files, providing a self-documenting provenance for the data the processing pipeline produces.

Various approaches can be used to reduce the cost of resources involved in the various kinds of processing and analysis described herein. For example, memory usage can be reduced to allow for execution on the smallest memory (and least expensive per core) Google Compute Engine nodes, which contain somewhat less than 2 GBytes of memory per hardware core, and use no conventional disk storage on the compute nodes at all (beyond the minimum 10 GB partition required to boot the system), working entirely in memory or from the Linux tmpfs RAM disk. As another example, intermediate writes to the local file system can be reduced, instead going from memory buffer to memory buffer between application libraries. As a specific example, rather than copying a bzipped Landsat image tar file from Google Cloud Storage to local storage and then decompressing and reading the file into memory, the data can be streamed directly into memory using a Python tarfile module reading from a gsutil cat pipe. The data in memory can then be passed directly to GDAL via the gdal.FileFromMemBuffer interface.

3. Initial Dataset—Landsat/MODIS

One example input dataset for use in conjunction with techniques described herein comprises $915.52 \times 10^{12}$ bytes of Landsat data in 5,693,003 bzip compressed GeoTIFF files (available at gs://earthengine-public/), and $101.83 \times 10^{12}$ bytes of MODIS Level 1B (2QKM) band 1 (red) and 2 (near infrared) data in 613,320 sz compressed Hierarchical Data Format (HDF4) files (e.g., collected from the NASA ftp site (1204) and stored in Google Cloud Storage (1212)), for a total of $1017.35 \times 10^{12}$ bytes and 6,306,323 files. The oldest image was collected Jul. 25, 1972, and (in this example data set) the recent image was collected on 2015 Apr. 13 at 06:10:04Z. All of the input data is publicly available.

In various embodiments, the processing stages for each Landsat image in the dataset include: retrieving the image from Google Cloud Storage, uncompressing the image, parsing the metadata, identifying the bounding rectangle that contains valid data, cleaning the edges of the image, converting the raw pixel information into meaningful units (e.g., calibrated top of atmosphere reflectance using the appropriate constants for each satellite and accounting for solar distance and zenith angle), cutting each image into appropriately sized pieces using a consistent equal-area worldwide tiling of the sphere, performing any necessary coordinate transformations, compressing the data into a JPEG 2000 format (or another appropriate format), and storing the result back into Cloud Storage.

4. JPEG 2000 Image Coding

Aspects of JPEG 2000 include:
- Rate-distortion performance that is somewhat superior to that of traditional JPEG at high bit-rates (i.e., low compression ratios) and substantially superior at low bit-rates (i.e., high compression ratios).
- Much greater flexibility in terms of the types of images that can be coded, including single and multi-band images, and bit-depths between 1 and 32 bits per band (e.g., as compared to traditional JPEG).
- Support for both lossless and lossy compression.
- A scalable codestream that can be truncated to obtain a lower bitrate representation of the image of similar quality to that which would have been obtained if the image had been coded to target that reduced bit-rate. The codestream can be ordered for various forms of scalability, giving priority, for example, to either resolution (a high-fidelity low-resolution representation is obtained first) or fidelity (a low-fidelity full-resolution representation is obtained first).

The above features are all provided by the baseline, defined in "Part 1" of the standard, which also defines a standard file format for the codestream, referred to as JP2. Further flexibility, such as support for user-defined wavelet transforms and inter-band transforms, is provided by "Part 2" extensions to the standard, which also defines the more flexible JPX file format.

5. Generations of Landsat Imagery: MSS, TM, ETM+, and OLI

Landsat images comprise 6 or 7 spectral channels, a higher-resolution panchromatic channel (only available in Landsat 7 ETM+ and Landsat 8 OLI), and one or more mask images. Example ways to combine groups of them are in the following set of JPEG 2000 encoded images in JP2 file format:
- a three-band image comprising the spectral channels with the closest correspondence to visible red, green, and blue bands (lossy coding),
- a three-band image comprising the near infrared (NIR) and short wave infrared (SWIR) bands (lossy coding),
- a single thermal infrared (TIR) band (lossy coding),
- a single high-resolution panchromatic (PAN) band for ETM+ and OLI (lossy coding),
- a single band 1-bit image representing the data validity mask (lossless coding), and
- a single band 8-bit image representing the most important bit-planes in the Landsat 8 Quality Assessment Band (lossless coding).

The above layout does not fully exploit all of the flexibility of the JPEG 2000 standard, which would allow all bands to be included within a single JPX file, or all multi-spectral bands to be included as multiple components within the same JP2 file. Example reasons for this choice are (i) the optimum layout is strongly influenced by the optimal chunk size for access while minimizing costs for cloud file operations, and (ii) a JP2 file format was preferred over the more flexible JPX format due to the much wider support by libraries for decoding JPEG 2000 format images. In other embodiments, other layouts can also be used.

JPEG 2000 performance in reversible coding of bitplanes is inferior to that of a coding technique, such as JPEG-LS, specifically designed for this type of content. However, to avoid the complexity of using multiple coding standards, in various embodiments, JPEG 2000 is also used for bands of this type. A substantial performance improvement can be obtained, at the expense of losing resolution scalability, by effectively disabling the wavelet transform by setting the number of transform level to zero.

6. JPEG 2000 Parameters

A variety of libraries can be used for manipulating image data. For example, the commercial Kakadu library can be used, as can an open-source option such as OpenJPEG. Using the Kakadu library offers an advantage in encoding speed. One application of the imagery described herein is as an input to a classifier. In various embodiments, the desired level of compression is specified to the Kakadu encoder using the rate-allocation slope rather than a target bitrate (which is less robust to changes with image content in delivering a consistent reconstruction distortion). As applicable, suitable compression ratios can be selected, e.g., by performing a classification experiment on processed JP2 imagery over a wide range of compression ratios. As one example, suppose for each ratio, thirteen 2048×2048 frames for the same thirteen 2048×2048 frames for the same spatial location (e.g., a region in Kansas) are selected from different times in 2011, and 1800 rows of pixels are used in each of the six spectral bands as training data, with the remaining 248 rows of pixels as testing data. The ground truth in this example is whether each pixel location is identified by the United States Department of Agriculture (USDA) Crop-Scape Data Layer (CDL) as containing wheat. The 78-dimensional training inputs for each of the 3,686,400 training pixels can be input into an artificial neural network comprising three fully-connected layers, using the open source Caffe library. In this example, suppose the classification performance varies from 87.52% for uncompressed data to 87.13% for the most compressed imagery. A compression ratio can be selected such that it is sufficiently high to give a substantial reduction in storage costs, but for which image structure (e.g., edges) is just perceptible in the difference image between original and decoded images.

7. Visualization in the Browser

Being able to quickly view and interrogate a given image or montage of images can be helpful for verification and validation of a processing pipeline. Unfortunately, even though the use of JPEG 2000 enables superior performance in terms of compression ratios and multi-resolution representation of imagery, modern web browsers such as Google Chrome, Mozilla Firefox, and Apple Safari may not natively support the format. Accordingly, output JP2 files that could otherwise be viewable directly in the Google Developers' Console Storage Browser must first be downloaded to a local workstation and viewed using an image viewer capable of parsing JP2 files. The situation is aggravated by the files having up to 10 different components, requiring the usage of layout-specific visualization scripts. One solution is to use a Google Chrome Javascript-based extension to view images directly from within the web browser. While an entire JP2-capable parser can be purely in Javascript, in various embodiments, the Emscripten LLVM compiler toolchain is used to compile the C99 OpenJPEG 2.1.0 library to LLVM bytecode and translate the result into optimized Javascript. The base library can be augmented by implementing additional C library functions that are used to specify additional decoding parameters and yield direct access to image component data without first writing to a temporary PNG or RAW image. An HTML5 Canvas object can then be filled with the data array, providing scaling and gamma correction functionality through a simple web GUI. This moves the image inspection procedure directly to wherever the data resides (in terms of its location on a website). Progressive decoding of the bytestream can be performed as it arrives from the server, allowing for a seamless integration into traditional websites.

8. Example System and Environment—Google Compute Engine

As explained above, in various embodiments, the data processing and analysis techniques described herein are implemented using commercially available public cloud resources with an on-demand cost model. These include Google Cloud Platform resources, such as Compute Engine and Cloud Storage, but other platform resources by other vendors can also be used, as applicable (e.g., as offered by Amazon). Cloud vendors such as Google divide physical hardware into virtual resources to divide workloads into isolated environments, which allows customers to use compute capacity with an on-demand cost model. Once the task is complete, the customer can deprovision the system, ending their costs. The virtual infrastructure and its underlying physical resources can then be returned to the available resource pool for the next customer to use. Construction and management of data centers, purchasing of hardware, utilities, and staffing are all removed for the task of building a large distributed system. This allows for focus on the actual problem being solved. Google has multiple geographic availability zones, any/all of which are used in various computations described herein. Geographical diversity creates design options for robust failover and scaling.

Google Compute Engine allows for development teams to specify virtual hardware such as CPU, RAM, SSDs, network, security, etc., along with software such as an operating system, custom software, and dependencies. This flexibility allows the costs and benefits of different hardware to be factored into the software engineering decision process, as a tradeoff against the cost of optimizing the code to work with lower priced virtual hardware. In various embodiments, worker nodes comprise four virtual machine CPU (vCPU) models, based on what is available in the four geographic zones. Examples are as follows:

| Zone | Virtual Machine | CPU Hardware |
| --- | --- | --- |
| us-central1-a | highcpu-16vCPU | Intel Sandy Bridge 2.6 GHz Xeon E5 |
| us-central1-b | highcpu-16vCPU | Intel Haswell 2.3 GHz E5 v3 |
| us-central1-c | highcpu-32vCPU | Intel Haswell 2.3 GHz E5 v3 |
| us-central1-f | highcpu-32vCPU | Intel Ivy Bridge 2.5 GHz E5 v2 |

Other virtual hardware specifications such as RAM, SSD, and network are identical across zones. Software is identical with the exception of worker processes corresponding to the vCPUs available. Zone variations (primarily 16 and 32 vCPU instances) necessitate multiple VM templates. Datacenter regions also allow the specification of templates inside a group, such as the specification of the number of VMs to be created, and auto-scaling of the group based on factors such as network traffic or CPU load.

9. Example Software Deployment and Configuration

In various embodiments, software deployment and configuration is accomplished with two techniques: bash scripts and Linux containers (e.g., Docker). VM templates allow for a custom script to be specified and executed post startup. With the bash script technique, the code is pulled from a private Github repository along with dependencies, and configuration files deploy the code onto the virtual machines and start the worker processes. In the second approach, a pre-built Docker container that contains source code, dependencies, and configurations built inside the container is deployed onto the VM and the container is executed in daemon mode. Docker containers provide an API around several Linux kernel features (libvirt, LXC, systemd, and libcontainer) to create an isolation mechanism from the host OS while utilizing the existing Linux kernel. Traditional virtual machines fully isolate operating systems on top of a hypervisor. Docker containers also use a copy-on-write layered file system approach where identical layers need not be duplicated, creating considerably smaller storage requirements than traditional virtual machines. Because the container is leveraging the existing kernel's CPU, memory, and network, additional performance overhead can be minimal. Containers can be executed on both virtual machines and bare metal hardware, which provides an efficient mechanism to move configured, functional, versioned, compute capabilities to where the data resides, which often could be a different cloud vendor, private datacenter, or collaborator's laptop. Just as source code can be branched and versioned inside modern source code repositories such as Git, pre-built containers can be versioned and branched in container repositories at a fraction of the size of versioning virtual machines, since only the changes in the layered file system are differentiated. In an example deployment, containers are built with all required dependencies, configurations, and source code from GitHub, and then stored in a private Google Container Registry located inside a Google Cloud Storage bucket. This allows for the latest container to be pulled down and executed in daemon mode on startup in a consistent manner across the cluster. Containers also provide a reproducible archival mechanism for others to later execute code to attempt to duplicate results with minimal effort.

Various observational data (e.g., the Landsat dataset) is stored inside Google Cloud Storage as a publicly available dataset, persistent and accessible from all four us-central zones. As an alternative to using a large NFS for all worker nodes to write results, Google Cloud Storage buckets can be used as a persistent, common datastore across all nodes. As a further benefit, this data is also available in other geographical zones, enhancing availability and tolerance to hardware failures.

To manage the creation of asynchronous tasks for processing millions of scenes across the worker nodes, an asynchronous task queue approach (e.g., the Python Celery library) is used in some embodiments. Celery's API allows multiple asynchronous job queues to be created, the list of tasks and their parameters to be managed, and for their insertion into a pluggable backend key-value pair store (e.g., Redis 316). As worker nodes are provisioned and start, they connect to the Celery broker to receive processing tasks in the queue. To optimize performance, Redis 316 can be configured to keep the queue in memory.

10. Scalability and Performance—Example Execution

In one example execution (e.g., of the tiling process described in more detail below), processing of a petabyte of satellite imagery begins at 02:15 UTC, when 250 nodes in zone us-central 1-f are started, processing Landsat TM images. Additional compute instances are then created across zones a, b, c, and f, accounting for approximately 15,000 physical compute cores. At 11:34 UTC, nodes running the MODIS processing pipeline are started, and an equivalent number of Landsat nodes are shut down. At 15:45 UTC, a list of tasks which have not completed and have not been automatically re-tried by the task manager is resubmitted. By 16:15 UTC, the bulk of the Landsat tasks are complete, and the remaining Landsat MSS tasks are added. At 17:11 UTC, the MODIS processing completes, and at 17:41 UTC on April 16 all tasks have completed. During the 15.5 hour process, the petabyte of input data is read from the distributed Google Cloud Storage system at an average rate of 18.1 Gbytes/sec. After decompression, this represents 55.2 Gbytes/sec into processor memory. The peak input network bandwidth exceeds 25 Gbytes/sec (200 gigabits/sec). The output bandwidth back to Google Cloud Storage averages about 4.5 Gbytes/sec, written to over 185 million individual files.

Figure 4A:
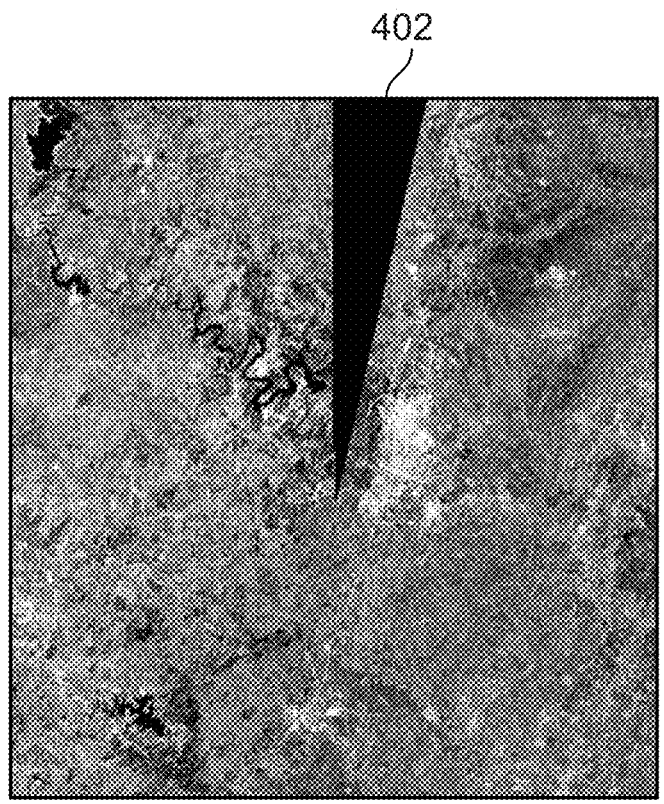
FIGS. 4A-4C illustrate processed tiles.
Figure 4B:
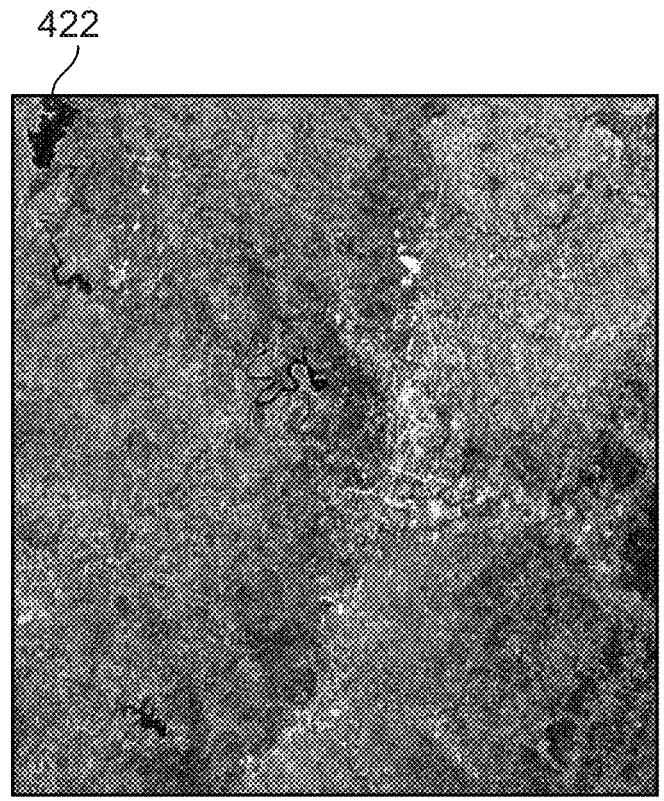
Figure 4C:
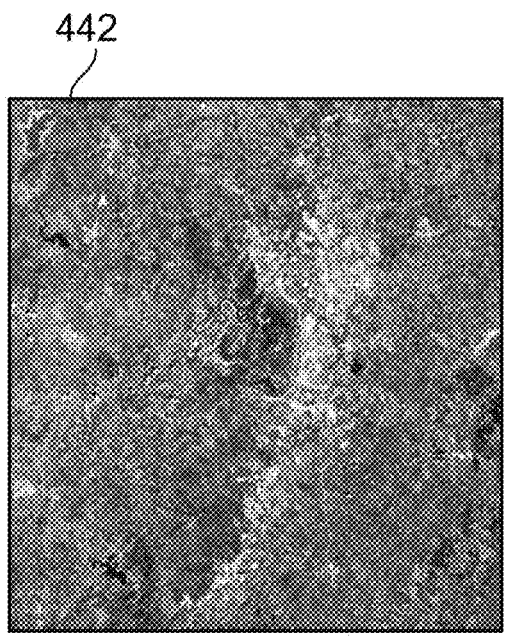

FIGS. 4A-4C show examples of processed tiles of the Austin, Texas area. FIG. 4A depicts March 1973 (Landsat 1 MSS), FIG. 4B depicts September 1994 (Landsat 5 TM, 10B), and FIG. 4C depicts March 2015 (Landsat 8 OLI, 10C), respectively. The tiles are 2048×2048 pixels, and are calibrated and georeferenced. The Landsat 1 image (FIG. 4A) is a false-color image (RGB display channels mapped to near IR, visible red, visible green), due to the MSS sensor lacking a visible blue band. All three panels are composites of four processed tiles, where each panel is formed from tiles collected over several days, showing the consistency of the processing across Landsat scenes and between sensors. Region 402 in FIG. 4A is a region where no data was available in that Landsat 1 MSS observation. Changes in the extent of urbanization surrounding Austin are clearly visible from panel to panel, as is a significant change in Buchanan Lake between FIGS. 4B (region 422) and 4C (region 442).

II. Ingestion and Pre-Processing

Figure 5:
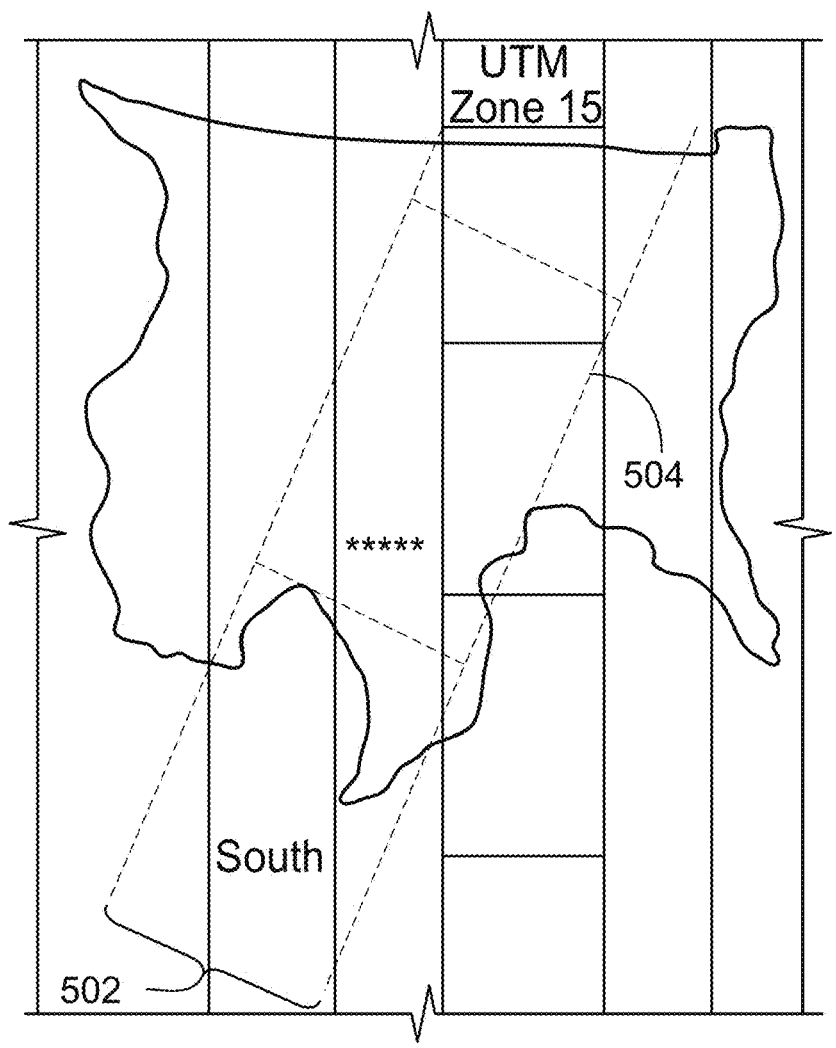
FIG. 5 depicts an illustration of the United States, as observed from satellite.

FIG. 5 depicts an illustration of the United States, as observed from a satellite. In particular, FIG. 5 illustrates a granule (504) of data-five minutes of orbit along a swath (502). The path of the spacecraft is down through the center of the swath.

A. Map Projections

Two common map projections which represent the spherical surface of the Earth as a regular grid are the Web Mercator projection and the Universal Transverse Mercator (UTM) projection. A single image of the Earth with pixel scales less than about 10 km can be too large to process efficiently, so the map is "tiled," or split into pieces which can be processed independently.

The Web Mercator projection can readily be tiled, because the image dimensions are precisely a power of two in both coordinates. The level of the decomposition divides the world into 4" level pieces. An appropriate level can be chosen to satisfy various constraints, mainly, the number of time slices of a given tile that can fit into processor memory at one time. Web Mercator is suitable for simple map interfaces, but can be problematic for applications beyond simple analysis because the pixel areas are not equal: as a pixel becomes farther from the equator, it represents a smaller and smaller area on the surface of the Earth.

The UTM projection is not as simple. UTM first splits the world into 60 zones, and within each zone pixels are split into nearly equal areas referenced by their "x" or "Easting" coordinate and their "y" or "Northing" coordinate. All UTM distances are measured in meters. The number of pixels which span a zone in the East-West direction depends on the distance from the equator.

For the MODIS sensor carried on the Aqua and Terra satellites, sensor values come as a logically rectangular grid of latitude/longitude co-ordinates (a swath), but projected on to the surface the sample points are not on a regular grid (points become farther apart towards the edges of the swath). For other sensors, the image values are delivered in UTM coordinates. A shared, common coordinate reference system can be used to further the most efficient and accurate processing of multiple datasets. Most of the input data is delivered in UTM coordinates, and operations to interpolate pixels to a different map projection or resolution can affect the data quality and require additional computational resources. Accordingly, in various embodiments, UTM is used as a common map projection. The tiling techniques described herein can also be adapted for use with other projections, as applicable.

B. UTM Tiling Parameters

UTM tiling (e.g., as used by embodiments of platform 302) can be described by a number of parameters. It is applied to each of the 60 UTM zones with identical parameters, with the zone designated by z. A similar construction can be applied to the polar UPS projection. The parameters are as follows:

z: the UTM zone,
$x_0 y_0$: the origin of the tiling system,
$x_n y_n$: the number of pixels in the tile,
$x_b y_b$: the border size of the tile,
r: the spatial resolution of the pixel.

Each pixel can be located by its spatial global index offset from the origin of the tiling system $g_i g_j$, or its index i, j, within a specific tile $t_i t_j$ (also referred to as column and row).

An example size for tile images (e.g., given current computer architectures and memory storage capacities) $x_n y_n$ is approximately 4096×4096 pixels. Since a UTM zone is 6 degrees across, that represents 668 km at the equator. For pixel scales $x_r$ larger than approximately 200 meters, a single tile will cover the east-west extent of a UTM zone. For smaller pixel scales, multiple tiles are required. For example, for r=10 m resolution (e.g., Sentinel-2), seventeen 4096 pixel wide tiles would be required $$\left( \frac{668 \text{ km} * \frac{1000 \text{ m}}{10 \text{ m}}}{4096} \right).$$

In the y-dimension, the distance from the equator to the pole is near 10000 km, so the number of 4096×4096 tiles to span that distance is approximately 10 for a 250 m pixel tile, and 244 for a 10 m tile. The southern hemisphere can be handled with a similar number of tiles using a negative index referenced from the equator, or referenced by their northing coordinate from the south pole using the southern "S" designator for the zone.

There are several potential choices for the origin of the tiling. The first uses the native UTM 0,0 as the origin, which is at the intersection of the false easting of the zone (500 km) and the equator. One drawback of this choice is that the tiles are not symmetric within a zone. Another choice is to use the intersection of the central meridian of the zone with the equator, which is located at UTM $x_0 y_0 = 500000.0$.

The border size represents overlap with adjacent tiles, which allows the reduction of "edge" effects for processing which requires neighboring pixels. One choice is to use some fraction of the tile size to reduce duplicate storage. For a 4096×4096 tile, an example choice is some power of 2 between 32 and 256.

There are also various choices for the optimal pixel resolution "r." One approach is to accommodate as many sensors as possible using powers of two of a fundamental resolution. Examples of such tilings are as follows:

r=5 m accommodates RapidEye and PlanetScope (native 5 m), and Sentinel-2 (native 10 m/20 m).

r=15 m accommodates pan-sharpened Landsat 7/8 (15 m), Landsat 5/7/8 (native 30 m), and MODIS (240 m).

For high-resolution sensors (e.g., NAIP aerial photography at 1 m resolution), r=1 m can be used as the fundamental tiling, with small interpolation adjustments as needed to accommodate the existing sensors (e.g., with RapidEye and PlanetScope adjusted to 4 m (level 2), Sentinel-2 to 8 m (level 3), pan-sharpened Landsat at 16 m (level 4), Landsat at 32 m (level 5), and MODIS at 256 m (level 8)).

C. Example Conversion to Pixel/Tile Index

The following example shows an assignment of a specific WGS84 latitude/longitude from the MODIS sensor to a pixel and tile. Longitude-106.3017 and Latitude 35.8785 is UTM Zone 13N Easting 382497.99 Northing 3971254.80. For a pixel resolution of 1 meter, this would fall in the pixel whose upper left corner is at 382497, 3971255 which is identical to the zone pixel $g_i, g_j$ address. For a pixel resolution of 240 meters, the sample would be in the pixel with upper left location 382320, 3971280 and $g_i, g_j$ address 1593, 16547. The global pixel indices can be calculated via $$g_i = r^* \left\lfloor \frac{\text{Easting}}{r} \right\rfloor \text{ and } g_j = r^* \left\lfloor \frac{\text{Northing}}{r} + 1 \right\rfloor.$$

The corresponding tile indices for r=1, $x_0$=0, $y_0$=0, $x_n$=4096, $y_n$=4096 are $t_i$=93, $t_j$=970. Using a central meridian origin ($x_0$=500000), $t_i$=−29, $t_j$=970. For the MODIS 240 m pixel and $x_n$=4096, $y_n$=4096, $t_i$=0, $t_j$=5. The tile indices can be calculated from the pixel indices via $$t_i = \left\lfloor \frac{g_i}{x_n} \right\rfloor \text{ and } t_j = \left\lfloor \frac{g_j}{y_n} + 1 \right\rfloor.$$

Tile indices are mapped to a string which is part of the file name (along with date of acquisition and sensor) stored in a long-term storage 312 (e.g., Google Cloud Storage or Amazon S3). An example for MODIS would be "2006 Jun. 9-1800_12N_12_MO_09qkm.jp2," which was collected on Jun. 9 2006 at 18:00 UTC in Zone 12N with $t_j$=12 by the Terra sensor. There is no $t_i$ because a tile covers the entire E-W span of the zone. An example for Landsat 7 would be "2015 Jan. 18-L7-034033_13N_007_069_321.jp2" which was collected on Jan. 18, 2015 from zone 13N with $t_i$=7 and $t_j$=69.

D. Ingestion Process

FIG. 3 depicts an example environment for processing and analyzing data in accordance with various techniques described herein. Platform 302 includes an ingestor module 308 (comprising one or more Google Compute Engine instances and a Celery master). Ingestor module 308 connects (e.g., via one or more networks depicted in FIG. 3 as a single network cloud 314) to various sources of observational data. Two examples shown in FIG. 3 are NASA FTP site 304 and a proprietary repository 306 (e.g., storing aerial photography). Ingestor module 308 retrieves data (e.g., using the FTP protocol) from the repositories and writes them to storage 312 (e.g., creating a local mirror of the retrieved data).

The following is an example of how ingestor 308 obtains data, and in this particular example, the ingestion of MODIS data. As explained throughout the Specification, other sources of data (in other formats) can also be processed using embodiments of the techniques described herein.

In various embodiments, ingestor module 308 executes a shell script that manages ingestion. The shell script executes (e.g., as a cronjob running every four hours) and launches an LFTP process to obtain a directory listing of FTP site 304. Ingestor module 308 identifies files that are new since the last time the script ran, by parsing the directory listing into a list of potential files to retrieve, and then checking against a Redis database 316 to see whether the files were previously retrieved. Previously retrieved files are ignored and threads are started to download any new items. In an example operation, 50 to 100 new files are identified in NASA's MODIS collection each time the ingestor script executes (depending, e.g., on when NASA's MODIS processing occurs). Each raw MODIS Hierarchical Data Format (HDF) file obtained from FTP site 304 is approximately 140 MB. Multiple files can be downloaded in parallel (e.g., using threads), and locks can be used to prevent multiple threads from trying to download the same file simultaneously. In the event the download fails (e.g., due to a network connectivity problem, or if the file length is not correct when it is finished), the script can restart the download as needed. Newly seen files are copied to storage 312 and entries are made in Redis database 316 (e.g., using python) indicating the new files as having been downloaded successfully.

The raw data (e.g., MODIS data obtained from NASA) is stored in "granules." In various embodiments, every pixel in a granule is stored. In other embodiments, a cloud mask (included by NASA with the granule) is used to shrink the number of pixels stored. The following is an example file name for a granule stored in storage 312, and mirrors NASA's nomenclature:

gs://modis/allData/6/MOD02QKM/2015/200/
    MOD02QKM.A2015200.0040.006.
    2015200134321.hdf The components of the path name are:
gs://: Google Storage designator
modis: storage bucket
allData: (inherited from NASA storage path)
6: collection number (equivalent to a NASA version number)
MOD02QKM: data type (MODIS 02 quarter kilometer (250 m) bands)
2015: year
200: Julian day of year MOD02QKM.A2015200.0040.006.2015200134321.hdf: a file name assigned by NASA using NASA's naming scheme In an example embodiment, platform 302 handles twelve types of data granules, each produced every five minutes over daylight portions of the globe. There are approximately 1,728 new files per day, 630,000 files per year, and 10 million files total.

An example of pseudocode for ingesting data (e.g., from site 304 by ingestor module 308) is shown in FIG. 6. An example of pseudocode of preprocessing data (e.g., by preprocessor 310 of the data ingested by ingestor module 308) is shown in FIG. 7.

E. Pre-Processing

Pre-processor module 310 (also comprising one or more Google Compute Engine instances and a Celery master) takes all of the newly retrieved files (e.g., the 50 to 100 MODIS files obtained by ingestor 308 every four hours) and pre-processes them. In various embodiments, pre-processing executes as a cron job (e.g., every four hours), and executes as a first portion of the process the ingestion processing described above. Pre-processing can also be triggered by an event, such as the appearance in a particular directory of new data.

A given granule can be split into smaller tiles (e.g., approximately twenty tiles) by pre-processor module 310. The smaller tiles are easier to perform various operations on by platform 302. Pre-processor module 310 can also process large repositories of historical data (e.g., the last n years of data stored with NASA FTP site 304) by performing a parallel run using an appropriate number of nodes (e.g., 200 multi-processor nodes). The Celery system distributes the workload over the (e.g., 200) nodes, with each node executing the same script as is executed for the newly-seen files (but in parallel).

The following is an example file name for a .xz file stored in storage 312:
gs://modis-xz/utm_v7q_09/15N/03/2015-06-20-1935-MY_15N_03.bin.xz The components of the path name are:
gs://: Google Storage designator
modis-xz:storage bucket
utm_v7q_09: type and version
15N: zone
03: tile y index
2015 Jun. 20-1935-MY_15N_03.bin.xz: file name An xz file comprises an array of N samples. The samples are x and y coordinates as 16-bit unsigned integers quantized to 30 UTM pixel indices, followed by b bands of pixel location (DN) values. The array of N samples is compressed using the Lempel-Ziv-Markov chain compression technique. As previously mentioned, a given granule may have associated with it a cloud mask provided by the original data source (e.g., a NASA provided cloud mask). In such a scenario, the cloud mask can be used to reduce the number of points included in the .xz file, with the file structure remaining the same.

The .xz tiling process can be bypassed, as applicable, and JPEG2000 compressed image tiles can be created directly from the raw MODIS data using an appropriate interpolation method. The following is an example file name for a .jp2 file stored in storage 312:
gs://descartes-modis/2015-07-29-1620_16N_09_MO_09qkm.jp2

The components of the path name are:
gs://: Google Storage designator
descartes-modis:storage bucket 2015 Jul. 29-1620_16N_09_MO_09qkm.jp2: file name, date, time, zone, row, sensor, data type, and file type.

In various embodiments, additional (optional) preprocessing is performed (e.g., prior to the .xy tile being written). One example of such additional processing is scaling DN values to top of atmosphere reflectance. The physical meaning of the numbers associated with each pixel location (DN) varies by sensor. Various operations (e.g., performing cloud removal, described in more detail below) make use of values which represent reflectance as observed at the top of the atmosphere. Some sensors, such as Sentinel-2, deliver data in this format, and do not require scaling. Sensors such as MODIS and Landsat, however, deliver data in radiance units, which require various scaling to obtain reflectance. The metadata associated with the image data contains some of the appropriate constants, while others (such as the distance from the sun to the Earth) can be tabulated from other sources as needed. The conversion formula to reflectance in the range of 0.0 to 1.0 is:

$$gain = \frac{(L\text{MAX} - L\text{MIN})}{(QCAL\text{MAX} - QCAL\text{MIN})}$$

$$bias = L\text{MIN} - gain * QCAL\text{MIN}$$

$$toar_f = \frac{\pi * \text{earth\_sun\_dist\_in\_au}^2}{\text{sol\_irrad} * \cos(\text{solar\_zenith\_angle})}$$

$$scaledDN = DN * toar_f * gain + toar_f * bias.$$

To store the reflectance in a 16-bit integer, it is scaled by an additional factor of 10000. As another example of optional preprocessing, pixels for which no data is present (e.g., due to scanline errors) can have their values set to zero, which can be used in later applications, as described in more detail below.

III. Creating Images with Reduced Atmospheric Obstructions

FIG. 8A illustrates an example of a portion of the Earth as viewed from above (e.g., by a satellite). Suppose FIG. 8A illustrates a portion of Iowa. Lines such as 802, 804, and 806 are gravel roads-generally spaced one mile apart. Other elements visible (e.g., to a satellite) are fields, such as field 808, tree 810, river 812, and house 814. Region 816 of FIG. 8A is obscured by clouds. In some cases, an obstruction (such as a cloud) may completely obscure the ground underneath it. In such a scenario, the optical depth can be represented as a "0," indicating that an obstruction can't be seen through. Correspondingly, a cloudless (i.e., completely visible) portion of ground can be considered as having an optical depth of "1." For some datasets (e.g., Landsat), a cloud mask accompanies the granule (e.g., as obtained from site 304), indicating for a given pixel (in a binary manner) whether the pixel represents a cloud or not.

As shown in FIG. 8B, clouds can take a variety of forms, and different types of clouds (or other atmospheric obstructions, such as smoke, snow, haze, and smog) can conceal the ground beneath them in different ways and to different degrees. In FIG. 8B, a tree (852) and corn plants (854) are shown. Example clouds are also shown, such as a cumulus cloud 856 (which will be opaque in the center part, but have fuzzy edges), low foggy stratus clouds (858), and very high cirrus clouds 850 (where the sun shines through the cloud but the illumination is affected by the cloud).

As mentioned above, sometimes the cloud may completely obstruct what is underneath it, and sometimes the view may be completely unobstructed. Sometimes, the optical depth value is inconclusive/insufficient to articulate whether a pixel is a cloud or not. For example, around the edges of pixels that have optical depths of 0 or 1, there will typically be pixels with optical depths somewhere in between 0 and 1 (e.g., 0.276). In some embodiments, a "cloud" pixel is defined as a pixel with an optical depth of less than 0.4 (or another appropriate value), and used as a mask. Cloud masks can also be more than 1 bit (e.g., 2 or 3 bits, indicating cloud, not cloud, or maybe cloud) per pixel.

One value that can be used in image processing/analysis is the normalized difference vegetation index (NDVI), which is a ratio $$\frac{NIR - VIS}{NIR + VIS},$$

where VIS and NIK stand for the spectral reflectance measurements acquired in the visible (red) and near-infrared regions. If a cloud affects each of these bands equally (e.g., it reduces each one by 10%), the ratio is unchanged. As an example, dust in the atmosphere scatters blue light more preferentially than green and red light. A cloud that affects red more than infrared will change the vegetation index. But, if that change occurs evenly across the whole scene, a correction can potentially be applied. For example, if a probe 820 is present for which the NDVI is known, and a different NDVI value is measured, if a sufficient number of probes are present in the scene, it could be possible to correct the whole scene for whatever obscuration is happening that is impacting the red and the infrared differently. Accordingly, a refinement to the definition of a "cloud" is something that affects NDVI in an uncorrectable way.

One approach to mitigating cloud cover (and other atmospheric obstructions) in imagery is to use the temporal dimension (e.g., to examine a set of images across time). One option is to opt for the largest number of samples in each pixel, without regard for resolution. A second option is to opt for the best resolution, with fewer samples per pixel.

Satellites (and other image sources) have a temporal period. For example, a given satellite might be above a given portion of land every 16 days. There may also be multiple satellites (e.g., two satellites), taking images on alternate days, where on one of the days the satellite will be directly above a region, and alternate days the satellite will be off to one side or another. Accordingly, for a given pixel, there could exist 20 observations, collectively, by various satellites over a 16 day period. Of those 20 observations of a given pixel, many may be masked out because of clouds (or other atmospheric obstructions). However, of those 20 observations of a given pixel, one pixel is the "best" pixel (e.g., the least obstructed). And, a composite image of an area can be created using data associated with each of the "best" pixels from a sequence of images covering the area, using techniques described in more detail below. The "best" pixel can be considered the one in a set (e.g., a time series) for which given spectral information associated with that pixel was last obscured by atmospheric obstruction.

A variety of approaches can be used to select the "best" pixel. One example is to use the NDVI value associated with the pixel (a one-sided error distribution). FIG. 9 illustrates a set of twenty NDVI values observed for a given pixel in a sixteen day period (starting on the 200th day of the year). While an NDVI value can range from −1 to 1, in this example, values below 0 have been excluded. In the sixteen day period, four "cloud free" observations are present (the points above the threshold NDVI line, set in this example at 0.6). Of those four observations, the observation on day 203 of the particular pixel being examined has the highest NDVI value (902) and is thus the "best" pixel in the sixteen day sequence.

For a given pixel in a given sequence of images, in some cases, no data may be present. One reason for the missing data is that a cloud mask (e.g., provided by NASA and described above) was applied. Another reason for missing data is that aberrations (due to satellite position) yield unusable image information. Suppose days 205 and 209 are missing data for the pixel being examined in FIG. 9. In various embodiments, the NDVI values of pixels with missing data are set to zero (e.g., as shown at 904 and 906).

As mentioned above, in addition to clouds, a variety of other atmospheric obstructions can be "removed" in the composite image. For example, a composite image of a region affected by a wildfire can be created by selecting, collectively, the least smoky pixels from a bin of images. And, a set of images collected during a dust storm (e.g., on Earth, or elsewhere) can be used to create a composite image with the least amount of dust present in each pixel, etc. Other examples of "obstructions" that can be reduced in accordance with techniques described herein include digital defoliation (e.g., selecting for the pixel least obscured by plant cover using an appropriate index) and using a water index to select for a maximum (minimum) value to see a composite image of the ground at its wettest (or driest) as applicable.

The use of the NDVI value for cloud detection relies on the fact that clouds are spectrally "flat." In other words, the reflectance for each band is similar. This is equivalent to clouds being white, or a shade of gray. The formula for $$NDVI \frac{NIR - VIS}{NIR + VIS}$$

means clouds have an NDVI value near zero, since the terms in the numerator cancel. Selecting maximum value pixels is particularly effective with vegetation pixels, which have NDVI values which are much higher, since near-infrared (NIR) reflectance is much larger than red (VIS) reflectance. The same approach works for other differential indexes such as the normalized difference water index (NDWI), normalized difference snow index (NDSI), shortwave infrared $$\left(\frac{SWIR - VIS}{SWIR + VIS}\right),$$

or various permutations of differential vegetation index (e.g., using visible green instead of visible red). Other cloud rejection algorithms can work using other features of clouds. For example, since clouds are white or gray and are usually brighter than land cover they can be rejected over a background which is not white or gray by using an HSV (hue/saturation/value) decomposition of the RGB (red/green/blue) values and selecting pixels which are the lowest value or the lowest saturation.

Figure 10:
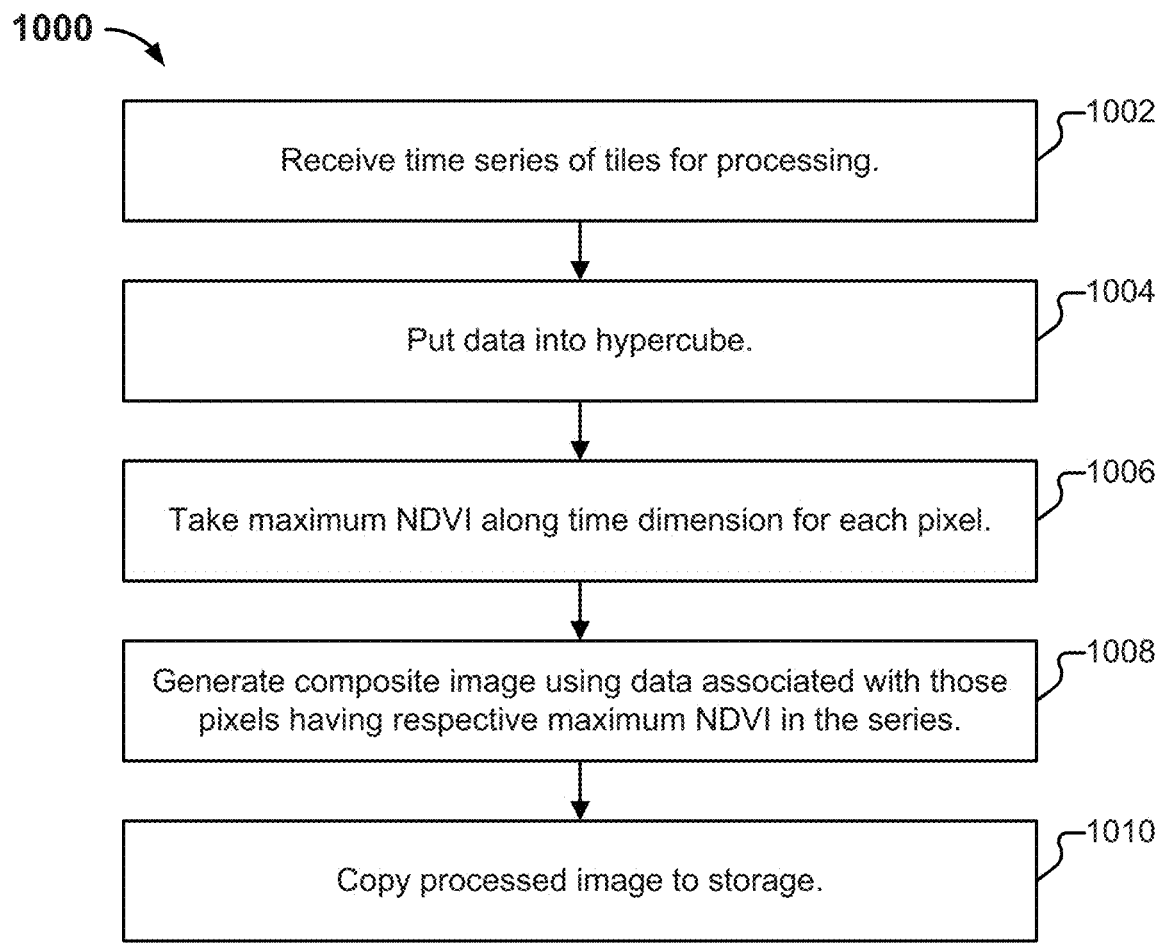
FIG. 10 illustrates an example of a process for creating a composite image.

FIG. 10 illustrates an example of a process for creating a composite image. In various embodiments, process 1000 is performed by image creator module 318.

The process begins at 1002, when a first tile is received for processing, and the previous fifteen (or other appropriate number of) tiles in a time series are also received. As one example, at 1002 image creator module 318 (comprising one or more Google Compute Engine instances and a Celery master) determines that a recently preprocessed tile (e.g., an output of pre-processor module 310) is available and retrieves that tile for additional processing. The images corresponding to the previous fifteen days' worth of that particular tile are also retrieved. As another example, predetermined time sequences of tiles (e.g., days 0-15, 16-31, etc.) are selected for processing (e.g., as the days elapse). Other size bins of data (i.e., other than 16 days) can also be used. Further, different size bins can be used for different regions (e.g., larger bins for cloudier areas) and/or different times of year (e.g., smaller bins in fall and larger bins in spring, where there are fewer clouds in a region in the fall than in the spring). Further, the images included in a bin need not be adjacent temporally. For example, a ten year stack of tiles from the same day of the year (e.g., Jan. 1, 1990; Jan. 1, 1991; Jan. 1, 1992; etc.) can be used as a bin, as can an arbitrary number of tiles selected at arbitrary intervals (e.g., depending on the application).

At 1004, a data hypercube is created by stacking each of the multi-band image tiles in the bin. In one example, the data hypercube created at 1004 is 4-dimensional, with the dimensions being pixel dimension (e.g., Red, Green, Blue, Near-Infrared, NDVI, Collection date), x-dimension, y-dimension, and time dimension. In various other embodiments, additional and/or different bands comprise the multi-band information included in the data hypercube. As process 1000 progresses, the time dimension is compressed to a single layer, and the data is reduced to a cube of values, or a 2-dimensional plane for each image component as applicable.

At 1006, the maximum NDVI is taken along the time dimension (e.g., by a python script). As a simplified example of the processing performed at 1006, suppose the data being operated on at 1006 includes a 3×3 image plane for the NDVI component on a particular day, and that only a total of two days' worth of tiles are used in the time series. Example data for a first day is as follows:

0 143 199
10 155 202
12 147 198

Example data for the second day for the NDVI plane is as follows:

20 122 204
10 157 199
11 141 206

After taking the maximum NDVI over the two days, the image plane would be:

20 143 204
10 157 202
12 147 206.

At 1008, a composite image is generated. As mentioned above, the maximum NDVI is used to determine, for a given pixel position (e.g., 1×1, . . . 3×3), which image's pixel in that position was the most cloud free in the time series. At 1008, the spectral information (e.g., any/all of RGB, NDVI, Infrared, etc.) associated with the "best" pixel (e.g., the one having the maximum NDVI for that pixel position in the set) is used to generate the composite image.

In various embodiments, additional metadata is included in the composite image. For example, the particular day of the year that was selected as the "best" for each pixel can be stored (e.g., day 203). As another example, the total number of valid observations that were considered can be stored. An example of a "valid" observation is any of the non-zero observations seen in FIG. 9 (i.e., not 904 or 906). In various embodiments, other processing (e.g., downstream of process 1000) can make use of the number of valid observations. For example, if out of 20 observations, only two are deemed valid, this could indicate a particularly stormy set of weeks (and that the maximum value recorded for that pixel during those two weeks is not likely to be representative of a cloud free image). A later process can have a requirement that (e.g., a minimum of three valid observations be seen in order for that pixel in that particular composite image to be considered representative.

Finally at 1010 the processed image is stored (e.g., to storage 312). The following is an example file name for a composite image file:

gs://modis-max/utm_v7r_max/2015/
    max_2015_df200_15N_03_v7r.tif

The components of the path name are:
gs://: Google Storage designator
modis-max:storage bucket for
utm_v7r_max: type and version
2015: year
max_2015_df200_15N_03_v7r.tif: file name, with day=200, 15N-zone, and row=3

In some embodiments, there is one composite image per tile per day, with approximately 1200 MODIS tiles covering the globe. The resulting composite image can store a variety of features in a single or multiple bands as applicable. For example, the resulting composite image can store a single scalar feature in a single band, or can store one or more vector features in multiple bands.

A variety of analyses/manipulations can be performed using data such as the image data stored in storage 312, whether in conjunction with process 1000 (e.g., as one or more additional steps), or as a separate process (e.g., after the storing performed at 1010, or entirely independent of the execution of process 1000). Further, data from one (e.g., MODIS), or multiple (e.g., MODIS and Landsat) sources can be operated on during embodiments of process 1000, whether individually or in combination.

A variety of example applications using a variety of such techniques are described below. As one example, an image (or set of images, as applicable) can be used to generate a boundary map (an example of which is a field map). The boundary map can be used in a variety of ways. As one example, the map can be used to reduce the noisiness of an image. As a second example, the map can be used in image restoration to reduce artifacts. A boundary map can be also used as a mask to classify regions of an image (e.g., to produce an image of average values within the boundary or otherwise homogenize the pixel values for at least one band of information within the boundary, such as by taking a median value, a minimum value, etc.).

IV. Creating a Boundary Map

Some imagery applications work on an image as a whole. As one example, an image search application may take as input a photograph of a giraffe, and provide as output other photographs of giraffes selected from a corpus of photographs. As another example, in some applications (e.g., involving remote-sensing imagery) it is desirable to operate on the smallest area of an image possible (e.g., at the pixel level, which typically corresponds to the smallest area resolvable by the imaging sensor). For yet other applications however (e.g., various applications involving land use classification), it can be more desirable to operate over regions larger than a pixel (but smaller than the image as a whole).

Returning to the example of FIG. 8A, suppose field 808 is a corn field, as is field 818. Field 822 is a soybean field. Each of fields 808, 818, and 822 is an example of a "Common Land Unit (CLU)," described by the Farm Service Agency (FSA) as an individual contiguous farming parcel that has a permanent, contiguous boundary, a common land cover and land management, and a common owner and/or common producer association. The boundaries of a CLU are generally delineated from relatively permanent features such as fence lines, roads, and/or waterways. More generally, as used herein, a field is an example of a region bounded by edges that are temporally persistent.

In various applications, the ability to treat a given pixel as being part of a particular region would be desirable. For example, agricultural land use will generally be uniform over a given field, which will typically occupy multiple pixels in a particular image. Processing each pixel independently can thus be (1) unnecessarily computationally expensive, to the extent that the results of the processing produce different outcomes for a field's pixels, and (2) will also necessarily be needlessly inaccurate. By incorporating the knowledge that groups of pixels should be considered collectively, more accurate results can be produced, with greater efficiency. Accordingly, being able to treat all pixels (e.g., pixel 824) within a given region of a satellite image (e.g., within field 822) uniformly can be beneficial (e.g., when classifying field 822 as containing soybeans vs. corn vs. water). When examining the image depicted in FIG. 8A for land use classification purposes, all of field 808 should be designated "corn field," as should all of field 818. All of field 822 should be designated soybeans.

The USDA makes CLU data available (e.g., as CLU maps). Unfortunately, access to CLU data is restricted to entities certified by the FSA as working in cooperation with the Secretary of Agriculture. A company (or individual), such as an environmental research company or a land use planner (unaffiliated with the Secretary of Agriculture) will accordingly be unlikely to benefit from CLU data.

Even where an entity has access to CLU data, such data has various limitations. As one example, CLU data can become stale. An entity wanting a current boundary map for a particular region (e.g., where land usage has changed and/or where existing CLU data is inaccurate) may have to wait a year or longer for an updated set of government-provided CLU data. As another example, non-agricultural land uses (e.g., rivers, lakes, residential development, industrial development, mines, etc.) are outside the narrow definition of a CLU, as are farming plots outside of the United States and/or potentially American farming plots not associated with the FSA/USA. The ability to uniformly treat all pixels bounded by house 814 (e.g., including pixel 826), or all pixels bounded by river 812 (e.g., including pixels 828 and 830) can be beneficial, despite those regions not representing CLUs.

Using techniques described herein, boundary maps can be created, e.g., from imagery stored in storage 312. In addition to delineating CLUs (also referred to interchangeably herein as "fields"), boundaries of other types of contiguous land use (e.g., forests, grasslands, mines, parking lots, etc.) can also be determined. Further, the approaches described herein can be applied to other forms of imagery (e.g., other than land observations). Accordingly, as used herein, "fields," "regions," and "segments" will generally be used interchangeably, with a CLU being an example of a field/region/segment. While various examples described herein will refer to agricultural fields (e.g., a corn field adjacent to another corn field or a soybean field), "fields" (and the approaches described herein) are not limited to an agriculture context.

A first step in extracting fields (e.g., as a dataset) is to find their boundaries. As mentioned above, field boundaries manifest themselves in satellite imagery as edges that are temporally persistent. That temporal persistence, together with the ability to analyze a stack of satellite images, allows field boundaries to be distinguished from edges arising from ephemeral phenomena (e.g., clouds).

The source imagery for boundary map creation can include satellite imagery from any of several different sources, each of which have been preprocessed and divided into uniform tiles, and stored in Google Cloud Storage (GCS) buckets (e.g., as described above). Images can come from government sources (e.g., Landsat, NAIP) and/or 3rd-party sources (e.g., Planet Labs, RapidEye), as applicable. It is to be noted that while cloud removal has been described as a technology that can be applied to imagery data (e.g., stored in storage 312), cloud-free images are not necessary as input to the applications described below.

One approach to mitigating the effects of cloud and other image clutter is to average pixel values over many images, taken over a long time interval. However, averaging also tends to diminish differences between fields. Adjacent fields with different land uses can look very similar after averaging, diminishing the strength of the edge between them. An alternate approach is to determine edges for each image of a temporal stack, and then average the results over time. While field boundaries may be obscured in some images, over a long enough period of time, they will appear in a greater fraction of the images than ephemeral edges.

The pixel values of a satellite image can be regarded as samples of an underlying function $f(x, y)$, defined at every point on the ground contained within the image. In terms of this function, the values of $f(x, y)$ will change much more at a field boundary than within a field. This can be measured by computing $|\nabla f(x, y)|$. Edges can be characterized as those points $(x, y)$ for which $|\nabla f(x, y)|$ is large, whereas within a field, the gradient will be zero (in an ideal case).

For images, the points $(x, y)$ are only defined at discrete points $\{x_1, x_2, \ldots, x_M\}$ and $\{y_1, y_2, \ldots, y_N\}$. Finite differences can be used to approximate $$\nabla f(x, y) = \left(\frac{\partial f}{\partial x}(x, y), \frac{\partial f}{\partial y}(x, y)\right):$$

$$\frac{\partial f}{\partial x}(x_i, y_j) \approx f(x_{i+1}, y_j) - f(x_i, y_j) = D_x f(x_i, y_j), \quad (1)$$

$$\frac{\partial f}{\partial y}(x_i, y_j) \approx f(x_i, y_{j+1}) - f(x_i, y_j) = D_y f(x_i, y_j). \quad (2)$$

(For i=M or j=N, Neumann boundary conditions can be used. That is, $D_x f(x_M, y_j) = 0 = D_y f(x_i, y_N)$ is assigned.)

The discrete gradient magnitude:

$$|Df(x_i, y_j)| = \sqrt{|D_x f(x_i, y_j)|^2 + |D_y f(x_i, y_j)|^2}. \quad (3)$$

is defined for images with multiple spectral bands, so that each $f(x_i, y_j)$ is a vector $(f_1(x_i, y_j), \ldots, f_L(x_i, y_j))$, and $D_x f$ and $D_y f$ will be vector-valued as well. Then $|D_x f(x_i, y_j)|$ is the length of this vector:

$$|D_x f(x_i, y_j)|^2 = \sum_{k=1}^{L} (D_x f_k(x_i, y_j))^2, \qquad (4)$$

and similarly for $|D_y f(x_i, y_j)|$.

The finite difference operators $D_x$, $D_y$ are implemented using sparse matrices, so that the "differentiation" process includes reshaping an image $f$ into a vector, multiplying by the appropriate matrix, then reshaping back into an image. The construction of the sparse matrices is as follows. First, one-dimensional finite differencing (with Neumann boundary conditions) of a vector with K components is obtained with the following matrix:

$$B_K = \begin{pmatrix} -1 & 1 & 0 & 0 & \ldots & 0 \\ 0 & -1 & 1 & 0 & \ldots & 0 \\ \vdots & & \ddots & \ddots & & \vdots \\ 0 & \ldots & 0 & -1 & 1 & 0 \\ 0 & \ldots & 0 & 0 & -1 & 1 \\ 0 & \ldots & 0 & 0 & 0 & 0 \end{pmatrix}. \qquad (5)$$

Accounting for the location of indices to correspond to differentiation with respect to x or y is accomplished using Kronecker products. If $I_L$ denotes the L×L identity matrix, then for use with M×N×L images, $$D_x = (I_M \otimes B_N) \otimes I_L, \qquad (6)$$

$$D_y = (B_M \otimes I_N) \otimes I_L. \qquad (7)$$

This produces matrices that are (MNL)×(MNL) in size. They are constructed so that if $f$ is an M×N×L image, unwinding the pixel values of $f$ into a vector, multiplying this vector by the matrix, and then reshaping the product back into an image will give the desired finite-difference derivative.

A. Example Process

Figure 11:
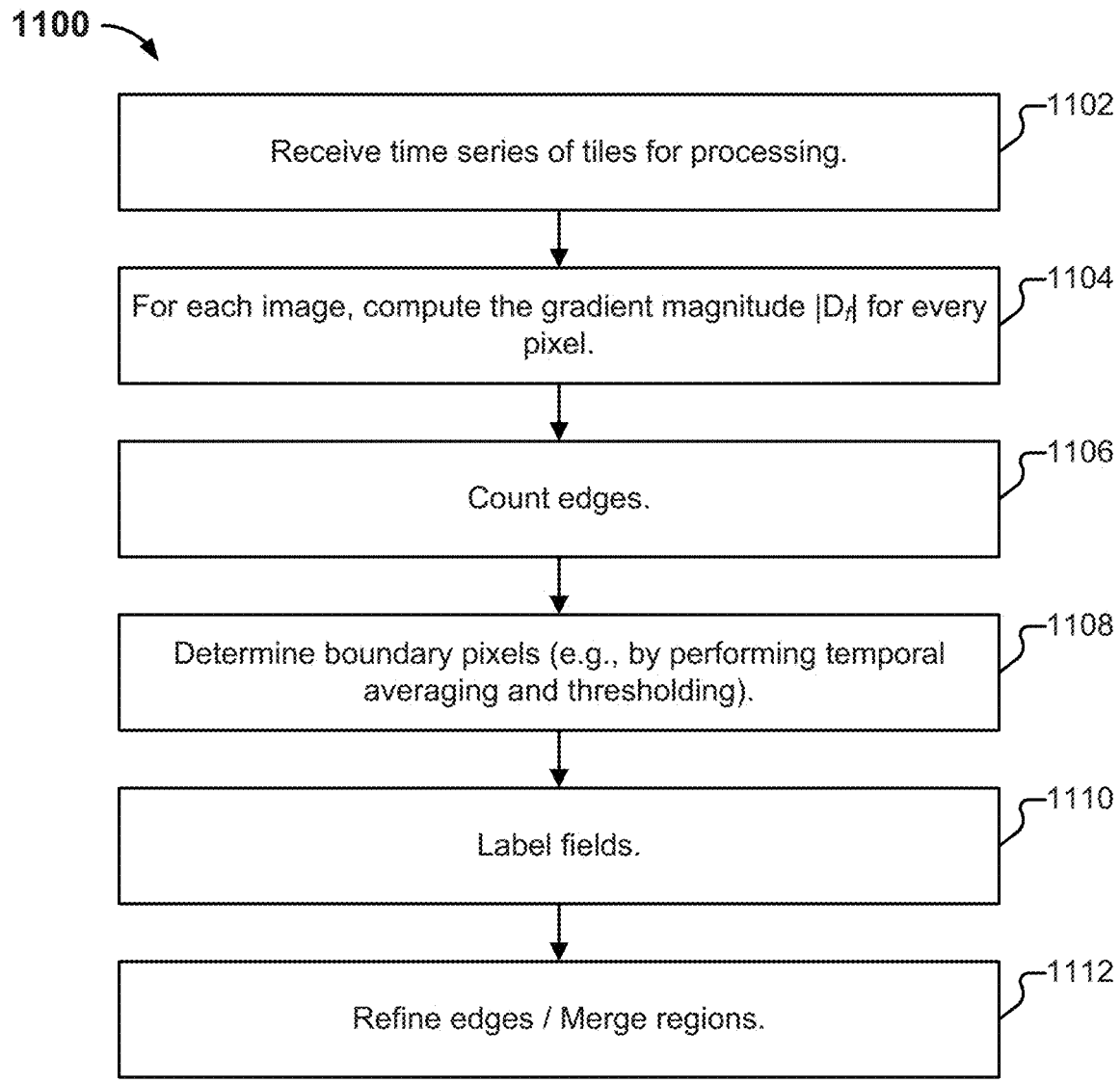
FIG. 11 illustrates an example of a process for creating a boundary map.

FIG. 11 illustrates an example of a process for creating a boundary map. In various embodiments, process 1100 is performed by boundary map creator module 320. The map is created by extracting fields from satellite images of a particular location, for which there may be many different observations over a period of many years. As will be described in more detail below, process 1100 can be terminated prior to the completion of the boundary map, as intermediate products (e.g., the output of portion 1108 of the process) are also useful for various applications.

One example way to implement boundary map creator module 320 is (as with other components of platform 302) to use a combination of python scripts and libraries (e.g., NumPy, sciPy, scikit-image). In particular, computation can be performed using a set of one or more Google Compute Engine virtual machine instances. Parallelization over tiles and dates (the latter for gradient computation, which is done independently with each image) can be performed using either a Celery master or with Bash shell scripts, depending on the geographic scope of the computation.

Figure 12B:
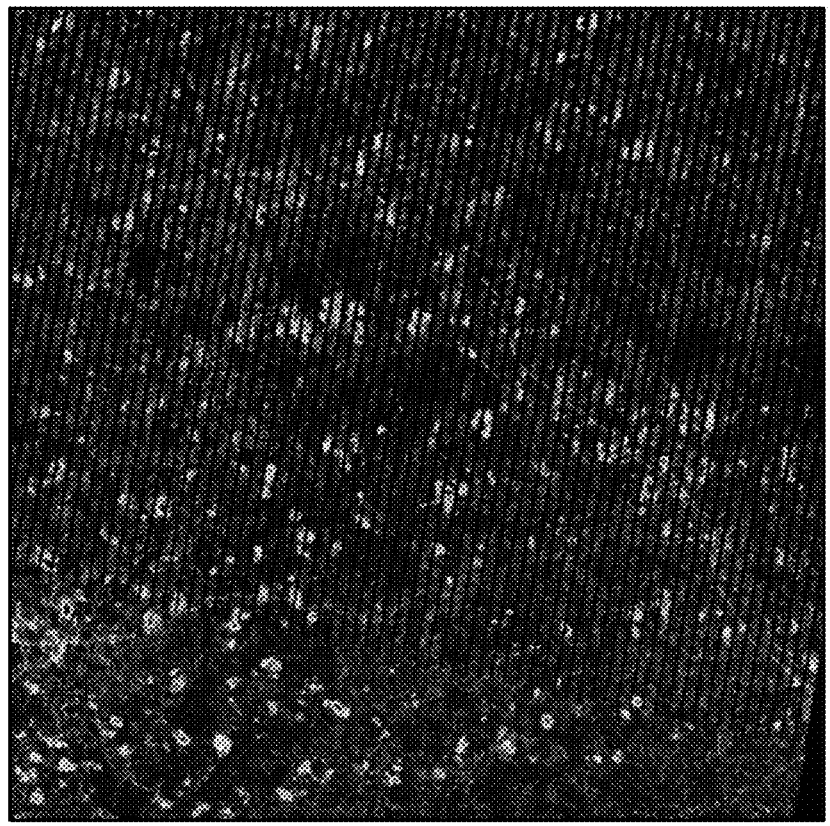
FIG. 12B depicts a gradient magnitude image.
Figure 12A:
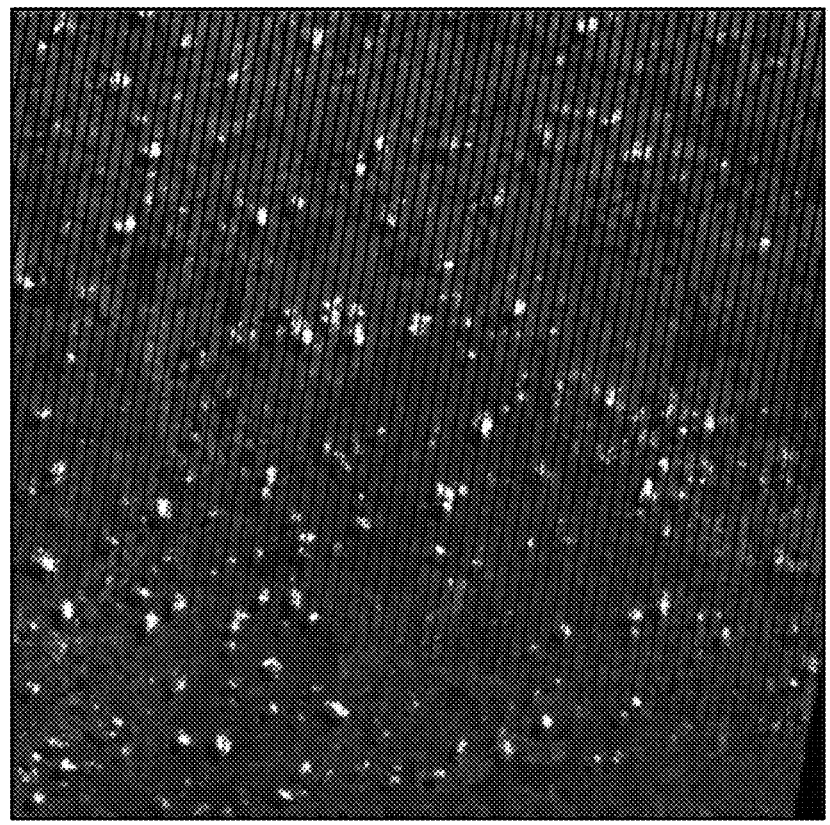
FIG. 12A depicts a portion of a Landsat 7 image.

The process begins at 1102, when a set of images corresponding to a particular tile is received. As one example, at 1102 boundary map creator module 320 receives an instruction (e.g., in response to the execution of a periodic script, or in response to a user request submitted via a web frontend) to generate a boundary map for a particular portion of land (e.g., by receiving a set of bounding coordinates, an identification of a particular tile identifier, etc.). A set of tiles corresponding to the location is retrieved for processing. As one example, suppose a request is received to generate a boundary map for the portion of land depicted in FIG. 12A. FIG. 12A is an example of a 2048×2048 sized portion of a Landsat 7 image and includes clouds, cloud shadows, incomplete tile coverage, and the scanline corrector artifact. At 1102, tile 1200 is retrieved, along with a time series of other tiles depicting that portion of land. In one example, fifteen years of imagery, with approximately forty observations a year, is retrieved at 1102 (approximately 600 images retrieved).

The scope of the set of tiles retrieved at 1102 can be adjusted as applicable (e.g., taking into account tradeoffs). The longer the time series (e.g., fifteen years vs. two years), the less likely it will be for clutter (e.g., scanline artifacts, incomplete tile coverage, clouds, etc.) to erroneously impact boundary lines. However, a longer time series can also result in reduced currency. For example, suppose a field was bisected three years ago (or its usage changed (e.g., from rural to urban)). When fifteen years of images are examined, the changes made three years ago may not be identified as sufficiently persistent. Similarly, boundary maps for portions of land that are generally less cloudy (e.g., portions of Arizona desert) may achieve results of similar quality to those of cloudier environments (e.g., portions of Colorado) with a smaller time series (e.g., three years of observations instead of fifteen). As yet another example, process 1100 can be performed using multiple kinds of observations (e.g., processed Landsat tiles and drone photographs that have been preprocessed to align with the portion of land being operated on). For example, a farmer or other entity may desire a highly accurate boundary map to be generated for a 50-mile radius of a particular grain elevator using a set of recent observations (e.g., obtained once a day over the last week via low flying aircraft).

At 1104, a gradient magnitude image is created for each image in the set of images retrieved at 1102. The gradient magnitude |Df| is computed for every pixel in a given image in the set of retrieved images of the location (e.g., using python code with a differentiation library and a sparse matrix library). A threshold value of |Df| that empirically provides a reasonable separation between edge pixels and within-field pixel fluctuations is selected. One example of such a threshold value is 50. It is also possible to leave |Df| unthresholded, or to use a threshold value of 0, and rely on temporal persistence to separate edge pixels from within-field pixel fluctuations. In the case of multi-band imagery, each band can be independently processed in accordance with process 1100, and the results can be variously combined. As one example, suppose a set of imagery includes six bands of spectral information. Six gradients can be respectively determined at 1104 (e.g., in parallel) for each of the six bands, and a six component vector generated. The gradient magnitude image created for each received image at 1104 can be stored in storage 312 (e.g., as a GeoTIFF image, preserving georeferencing information). FIG. 19B depicts a gradient magnitude image corresponding to the image depicted in FIG. 12A. The content of the image shown in FIG. 12B is the magnitude of the gradient at every pixel in image 1200 and summing over bands (resulting in a single band image).

Figure 13:
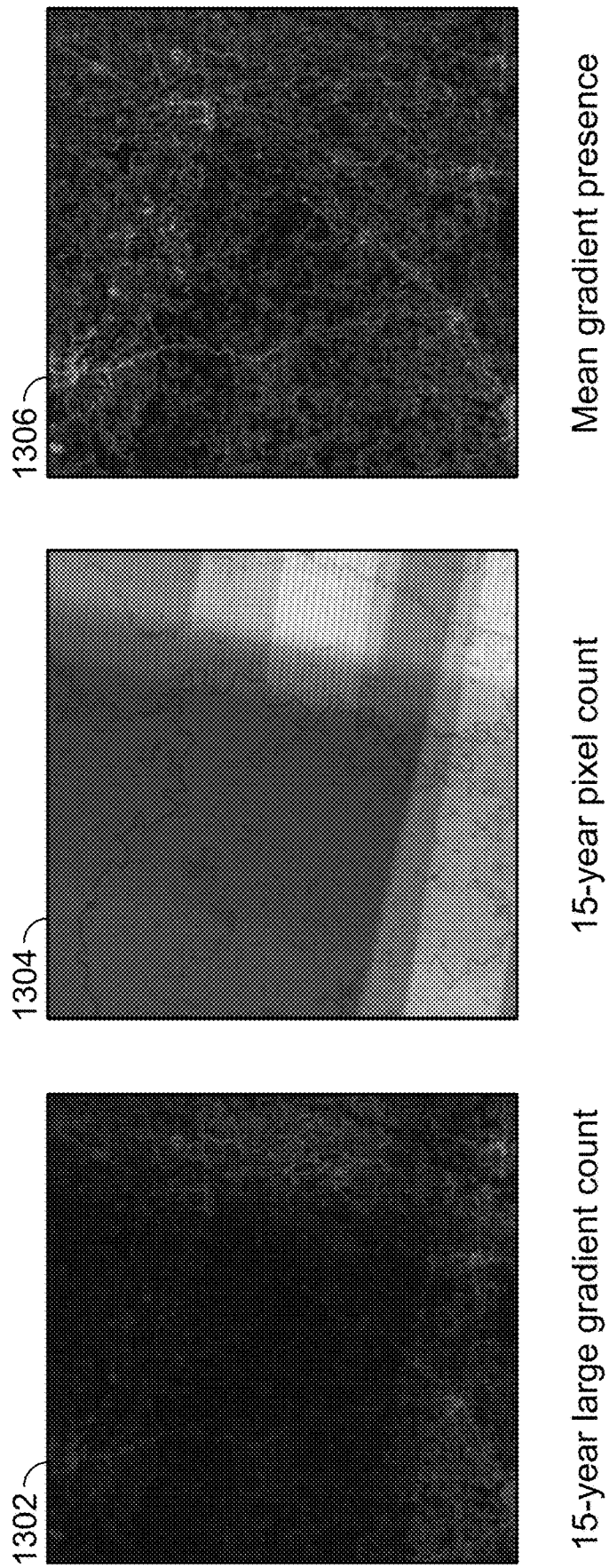
FIG. 13 depicts a gradient count image, a presence count image, and a gradient presence image.

At 1106, each of the gradient magnitude images (generated at 1104) is examined to tally the number of times a given pixel exceeds the gradient threshold. The edge count (across all the images in the set of retrieved images of the location) is saved as a gradient count image (e.g., as a GeoTiff image) in storage 312. An example of a gradient count image is shown at 1302 in FIG. 13. As shown at 1302, for each pixel, the brightness indicates how many times in the time series (e.g., set of 600 images) the pixel met the edge criteria (i.e., had a gradient magnitude that exceeded the threshold). As shown variously at 1302, structural outlines are present. Approximately 75% of the image (starting from the upper left corner of the image) is darker than the rest. The darkening is due to the Landsat pattern.

As mentioned above, in some cases, observational data for some pixels within a given observation may be missing. As one example, region 402 of the image depicted in FIG. 4A is a region where no data was available in a Landsat 1 MSS observation. If the observation depicted in FIG. 4A was the only observation used to make a boundary map, it might be the case that the edges of region 402 might erroneously be classified as edges. Where a time series of many tiles is used in process 1100, an occasional instance of missing observational data for a given pixel is unlikely to impact the final boundary map, as most of the other observations will contain usable data. It is possible, however, that many observations of the same region in a time series may be missing observational data. The varying intersection of an image with Landsat scenes means that some pixels are outside the intersection more often than others. Another issue is the scanline corrector artifact of Landsat 7, which affects some pixels more than others.

One approach to mitigating the erroneous classification as edges of the boundaries of observed pixels with pixels missing data is to tally the number of times each pixel is not within the NODATA region for each image. The presence count (across all the images in the set of retrieved images of the location) is also saved as an image. An example of a presence count image is shown at 1304 in FIG. 13. One way to determine which pixels are within the NODATA region is (e.g., during preprocessing of the image described above) to reserve a pixel data value of 0 for NODATA. A pixel for which data is present but the measured value is very low can be rounded up (if needed) to preserve the meaning of 0 as NODATA. As needed, the NODATA 0 value can be converted to a not a number (NaN) value for use in additional processing. As shown at 1304, for each pixel, the brightness indicates how many times in the time series (e.g., set of 600 images) the pixel was not in a NODATA region (i.e., data was captured by the imaging sensor for the pixel). As with 1302, as shown variously at 1304, structural outlines are present. And, approximately 75% of the image (starting from the upper left corner of the image) is darker than the rest. The darkening is due to the Landsat capture pattern. Further, scanline related errors are visible along the right side of the image as stripes, with some pixels having fewer observations than others due to obscuring by Landsat 7 artifacts.

The pixelwise quotient of the edge count and presence count (from the respective edge count image and presence count image) gives the frequency with which each pixel, when present, is considered to be an edge pixel (1306). This gives a measure of each pixel's edge persistence. Any arithmetic involving a NaN value will result in a NaN value (e.g., when the difference is taken), so the finite difference involving pixels in the NODATA region will also be a NaN.

Figure 15:
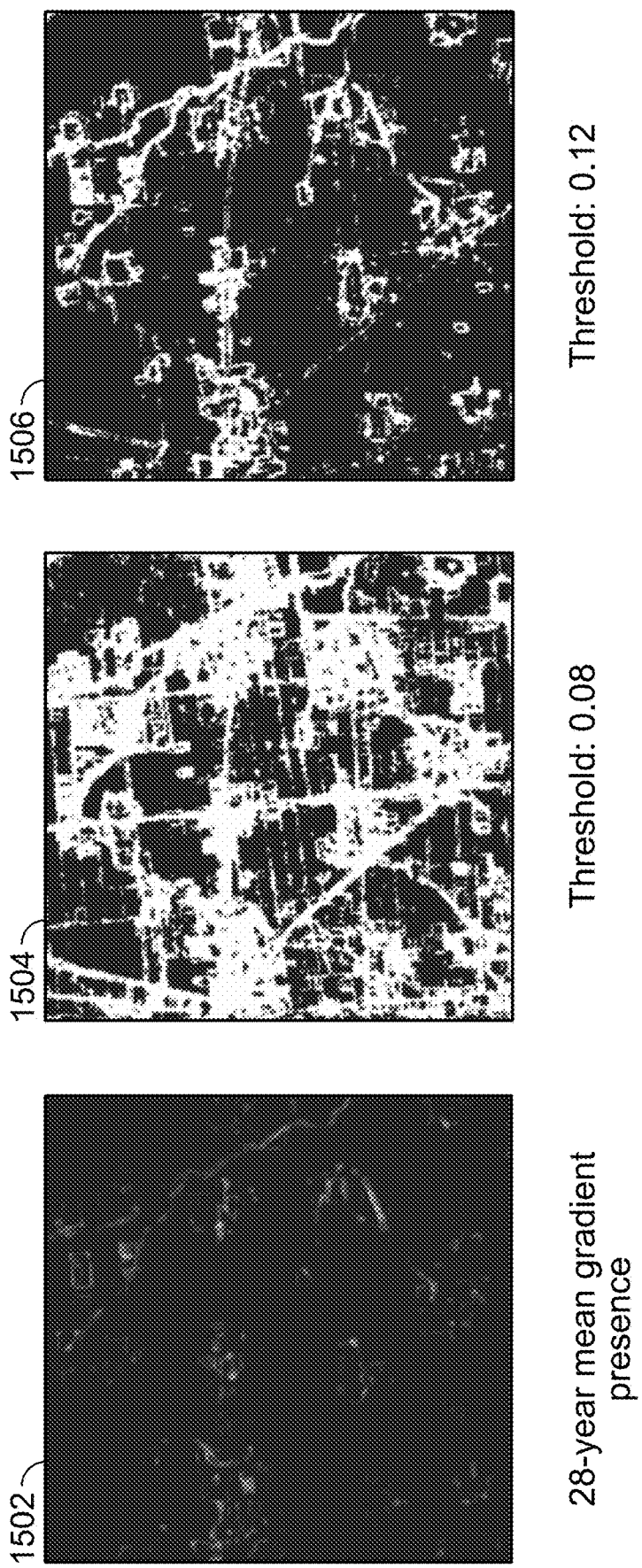
FIG. 15 depicts gradient presence images.

Suppose that the pixelwise quotient of the edge count and presence count for a given pixel is 0.20. This means that 20% of the time the pixel was observed, it was determined to be an edge pixel. A threshold for this quantity is chosen, and used at 1108 to make a final selection of those pixels that are considered to be part of field boundaries. The result is saved (e.g., in storage 312) as a binary GeoTIFF image, indicating which pixels are boundaries. Examples of two different thresholds (0.20 and 0.15) being applied to the same gradient presence image are shown in FIG. 14 (as image 1402 and image 1404). The tradeoff in selecting a threshold value is the inclusion of spurious edges (lower threshold) vs. edge incompleteness (higher threshold). FIG. 15 illustrates a 28-year mean gradient presence image of a portion of land in China at 1502. Greater cloudiness and smaller field sizes make boundary detection more challenging. Examples of two different thresholds (0.08 and 0.12) being applied to image 1502 are shown as image 1504 and image 1506.

The binary image generated as output at 1108 (an example of which is shown at 1306 in FIG. 13) can be used for a variety of purposes. One example is as a mask (e.g., indicating which portions of a region are edges/boundaries and, e.g., when the mask is inverted, which are not). Accordingly, in various embodiments, process 1100 ends at 1108, with the generation of a binary image such as image 1306.

The output of portion 1108 of process 1100 can be enhanced/refined, for example to generate a boundary/field map in which individual fields are identified and given labels. One approach is as follows. Take the set of identified non-boundary pixels (e.g., from the output of portion 1108), and separate them into connected components. One way to do this is using a Python package such as scikit-image, which provides image processing functionality (including for finding connected components) and uses NumPy arrays as image objects. Other packages providing morphological processing can also be used, as applicable (e.g., scipy.ndimage). At 1110, each such connected component is given a positive integer label as an identifier (e.g., using a "label" function made available by an appropriate Python package for labeling connected components). The set of pixels having a common label now constitute a field, and the boundary pixels are not (yet) assigned a field. The assignments are saved as an integer-valued image. FIG. 16, at 1602, depicts a set of fields (connected components) to which a random color map has been applied (i.e., with each pixel within an arbitrary field being colored the same as the other pixels in that field). Edges can be refined by alternately interpolating (1604) and redifferentiating (1606), described in more detail below.

Imperfections in the edge identification process can lead to issues such as excessively thick edges, and stray edge pixels wholly interior to fields. The boundaries can be optionally refined/improved (at 1112) using a variety of techniques. For example, skeletonizing can be used to thin edges to one-pixel thick, without changing connectivity. Interpolation can be used to assign field labels to each edge pixel, according to which field each edge pixel is closest to. Recomputing edge pixels, by once again computing gradients and assigning nonzero pixels to edges, allows refinement processing to be repeated. For example, portions 1104-1108 of process 1100 can be performed using the output of 1110. Different thresholds can be used, e.g., with the gradient threshold being set at ≥1. Such processing can be terminated variously depending on application. As one example, a final boundary map can be created after skeletonization, resulting in a boundary map with fields having a one-pixel-thick edge. As another example, a final boundary map can be created after interpolation, resulting in a boundary map with every pixel assigned to a field. As mentioned above, each field is assigned (e.g., via labeling) a positive integer value that can be used as a field ID or other label. One example of a format for a final boundary map is to save it as a raster image (e.g., in storage 312) which has a field ID for each pixel. The field ID (minus 1) can be used as an index for conversion between rasters and field-value arrays. In various embodiments, additional types of output are saved in conjunction with process 1100, such as a variety of shapefiles that describe different field polygons, and state rasters (e.g., comprising those fields within their boundaries). The shapefiles provide the vertices of polygons in geographical coordinates. In various embodiments, certain types of land use, such as urban areas and large bodies of water are not enclosed in any polygons and are left blank.

Process 1100 has been described thus far in terms of creating a boundary map for a single tile. A boundary map over a larger area can also be created (e.g., over a region such as a state) by merging smaller-scale maps. In various embodiments, the margining is performed at 1108, so that fields can be (re) labeled at the larger scale, and to avoid artificial boundaries at the edges of the smaller scale maps.

Portions of process 1100 are described above as being performed on all tiles in the set (e.g., 1102 where tiles are received, followed by 1104 where each image has a gradient magnitude determined for each pixel). As explained above, in some embodiments processing on all tiles is performed in parallel, e.g., with all tiles being retrieved at once, and then each of the retrieved tiles having per-pixel gradient magnitudes determined in parallel (e.g., using Celery architecture). In other embodiments, at least some portions of process 1100 are performed serially, e.g., with a single image being retrieved at 1102, and portions 1104-1106 performed with respect to that image, followed by a second image being retrieved at 1102 and portions 1104-1106 performed with respect to the second image, etc., until all images have been processed in accordance with portions 1102-1106 and processing continues (for the set) at 1108.

B. Example Application: Improving Classification

Certain portions of land, such as agricultural fields, are generally uniform in what they contain. For example, in a given farmer's field (e.g., a CLU), typically one type of crop (e.g., corn or soybeans) will be grown. And, typically, the contents within a given field are likely to change over time in the same way (e.g., grow at the same rate, produce the same yield, be affected by pests in the same manner, etc.).

A field will typically, when observed with remote imagery sensors, comprise several pixels. Some forms of image analysis operate at the pixel level (and, e.g., arrive at a per-pixel result). When each pixel of the field is analyzed (e.g., by a land use classification technique or set of techniques), it is possible that while most of the pixels within the field will be classified as corn, various stray pixels within the field may be classified as soybeans, whether due to errors in classification technique, limitations in the image(s) being analyzed, etc. As explained above, for some applications (e.g., land use classification and yield prediction), it may be desirable for results to be made uniform across an area (e.g., treating the field as the fundamental unit and/or arriving at a per-field result). As will be described in more detail below, boundary maps can be used (e.g., in conjunction with per-pixel analysis approaches) to achieve more uniform results.

Figure 17:
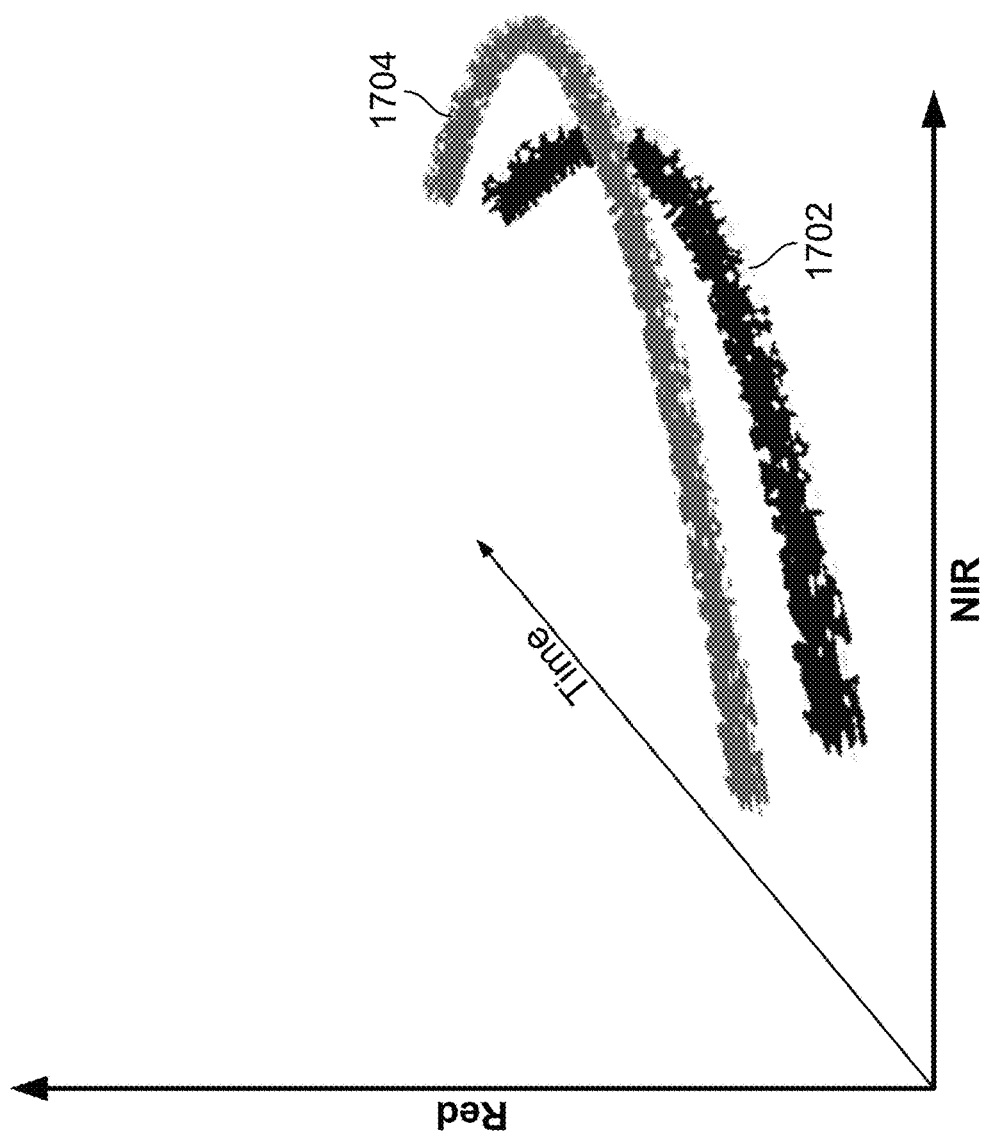
FIG. 17 illustrates a three-dimensional representation of how the spectral signatures of two different crops change over time during a typical growing season.

As shown in FIG. 3, platform 302 includes a classifier 322 (e.g., a land use classifier) that can classify portions of land. One way to implement classifier 322 is as a python script (or set of scripts). In various embodiments, classifier 322 takes as input an identification of a portion of land (e.g., a particular tile identifier, set of coordinates, etc.) and evaluates the land using a model 324. Model 324 is trained using a training set of imagery (and optionally additional data) for which land use classification has already been performed, and an appropriate machine learning technique, such as a random forest (e.g., using functionality provided by scikit-learn). FIG. 17 illustrates a three-dimensional representation of how the spectral signatures of two different crops (corn 1702 and soybeans 1704) change over time during a typical growing season. In particular, FIG. 17 tracks the brightness of a corn pixel and a soybean pixel, respectively, in the red and near infrared spectral bands, over time. Other bands can also be used instead of/in addition to the spectral bands represented in FIG. 17, and four-dimensional and other representations constructed similarly to what is depicted in FIG. 17.

Different types of land cover (e.g., corn, vs. soy, vs. forest, vs. pavement, etc.) will trace out different curves in a space such as is depicted in FIG. 17 (also referred to herein as "light curves"). The differences in such curves can be used in machine learning training (e.g., using a random forest and/or support vector machine) to differentiate between the different kinds of land usage and ultimately to classify images accordingly. Light curves can also be indicators of how healthy a crop is, and/or to predict yield. As one example, during the growing season, when a plant starts photosynthesizing actively, it becomes much more reflective in the near infrared than it is in the red, and so its NDVI values increase. As the plant matures, the NDVI value will increase even further, and then begin to plateau. Eventually, as the plant begins to brown, the NDVI will start to decrease, and, when the plant is harvested or otherwise removed from the land, the NDVI will drop significantly.

Figure 18A:
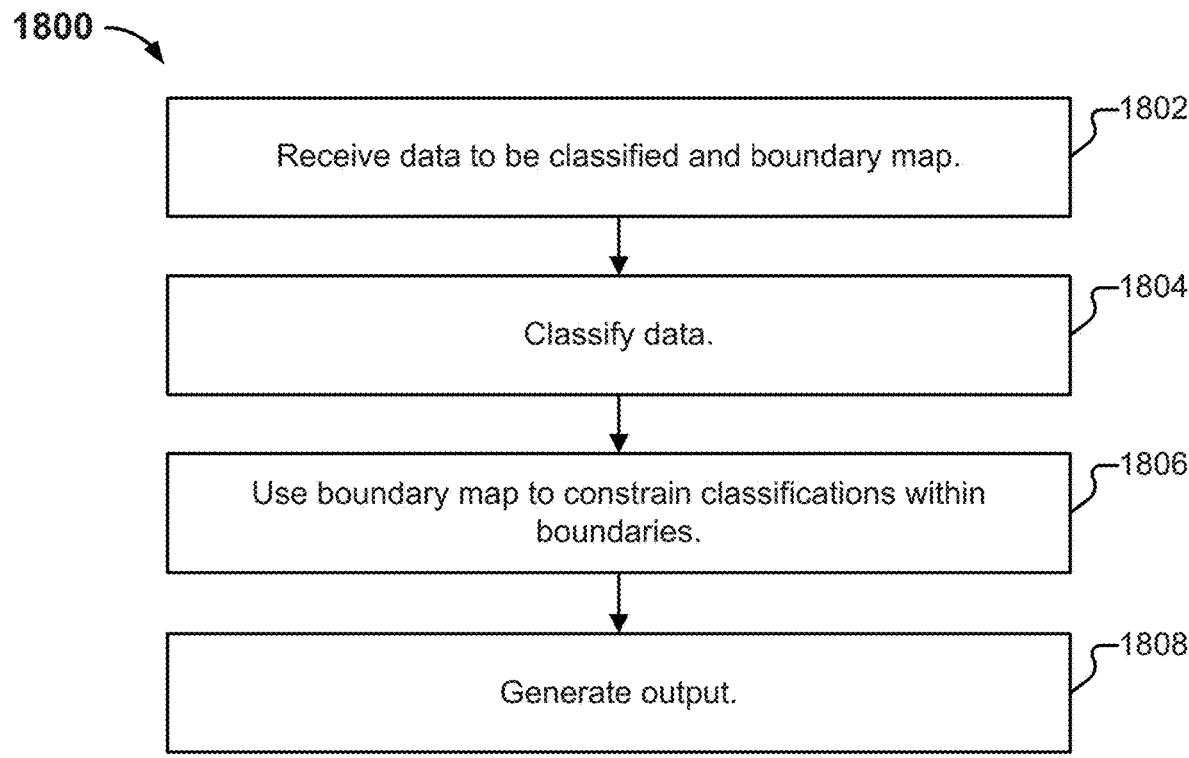
FIGS. 18A and 18B illustrate example processes for enhancing a classification using a boundary map.
Figure 18B:
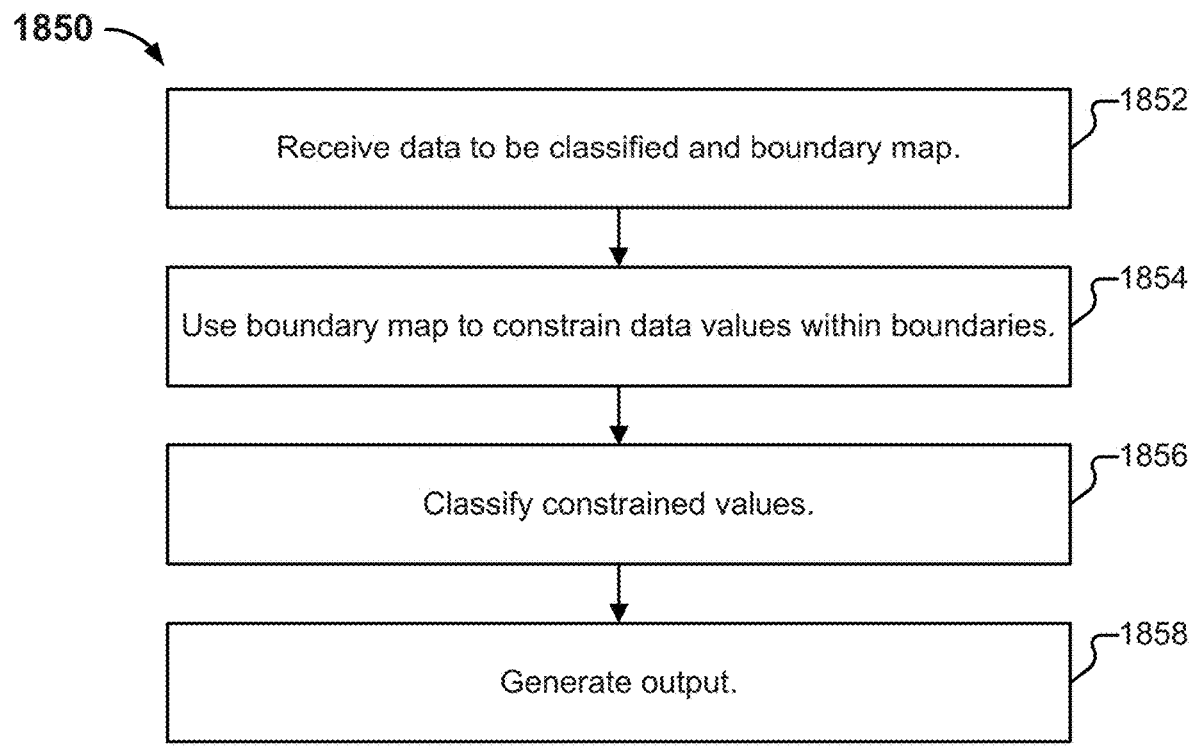

One approach to classifying land is to independently evaluate each pixel (e.g., using model 324) and classify each pixel (e.g., as corn, water, road, etc.) accordingly. A boundary map, such as one produced in accordance with process 1100, can be used as an additional input to classifier 322, to help improve the classification results. The boundary map can be applied after an initial classification is performed (FIG. 18A). The boundary map can also be applied prior to classification (FIG. 18B). Further, the boundary map can be used in conjunction with other types of analysis, such as yield estimation.

FIG. 18A illustrates an example of a process for enhancing a classification using a boundary map. In various embodiments, process 1800 is performed by classifier 322. The process begins at 1802 when data to be classified, and a boundary map, are received. One example of the data received at 1802 is a time series depicting the region shown in FIG. 8A across a time window such as a month, or a year.

At 1804, the data received at 1802 is classified. As one example, for each pixel in a given position (e.g., pixel 1,1 across all received images) classifier 322 evaluates the data associated with the pixel and assigns a classification. Examples of such data include a single spectral band (e.g., Near Infrared), a set of bands (e.g., all Landsat bands), and/or data from other sources associated with the pixel (e.g., a vector of statistical information such as rainfall statistics, ground temperature, etc. mapped to each pixel).

Figure 19:
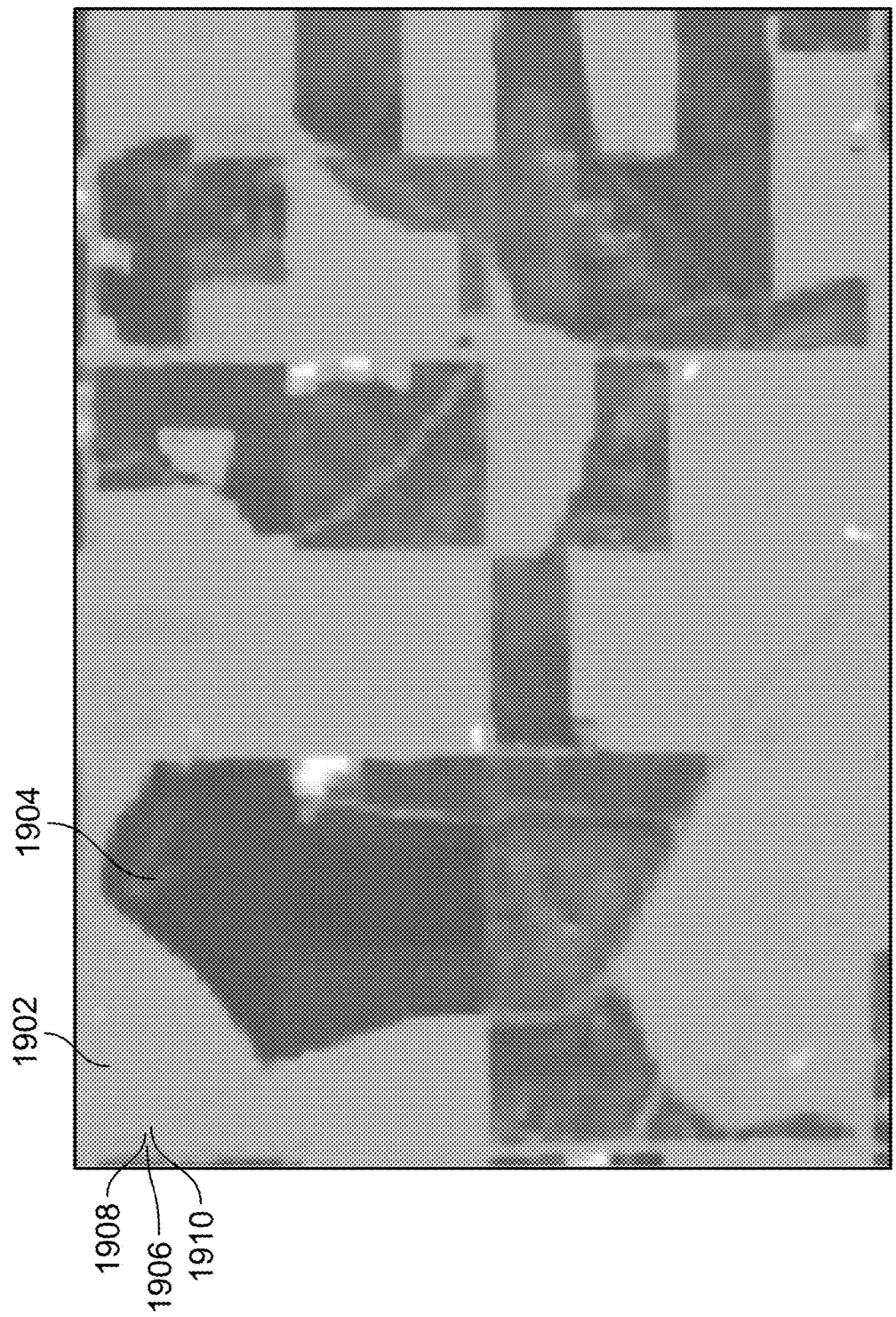
FIG. 19 depicts various fields in Iowa.

FIG. 19 depicts various fields in Iowa, including corn fields (1904) and soybean fields (1902). Suppose classifier 322 is examining a stack of images corresponding to the land shown in FIG. 19. It classifies the land covered by pixels 1906 and 1910 as soybeans, but classifies the land covered by pixel 1908 as corn. It is possible that the land covered by pixel 1908 is in fact corn. It is also possible that a problem with the data and/or a problem with the classifier erroneously resulted in pixel 1908 being classified as corn. Irrespective of the reason pixel 1908 is identified as corn, for many applications, it would be desirable for pixel 1908 to be identified as soybeans.

Returning to process 1800, a boundary map can be used to constrain classification results so that, given a statistic or set of statistics associated with a given pixel in a time series, the results will be uniform over a field. For certain types of data (e.g., used in a field classification), each pixel within a field (e.g., sharing the same field ID) can vote for the value that should be applied to the field as a whole. So, for example, if 95% of the pixels within a field are classified as soybeans, and 5% are corn (or other classifications) at 1804, all pixels within the field boundaries can be classified as soybeans at 1806.

Other kinds of analysis can also be performed in accordance with process 1800 and process 1800 can be adapted as applicable. As one example, statistics such as rate of growth may be computed, per pixel, for the time series at 1804. And, at 1806, the average value can be determined across all pixels within each field.

Classifier 322 can generate a variety of different types of output at 1808 as applicable. For example, classifier 322 can generate a classification map (e.g., in GeoTIFF format) which identifies, at each pixel in the image, a numeric value corresponding to the land use classification determined by the classifier. In various embodiments, classifier 322 is trained using up to 256 classes (covered by an unsigned 8-bit integer) with, for example, "01" representing corn, "02" representing soybeans, "03" representing wheat, "04" representing evergreen trees, etc.

Classifier 322 can also generate, for each/arbitrary classifications, a binary mask (e.g., corn mask indicating whether a given pixel is corn (value=1) or not (value=0); a soybean mask indicating whether a given pixel is soybeans (value=1) or not (value=0); etc.). As another example, instead of (or in addition to) conclusively assigning a particular label ("01") to a given pixel, classifier 322 generates a probability (or confidence) that a particular pixel is a given classification. In this scenario, the land covered by an arbitrary pixel might be 78% likely to be corn (corn=0.78), 15% likely to be soybeans (soybeans=0.15), 4% likely to be wheat (wheat=0.04), etc. In this scenario, classifier 322 can optionally select as a classification for the pixel the land use that has the highest score (subject to a threshold, such as 40% confidence). As yet another example of output that can be generated at 1808, classifier 322 can store (e.g., in a table or other appropriate data structure) a classification for a given field ID, without (or in addition to) generating a classification map. (E.g., with an arbitrary field identified as fieldID=233982 having a classification of "02" and another field identified as fieldID=233983 having a classification of "01").

The output of classifier 322 can also be consumed by other processes/components of platform 302 for a variety of purposes. As one example, yield predictor 326 (a script or set of scripts) can take as input classification data (from classifier 1222) and additional data such as rainfall/sunlight, and light curve information for a given region, to generate yield estimates for the region (e.g., using a model 328 trained using historical information).

FIG. 18B illustrates an example of a process for enhancing a classification using a boundary map. In various embodiments, process 1850 is performed by classifier 322. The process begins at 1852 when data to be classified, and a boundary map, are received. One example of the data received at 1852 is a time series depicting the region shown in FIG. 8A across a time window such as a month, or a year.

At 1854, a boundary map is used to constrain the values that will be input into classifier 322. As one example, at 1854, for each image in the time series received at 1852, the average value across all pixels within a particular field is set as the value for each pixel within the field. Suppose, for a single image in a time series of images, pixel 1906 has a green channel value of 0.90, pixel 1908 has a green channel value of 0.60, and pixel 1910 has a green channel value of 0.80. At 1954, a green channel value of 0.77 will be set for all three pixels (1906, 1908, and 1910), prior to being provided to classifier 322. Average values for other channels will similarly be applied to pixels 1906, 1908, and 1910. (It is to be noted that the average value will be taken across all pixels within a given field, not just pixels 1906, 1908, and 1910. Values for the remaining pixels have been omitted for simplicity.)

At 1856, classifier 322 classifies the results of the processing performed at 1854. Specifically, classifier 322 will operate on the average value for each pixel in a given field, across the time series. As with process 1800, other kinds of analysis can also be performed in accordance with process 1850 and process 1850 can be adapted as applicable. And, as with process 1800, classifier 322 can generate a variety of different types of output at 1858 as applicable, including classification maps, tables of classifications, etc.

Figures 20A, 20B, 20C:
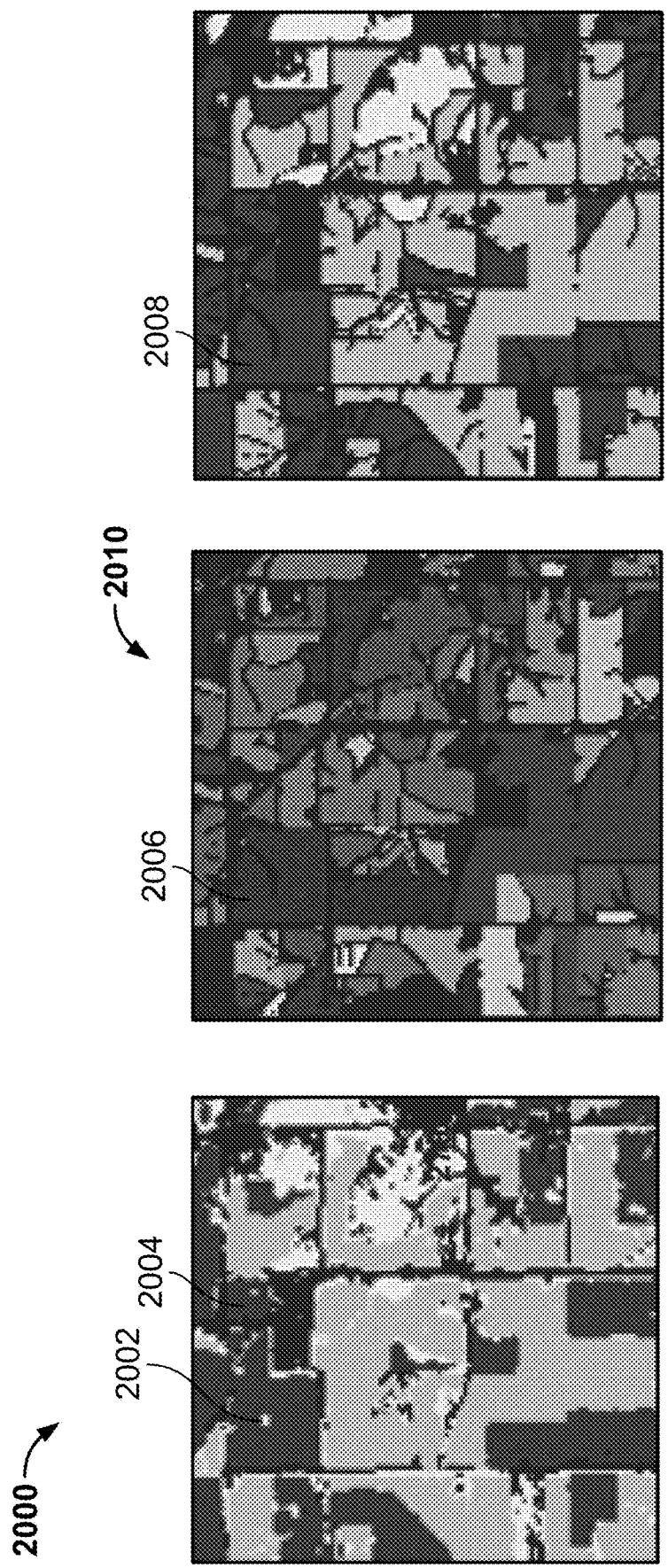
FIG. 20A illustrates an example of a portion of land classified without use of a boundary map.
FIG. 20B illustrates an example of a boundary map.
FIG. 20C illustrates an example result of providing the time series used to produce a classification map, and a boundary map, to a classifier.

FIG. 20A illustrates an example of a portion of land classified without use of a boundary map (e.g., using classifier 322 on a time series of data without using a boundary map). As seen at 2002, a single pixel (or small set of pixels) has been classified as one type of crop in classification map 2000, but is surrounded by pixels classified as a second type of crop (in region 2004). FIG. 20B illustrates an example of a boundary map for the scene depicted in FIG. 20A. Boundary map 2010 is an example of a map that can be produced in accordance with process 1100. As shown in FIG. 20B, region 2006 is a single field. FIG. 20C illustrates an example result where the time series data used to produce the classification map 2000 and boundary map 2010 are both provided to classifier 322. As shown in FIG. 20C, all pixels in region 2008 are classified as the same crop. FIG. 20C depicts a classification map, which is an example of output producible using either process 1800 or 1850 (at 1808 or 1858).

C. Example Applications: Correcting Artifacts, Upsampling Images, and Denoising Images Boundary maps, such as those that can be created using embodiments of process 1100, can be used to improve land use classification results (e.g., as explained in conjunction with FIGS. 18A and 18B). Boundary maps (whether made in accordance with embodiments of process 1100 or otherwise provided, e.g., as CLU data) can also be used in other applications to improve other kinds of results. Examples of such other applications include correcting artifacts such as scanline correction errors, upsampling images, and denoising images.

Figure 21C:
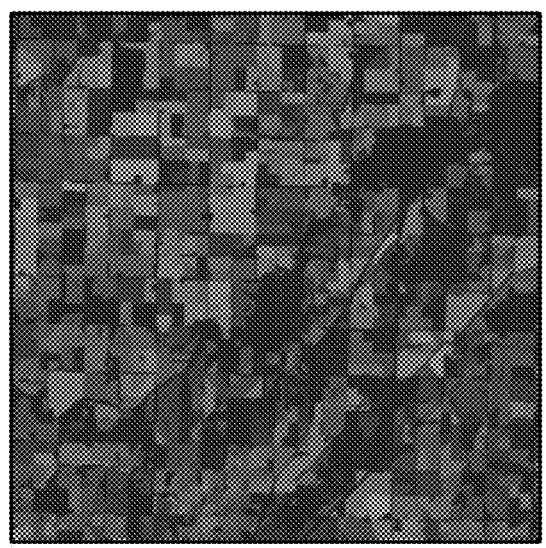
FIG. 21C illustrates a result of providing the image shown in FIG. 21A and the boundary map shown in FIG. 21B as input to process 2300.
Figure 21B:
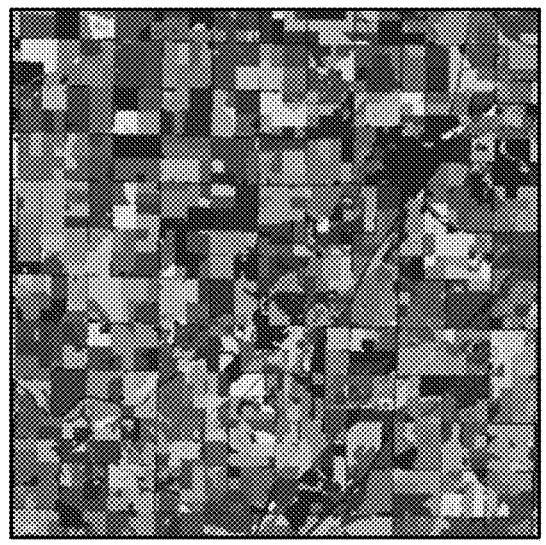
FIG. 21B depicts a boundary map.
Figure 21A:
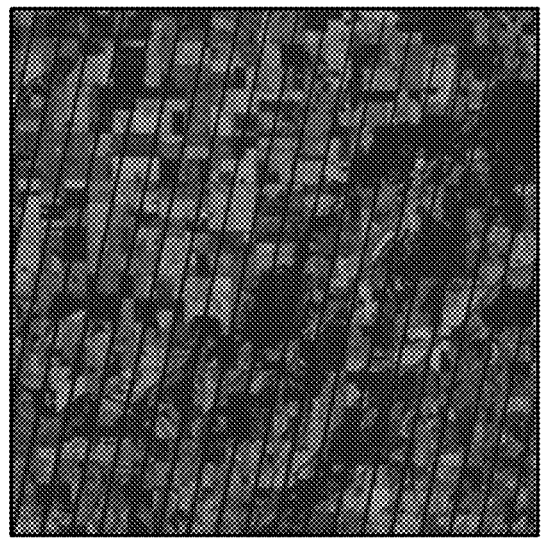
FIG. 21A depicts a Landsat 7 image.
Figure 22C:
FIG. 22C illustrates a result of providing the image shown in FIG. 22A and the boundary map shown in FIG. 22B as input to process 2300.
Figure 22B:
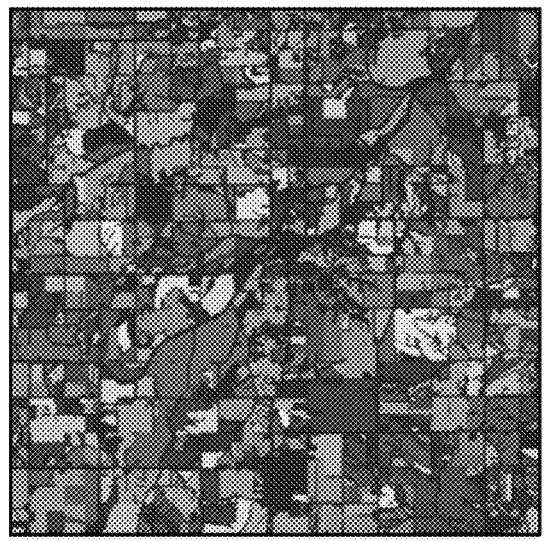
FIG. 22B depicts a boundary map.
Figure 22A:
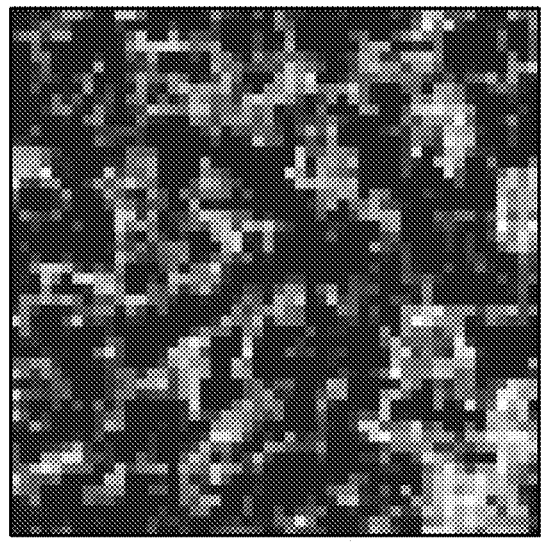
FIG. 22A depicts a portion of a MODIS image.
Figure 24B:
FIG. 24B shows a zoom into FIG. 24A.
Figure 25:
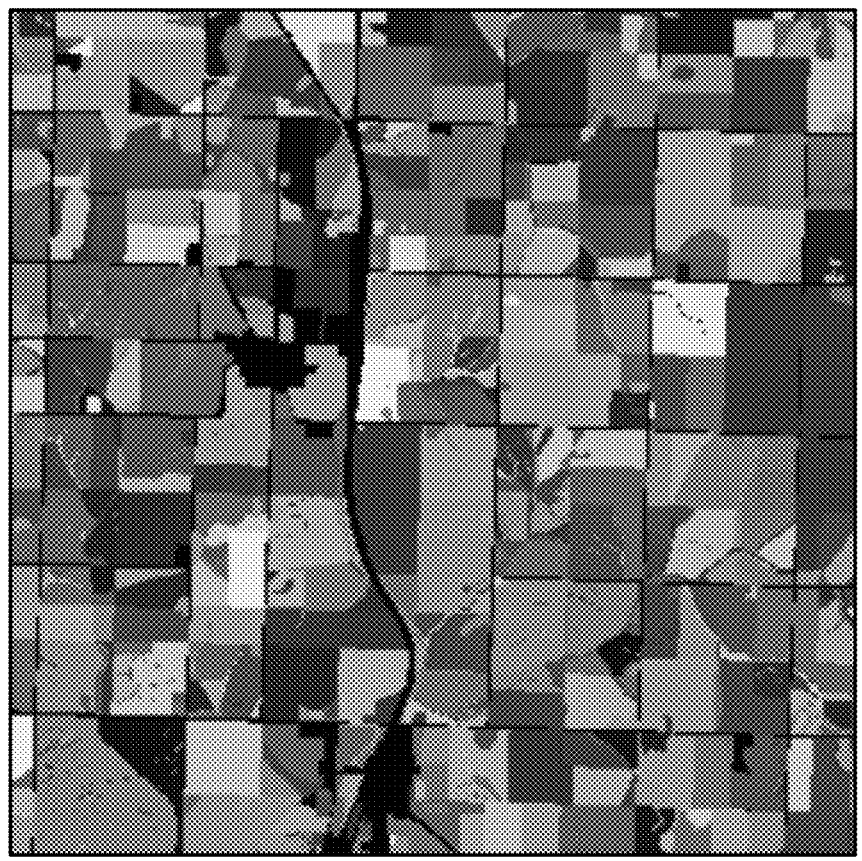
FIG. 25 illustrates an example of a boundary map.

FIG. 21A depicts a Landsat 7 image that includes (as diagonal black lines) scanline correction artifacts. FIG. 22A depicts a portion of a MODIS observation. FIG. 24B depicts a noisy observation by Sentinel-1 of a portion of land. FIGS. 21B, 22B, and 25 respectively depict boundary maps corresponding to the images shown in FIGS. 21A, 22A, and 24B. In each case, the captured observational data can be improved by performing an embodiment of process 2300 using the respective boundary map.

Figure 23:
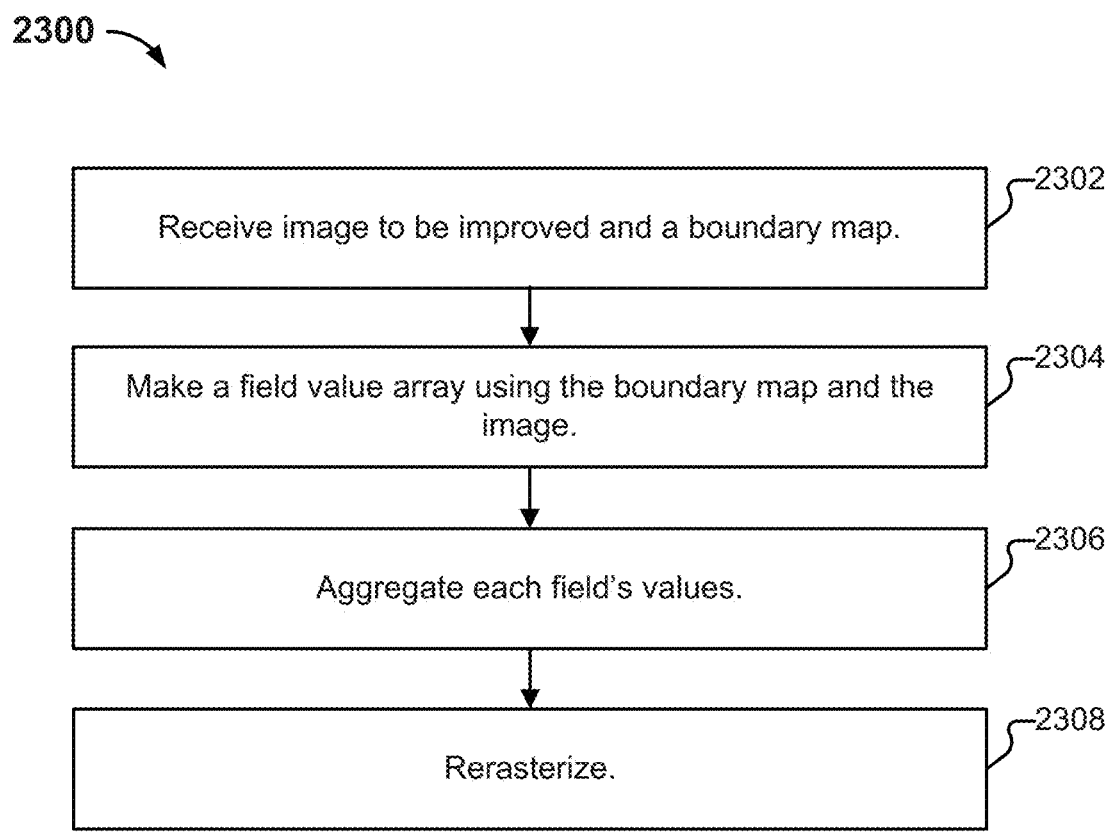
FIG. 23 illustrates an embodiment of a process for enhancing an image using a boundary map.

FIG. 23 illustrates an embodiment of a process for enhancing an image using a boundary map. In various embodiments, process 2300 is performed by image enhancer 332. One example way to implement image enhancer 332 is as a set of Python scripts incorporating the open-source libraries NumPy and SciPy. The process begins at 2302 when an image to be enhanced and a corresponding boundary map are received. As a first example, suppose that at 2302, image 2100 and boundary map 2130 are received. At 2304, a field value array is constructed, using the boundary map and the received image. The field value array is an array of deques, and is created by iterating over pixels in the received image, appending a given pixel's value to the appropriate field. At 2306, the values (extracted from the received image) are aggregated per field. A variety of aggregation techniques can be used, examples of which include determining the mean pixel value, the median pixel value, or a mode. As previously explained, for pixels where no data is present, a NaN value can be supplied (e.g., during ingestion), so that operations such as taking a median or mean are not impacted by the presence of zero values. The values determined at 2306 are used to perform, at 2308, a rerasterization operation, resulting in an enhanced image where each pixel in a field in the enhanced image has the same value as the rest of the pixels in the same field. As with various other examples provided throughout the Specification, where the image received at 2302 is multi-spectral, multiple values for a pixel can be operated on throughout process 2300 as applicable.

FIG. 21C illustrates a result of providing image 2100 and boundary map 2130 as input to process 2300. In particular, regularizing the pixel brightness values across the pixels bounded by a given field (e.g., using the median value) has in-painted the black stripes of missing data in the original image.

FIG. 22B depicts a boundary map (created in accordance with process 1100) for a portion of land, rasterized to 30 m resolution. FIG. 22A depicts a corresponding MODIS observation of the same portion of land that is represented by boundary map 2230. The MODIS observation (240 m resolution) has been upsampled so that both image 2200 and boundary map 2230 are the same size (e.g., with 2048×2048 pixels representing 30 m×30 m of ground in both cases). FIG. 22C illustrates a result of providing image 2200 and boundary map 2230 as input to process 2300. In particular, regularizing the pixel brightness values across the pixels bounded by a given field (e.g., using the median value) has resulted in a resolution-enhanced version of image 2200.

Embodiments of process 2300 can similarly be used to de-noise image 2450 (using boundary map 2500), resulting in an image such as image 27A. Noise in images is an obstacle to many kinds of image processing. This is especially true of automated processing, as it can be challenging for computer algorithms to extract image features amidst substantial noise as easily as humans can. A fundamental challenge is to remove noise without also removing essential image characteristics. Much of the information content of an image is contained in the image's edges. Accordingly, a technique that will preserve edges in the course of removing noise will be beneficial.

Figure 24A:
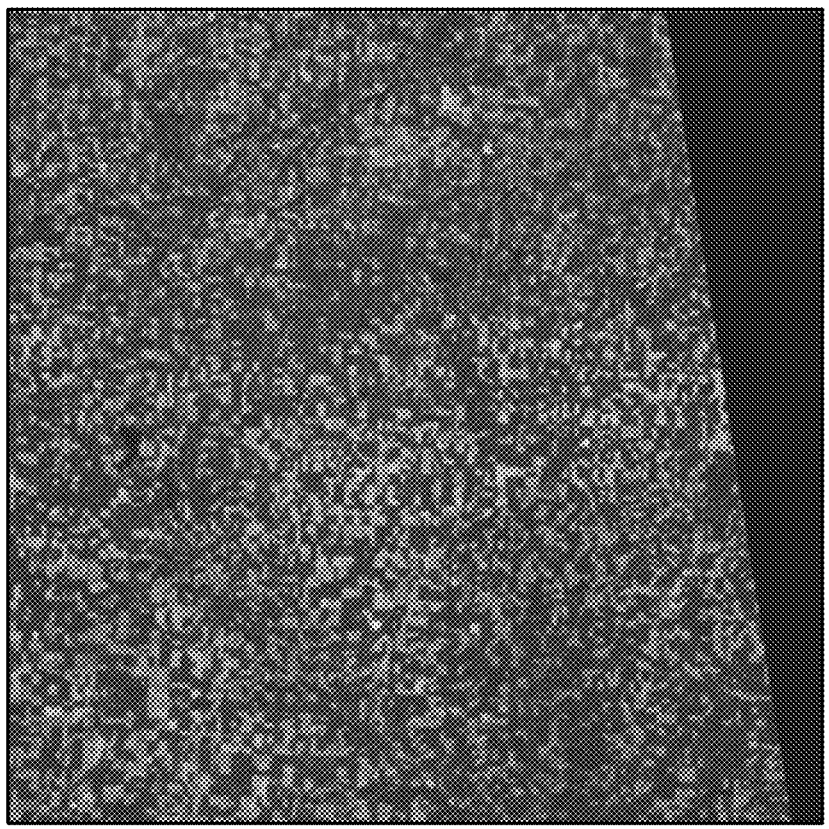
FIG. 24A shows an example of a processed SENTINEL-1A image.

One source of input to platform 302 is Sentinel-1 data. Sentinel-1 provides synthetic aperture radar (SAR) imagery. Benefits of SAR imagery include that it is cloud-free, and also that it can be continuously collected (including at night). One drawback of SAR imagery is that it can be very noisy. FIG. 24A shows an example of a processed Sentinel-1A image (UTM tile 15N_004_075 (Carroll, IA), taken Sep. 11, 2015), with each side of the image representing a distance of approximately 60 km. In the example shown in FIG. 24A, the first channel is the VH polarization, the second channel is the VV polarization, and a third channel has been added using $$\frac{VV - VH}{VV + VH}.$$

FIG. 24B shows a zoom into FIG. 24A, with each side of the image representing a distance of approximately 900 m. FIG. 25 illustrates an example of a boundary map that corresponds to the portion of land depicted in FIG. 24B. The following is an example approach to using boundary maps (whether generated in accordance with an embodiment of process 1100, or otherwise obtained, e.g., as governmental CLU data) to assist in image denoising.

Figure 26:
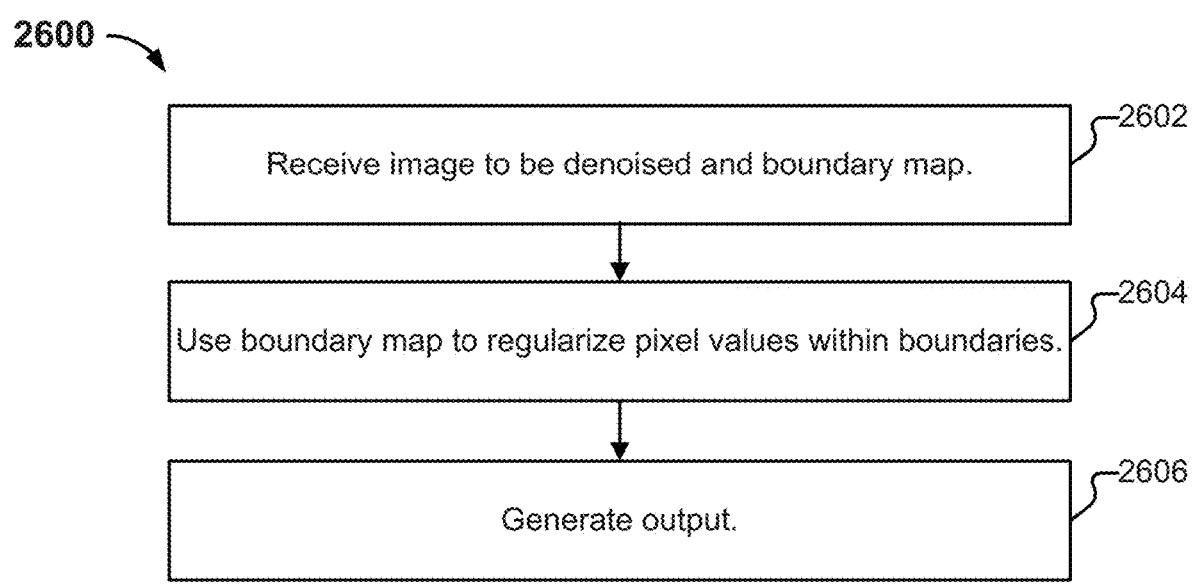
FIG. 26 illustrates an embodiment of a process for enhancing an image using a boundary map.
Figure 27B:
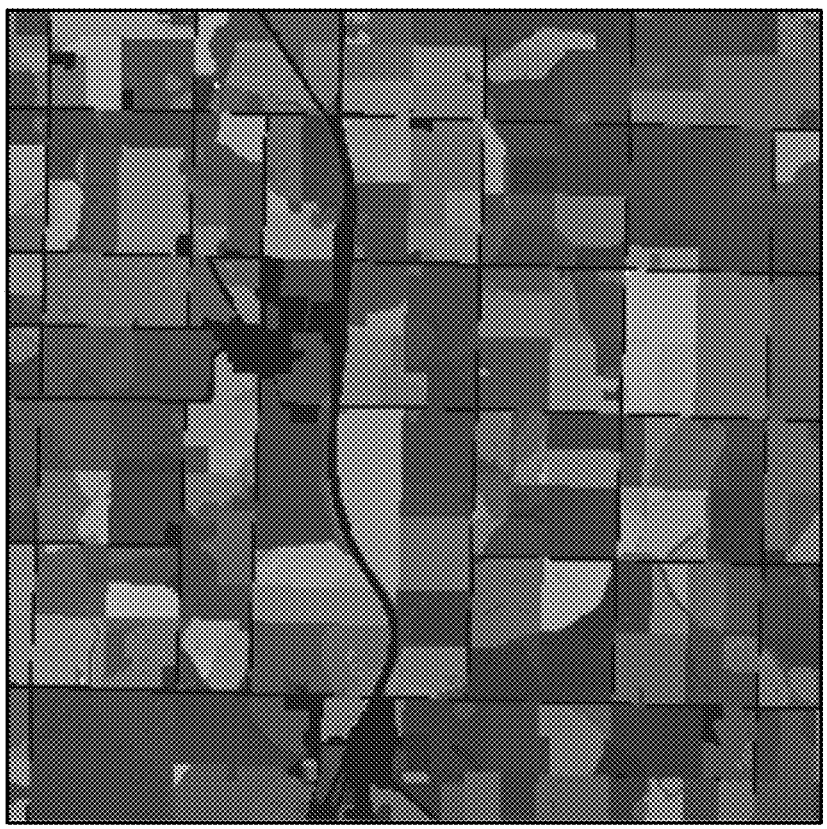
FIG. 27B depicts a result of regularizing the pixels in FIG. 24B using a field-wise mean of the logarithm of the pixel values.
Figure 27A:
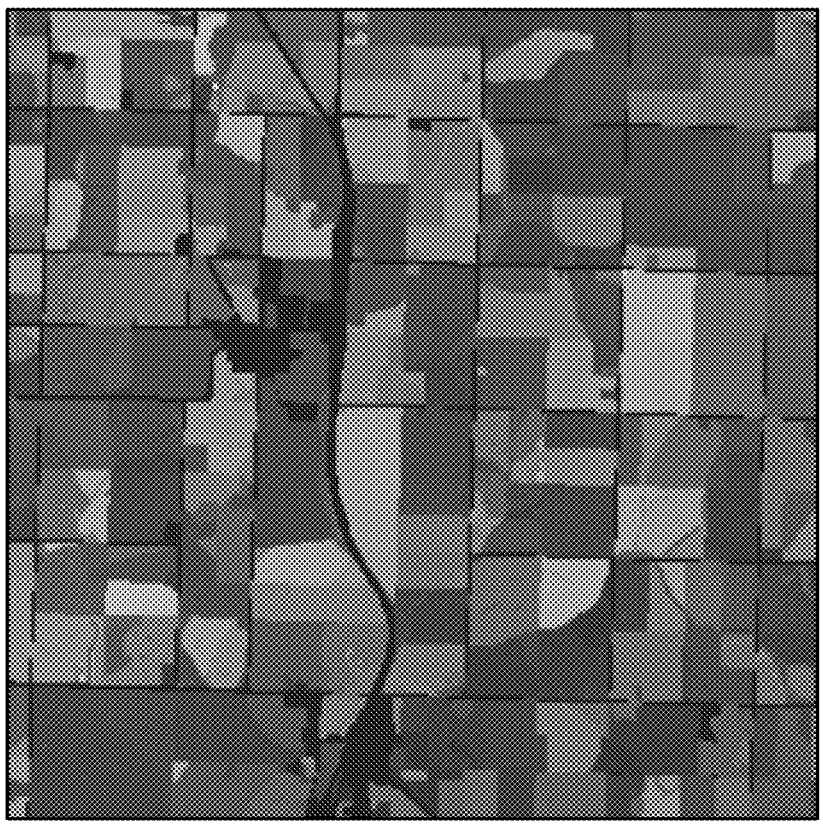
FIG. 27A depicts a result of regularizing the pixels in FIG. 24B using a field-wise median value.

One approach to using a boundary map such as boundary map 2500 to reduce noise in an image such as image 24B is shown in FIG. 26 and is an embodiment of process 2300. In various embodiments, process 2600 is performed by denoiser 334. One example way to implement denoiser 334 is as a set of Python scripts incorporating the open-source libraries NumPy and SciPy. The process begins at 2602 when an image to be denoised (e.g., image 2450) and a boundary map (e.g., boundary map 2500) are received. At 2604, for each field in the boundary map, a regularized value (or set of values, where data for multiple spectral bands is present at each pixel) is determined using pixels in the received image that are located within the field. An image comprising the constrained values is generated as output at 2606. As one example of the processing that can be performed at 2604, a mean value (or set of values, where the image is multi-spectral) can be determined across the pixels in the received image that correspond to a given field in the boundary map. The noise distribution of SAR often has outliers. Accordingly, instead of a mean value, a median value can also be used (e.g., to reduce the impact of outlier pixel values in the received image). FIG. 27A depicts a result of regularizing the pixels in FIG. 24B using a field-wise median value. FIG. 27B depicts a result of regularizing the pixels in FIG. 24B using the field-wise mean of the logarithm of the pixel values (per the multiplicative Gaussian model). The results shown in FIGS. 27A and 27B are not identical but are both similar and reasonable ways to reduce SAR noise.

V. Additional Platform Detail

Figure 28:
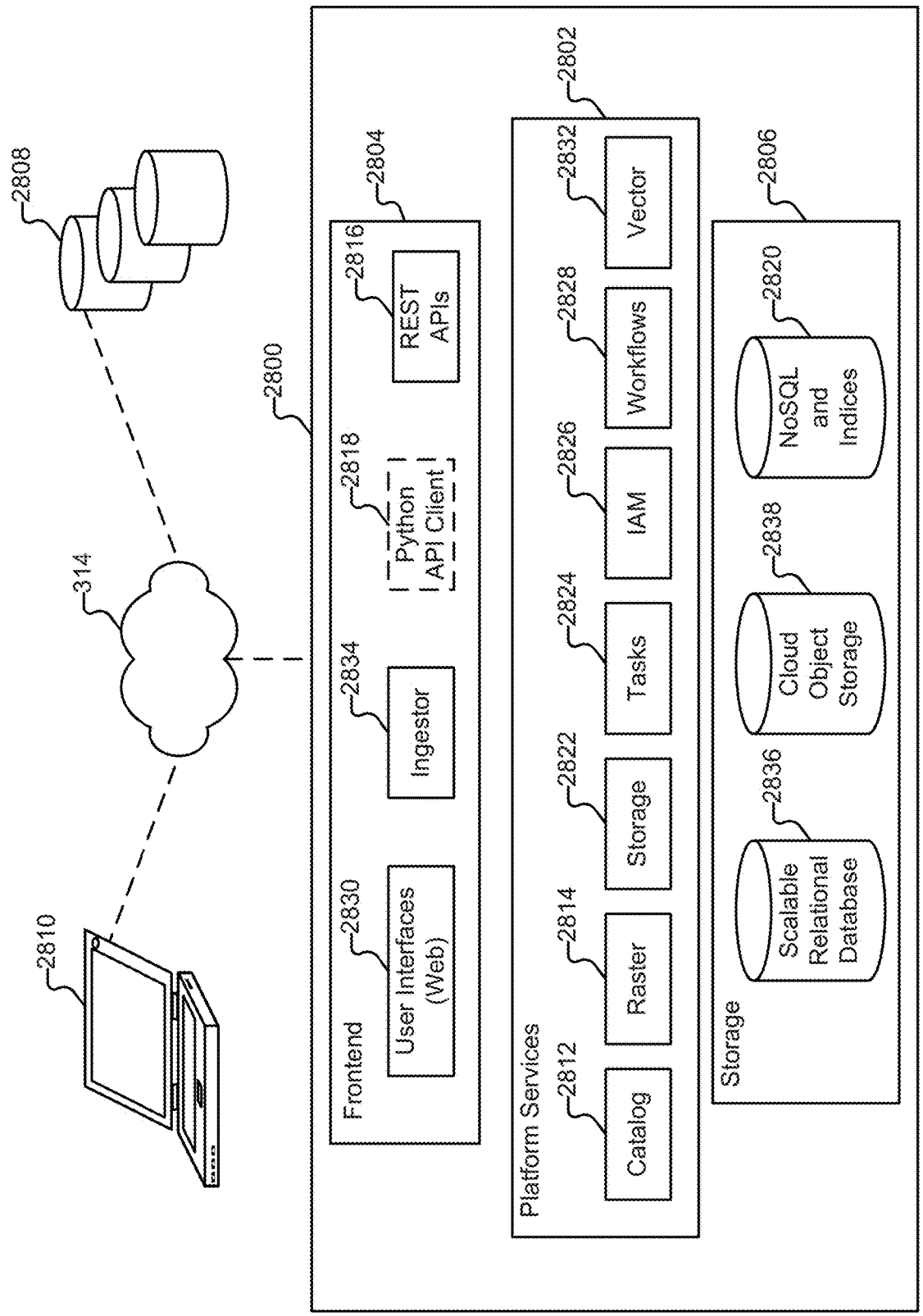
FIG. 28 illustrates an embodiment of a platform for processing and analyzing data in accordance with various techniques described here.

FIG. 28 illustrates an embodiment (2800) of platform 302 that makes available a set of platform services 2802 which can be used to support various applications. An example of such an application is thermal anomaly detection and classification, described in more detail below. Platform services 2802 can be implemented in a variety of ways. One example is as a set of microservices on a container orchestration cluster (e.g., built using the Flask micro web service framework with Kubernetes). The services can be accessed via REST APIs 2816 and/or an API client 2818 (e.g., implemented using Python). Platform services 2802 make use of a variety of types of storage 2806. These include a scalable relational database 2836 (e.g., Postgres or MySQL server), cloud object storage 2838 (e.g., Amazon S3, Google Cloud Storage, or Microsoft Azure Blob), and/or a key value pair store and associated indexing capabilities 2820 (e.g., Apache Cassandra, Amazon DynamoDB, Redis, or Elasticsearch).

Platform 2800 includes a set of interfaces 2804. Ingest interface 2834 is an embodiment of ingestor 308 and can be used to ingest a variety of types of data (e.g., raster data, point data, and LiDAR data) from a variety of sources 2808 (e.g., Sentinel-1 data from ESA and MODIS data from NASA). For a given ingestion action, ingestor 2834 selects an appropriate ingestion pipeline (e.g., implemented as a Python script) applicable to the data source. Users can also provide their own data to platform 2800 (e.g., using client device 2810) using an API made available by ingestor 2834. As applicable, platform 2800 processes the ingested data (e.g., uncompressing/recompressing, normalizing, applying data corrections, restructuring band order, etc.), stores the data in an appropriate location, and registers it with Catalog service 2812.

Catalog service 2812 is a repository of georeferenced images that provides a query language for performing searches. In an example embodiment, catalog service 2812 supports three types of classes: images, bands, and products. An image (represented by the class "Image" in the API) contains data for a shape on Earth, as specified by its georeferencing. An image references one or more files (e.g., TIFF or JPEG files) that contain the binary data conforming to the band declaration of its product. A band (represented by the class "Band" in the API) is a 2-dimensional slice of raster data in an image. A product includes at least one band and all images in the product conform to the declared band structure. For example, an optical sensor will commonly have bands that correspond to the red, blue, and green visible light spectrum, which can be rastered together to create an RGB image. A product (represented by the class "Product") is a collection of images that share the same band structure. Images in a product can generally be used jointly in a data analysis, as they are expected to have been uniformly processed with respect to data correction, georegistration, etc. For example, multiple images from a product can be composited to run a process over a large geographic region. Some products correspond directly to image datasets provided by a platform, such as the Landsat 8 Collection 1 product which contains all images taken by the Landsat 8 satellite, is updated continuously as it takes more images, and is processed to NASA's Collection 1 specification. A product can also represent data derived from multiple other products or data sources-some may not even derive from Earth observation data. A raster product can contain any type of image data as long as it is georeferenced.

Raster service 2814 performs two general tasks: retrieving data from storage 2806 and providing a consistent way of splitting that data into smaller tiles. Examples of methods provided by raster service 2814 include "ndarray," "stack," and "raster," which retrieve raster data and return them either in an NumPy array or, for raster, an image file. The methods accept a list of image identifiers, which can be found by using Catalog 2812, and support rescaling, resampling, reprojecting, clipping, resizing, selecting bands of interest, and converting data type of the imagery in a single call.

Storage service 2822 persists data to backend storage objects. It provides a mechanism to store arbitrary data and later retrieve it using key-value pair semantics. A few example ways in which storage service 2822 can be used include: storing an auxiliary dataset useful for a particular analysis, storing custom shapes for regions of interest for an application, and uploading raster data that can later be registered via Catalog service 2812. An example interaction with storage service 2822 would be composed of a PUT API call to set a blob (chunk of bytes) to a key, then retrieve that data using a GET API call referencing the same key. There are several storage types that can be chosen when interacting with the Storage service 2822: "data," "tmp," "products," "result," and "logs." The "data" storage type is a default storage type. The "tmp" storage type is for temporary assets, and may be deleted after a given time period (e.g., seven days). The "products" storage type is for storing raster data. The "result" and "log" storage types are where the output and logs are stored from task processing.

Tasks service 2824 provides scalable compute capabilities to parallelize computations. In an example embodiment it works by packaging users' Python code and executing the code on hosted cloud infrastructure nodes. These nodes are able to access imagery at extremely high rates of throughput which, paired with horizontal scaling, allow for the execution of computations over nearly any spatio-temporal scale.

Identity and Access Management (IAM) service 2826 provides for user identity and access management. An example way to implement IAM service 2826 is as a third party identity provider (e.g., Auth0, Ping, or Okta).

Workflows service 2828 provides a computation engine for inventing and quickly deploying geospatial analyses. Users can use Workflows service 2828 to develop processes, interactively see changes recomputed on the fly, and run them at scale. One feature of the Workflows service 2828 is live visualization on an interactive map (e.g., as provided via a web interface 2830). In an example embodiment, users can build custom interactive tools with Workflows 2828 using ipywidgets and ipyleaflet in Jupyter notebooks. And, data can be retrieved as NumPy arrays or native Python types to use with other libraries. Workflows service 2828 also has an Array type that's intercompatible with NumPy, so complex numerical operations can be expressed without requiring users to learn new syntax.

Vector service 2832 allows users to store vector geometries (points, polygons, etc.) along with key-value properties, and query that data spatially and/or by properties. It can be used for data at the scale of millions to billions of features. An example use for Vector service 2832 is for storing the output from Tasks service 2824 (e.g., a computer vision detector might be run in thousands of tasks over many years of data across a continent; the objects it detects can be saved as features for later querying and analysis using Vector service 2832).

VI. Change Detection

Using techniques described herein, embodiments of platform 2800 can be used to perform change detection.

Described herein are techniques for performing generic change detection. As will be described in further detail below, in some embodiments, generic change detection is performed using a convolutional neural network. The change detection model (e.g., machine learning model or neural network) is configured to generate a mask (e.g., binary change mask) that identifies changes between two input images (e.g., satellite imagery). As will be described herein, using the techniques described herein, the changes that are identified are robust under small variations in the input images such as color and small structural changes, where the neural network is sensitive to those changes in the feature space.

Also described herein are techniques for synthesizing realistic ground truth data for the aforementioned deep learning task of change detection. The techniques for generating or synthesizing realistic ground truth data described herein may be used, for example, when insufficient labeled data for training the change detection model is available. Using the techniques described herein, new satellite imagery may be generated where the ground truth for change is defined by the data generation. This allows for the development of a model for change detection in satellite imagery.

As will be described in further detail below, the techniques for synthesizing realistic training data described herein include harmonizing pasted objects into a background image to generate, for example, new satellite imagery where the ground truth for change is defined by the data generation. This allows for the development of a deep learning algorithm for change detection in satellite imagery (e.g., the change detection model/network described herein). As will be described in further detail below, in some embodiments, GAN-based techniques for generating training data samples for training a change detection model are used.

As will be described in further detail below, the change detector described herein is configured to determine structural change between two images. The change detection techniques described herein may be used to detect change over the course of multiple observations (e.g., over time) from a specific satellite. The change detection techniques described herein are applicable to any type of imagery from various sources with various resolution, spectral bands, etc.

Further, the change detection techniques described herein facilitate generic change detection. This is in contrast to existing change detection techniques, which attempt to detect changes in the presence of specific types of objects.

For example, previous change detection approaches focus on detecting specific types of changes. Previously, in order to detect the change in the presence of buildings, a building detector that is trained specifically to detect buildings would have to be built. The building detector would then be applied to two different scenes, where, for example, the output includes a map of all of the buildings that are applied to one image and a second map of all of the building in the second image, where the two different maps are then compared. The difference between the maps is the change in buildings.

While the building detector is usable to detect buildings, it would not be useful to detect other types of objects, which would require a different detector specific to that type of object to be built. For example, in order to detect wellpads, a different detector that only detects wellpads would have to be used.

That is, using existing change detection techniques, for each object of interest, a new model would have to be trained that detects only those objects. This is also the case for change detection that is based on analysis of signals such as spectral signatures of pixels. For example, a detector for deforestation may be based on evaluating the spectral signature of pixels, as plants reflect light in a manner different from uncovered land. However, in this case, a single type of change is being detected.

Further, existing change detection techniques that are used to determine multiple types of changes are oftentimes hybrid approaches, which involve the use of many different models that are combined together. In this existing approach, multiple models are applied, where each model still detects only one specific type of change. This is still limiting, as there is a finite number of types of changes that are detected, and is still dependent on a user specifying the specific types of changes that they are interested in detecting.

The change detection techniques described herein are more flexible and generic, where structural changes between two scenes being compared are identifiable without requiring a user having to explicitly specify or define what type of change they are looking for. The generic change detection techniques described herein improve upon existing change detection techniques, which are more limiting.

As described herein, structural change described herein refers to a structural transformation in a portion of the Earth, such as changes to objects or to the Earth itself, which may be due to human and/or natural activity.

One example of such structural change is the detection of man-made structures in a scene that were not present in an earlier version of the scene, where the change detection model described herein need not be trained to identify some specific type of man-made structure. Transformation of land use is another example of structural change that may be detected using the generic change detection techniques described herein, without requiring explicit training on a specific type of land transformation. For example, the change detection techniques described herein may be used to detect the transformation of a piece of land into agricultural fields without explicit training or specification of agricultural fields as a type of change to be detected. As yet another example, the generic change detection techniques described herein may be used to detect the occurrence of flooding or other natural events that cause structural change in an area.

As will be described in further detail below, the generic change detection techniques described herein may be used to identify the aforementioned types of structural changes, as well as other types of structural changes, without requiring training for detection of specific, individual types of changes. Further, as will be described in further detail below, the generic change detection techniques described herein take into consideration the context of a scene to provide more accurate change detection in actual satellite imagery.

As described above, the changes that are identified using the generic change detector described herein are robust under small variations in the input images such as color and small structural changes, where the neural network is sensitive to those changes in the feature space. The generic change techniques described herein used to detect generic structural changes are in contrast to, for example, simply subtracting two observations of the same place on Earth at different times and defining the pixel differences between the two views as the change. In this simplified subtraction case, there is likely to be a change in every pixel between the two images because of the different conditions (e.g., lighting conditions) under which the two observations were taken. As each pixel value is likely to be off by at least one digit, this simplistic approach would result in a large amount of change being detected that is of a type that is not of interest. That is, the mere change in pixel values between two images (which are likely to change regardless) would not provide the ability to detect structural change such as changes to objects or to the Earth itself.

Thus, in contrast to existing change detection techniques, and as will be described in further detail below, the generic change detection techniques described herein allow for the detection of generic structural change and changes in the features between two input images, without requiring an explicit definition of the type of change to be detected. As will be described in further detail below, the generic change detection techniques described herein may be applied to any type of imagery, with minimal to no additional labor. For example, when training the generic change detector model described herein, a user simply chooses the type of imagery (e.g., resolution, spectral bands, etc.) that they wish to evaluate, and the model is automatically developed.

Figure 29:
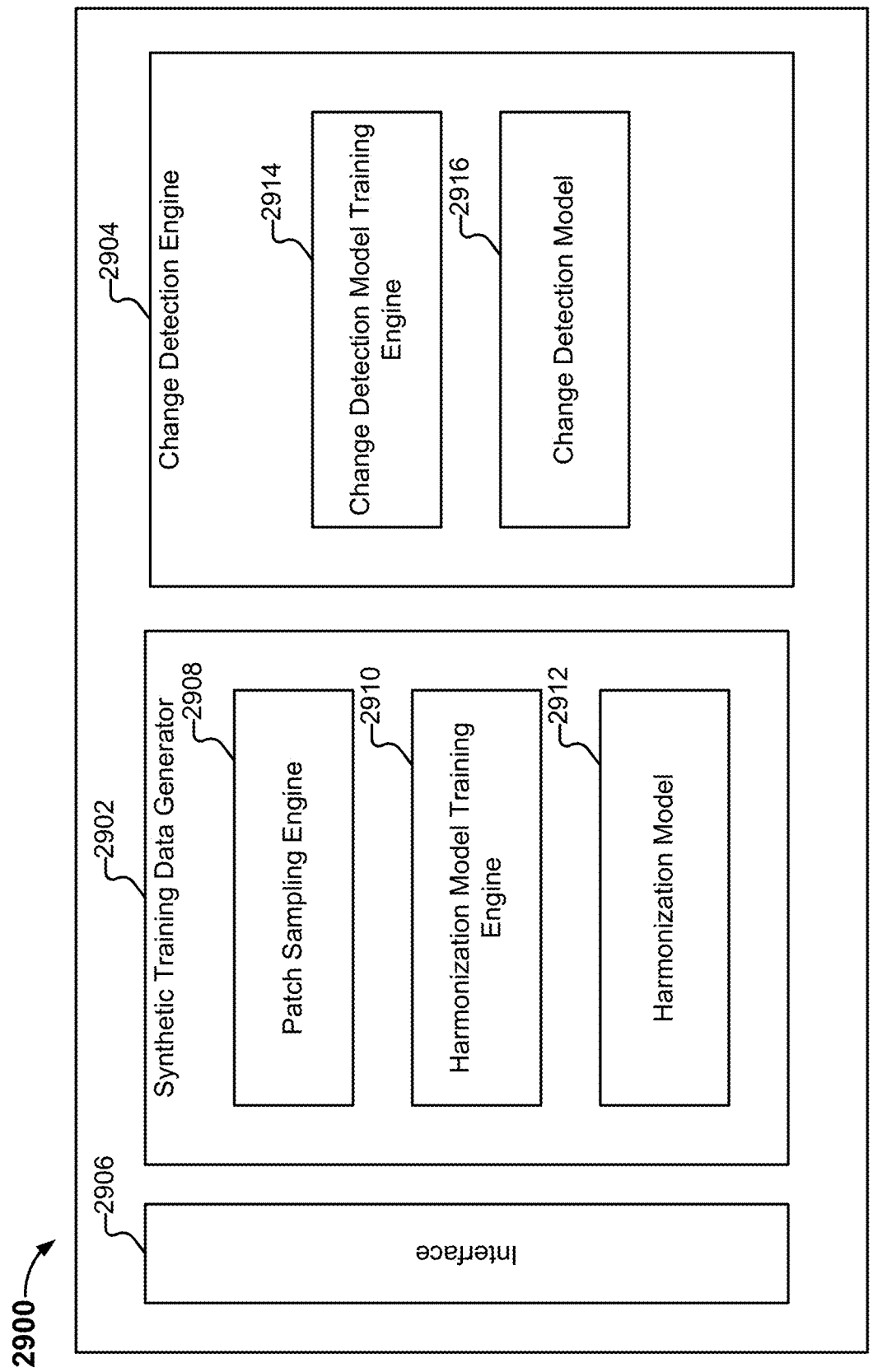
FIG. 29 illustrates an embodiment of a system for performing change detection analysis.

FIG. 29 illustrates an embodiment of a system for performing change detection analysis. In this example, platform 2900 is an embodiment of platform 2800 of FIG. 28. In this example, platform 2900 includes synthetic training data generator 2902. Platform 2900 further includes change detection engine 2904. Platform 2900 further includes interface 2906. Various portions of platform 2800 are also used to facilitate the training sample synthesis and change detection described herein. For example, the Python API client 2818 is used to access imagery on the platform to generate the synthetic training data. This may include accessing actual satellite imagery, as well as a corresponding cloud mask. Raster service 2814 may be used to generate image tiles and rasterize image data. Tasks service 2824 and storage service 2822 may be used to deploy the change detection model described herein over new areas of interest. In some embodiments, the outputs of the deployment of the change detection model are stored in catalog 2812. In some embodiments, IAM service 2826 is used to authenticate with various clients. In some embodiments, the imagery used to generate the synthetic change detection training samples is stored in cloud object storage 2838.

Synthesizing Labeled Samples for Training a Generic Change Detector Model

As described above, the change detector described herein is configured to determine structural change between two images. In order for the change detection model to be effective at identifying such structural change, sufficient labeled samples that are realistic are needed to train the change detection model.

In some embodiments, the labeled training samples include examples of known structural changes between two images, where the training samples are realistic. As one example, a labeled training sample for the change detection model described herein includes:

A reference image
A version of the reference image that has a structural change applied
A mask that indicates the location and dimensions of the applied change Such labeled training samples that include two images that have known and labeled changes between them are then used to train the change detector to learn how to detect structural changes between two images. For example, as will be described in further detail below, when being trained, the change detection model takes the reference image and the modified image with the change in it, and attempts to determine where the change is. The model's output is compared to the mask (which is a label or ground truth of where the change is) to determine how close the model is to identifying the change. The model then uses, for example, a loss function as feedback to improve the efficacy of the change detection model (e.g., by adjusting model weights).

It may be difficult to obtain an adequate number of such training samples. Typically, obtaining labeled samples is a manual process that is time consuming. Further, the appropriate type of labeled data may not exist. For example, it may be difficult to obtain real images of structural changes that have occurred in a scene (e.g., images of a scene that are before and after the introduction of a change). Described herein are techniques for synthesizing realistic training samples that have structural changes applied. The automated techniques for generating synthetic training samples for training a change detector model described herein improve upon existing techniques for training machine learning models. For example, typically, human labor is required to gather samples and generate training data in order to train a machine learning model. Such human intervention to obtain training data is not needed using the automated and unsupervised generation of synthetic training samples described herein. Using the synthetic training data generation techniques described herein, training data is obtained much faster and more efficiently than existing techniques for obtaining training data. Further, the sample generating techniques described herein generate synthetic images with changes applied that are realistic and natural, and similar to the types of images (e.g., actual satellite imagery) that will be used as input to the change detection model, providing a benefit of improving the ability of the change detector to detect change in real images.

Described below are techniques for unsupervised and automated generation or synthesis of labeled samples for training a change detector model. Using the sample synthesis techniques described herein, once a user defines the type of imagery (e.g., resolution, spectral bands, etc.) to be evaluated for change detection, the synthetic training data samples may be generated without any human intervention. The synthesized ground truth data may then be used to train the change detector model.

As will be described in further detail below, in some embodiments, generating a synthetic training sample in an unsupervised manner includes imposing or injecting change into a known location of a background image. Realistic change detector training data with pasted objects in a background image and a corresponding mask may then be generated. In this way, a modified version of the background image that has a structural change at a known location is generated, where the location of the change will also be included in a corresponding mask that can be used to tune the weights of the change detection model.

Here, the change injected into an image may be randomly selected, where the user need not define what the injected change should be, and where the change is not specific to any type of object for which change is to be detected. Here, rather, the injection of changes is unsupervised. That is, an original background image is augmented with a patch, forming what is referred to herein as a "patched image" or "augmented image."

As will be described in further detail below, the sample synthesis techniques described herein include performing harmonization to smooth out discontinuities when applying the patch to the background image. For example, the initial patched image will have discontinuities where the patch was inserted into or onto the background image (e.g., at the edges of the patch), and will not appear realistic. Using the harmonization techniques described herein, the patch is harmonized with the background image so that it is applied in a manner that results in a harmonized image that appears to be realistic. In this way, the change detector will be trained on an image with injected change that appears natural and as if it were a real image.

The following are examples and embodiments of automated and unsupervised synthesis of training samples for training a change detector model.

Specifying Sample Synthesis Parameters

In this example, a user would like to generate synthetic training data to train a change detector model. As one example, the user is provided a frontend interface (e.g., graphical user interface provided by interface 2906) by which to specify the parameters for generating the synthetic training data.

Figure 30:
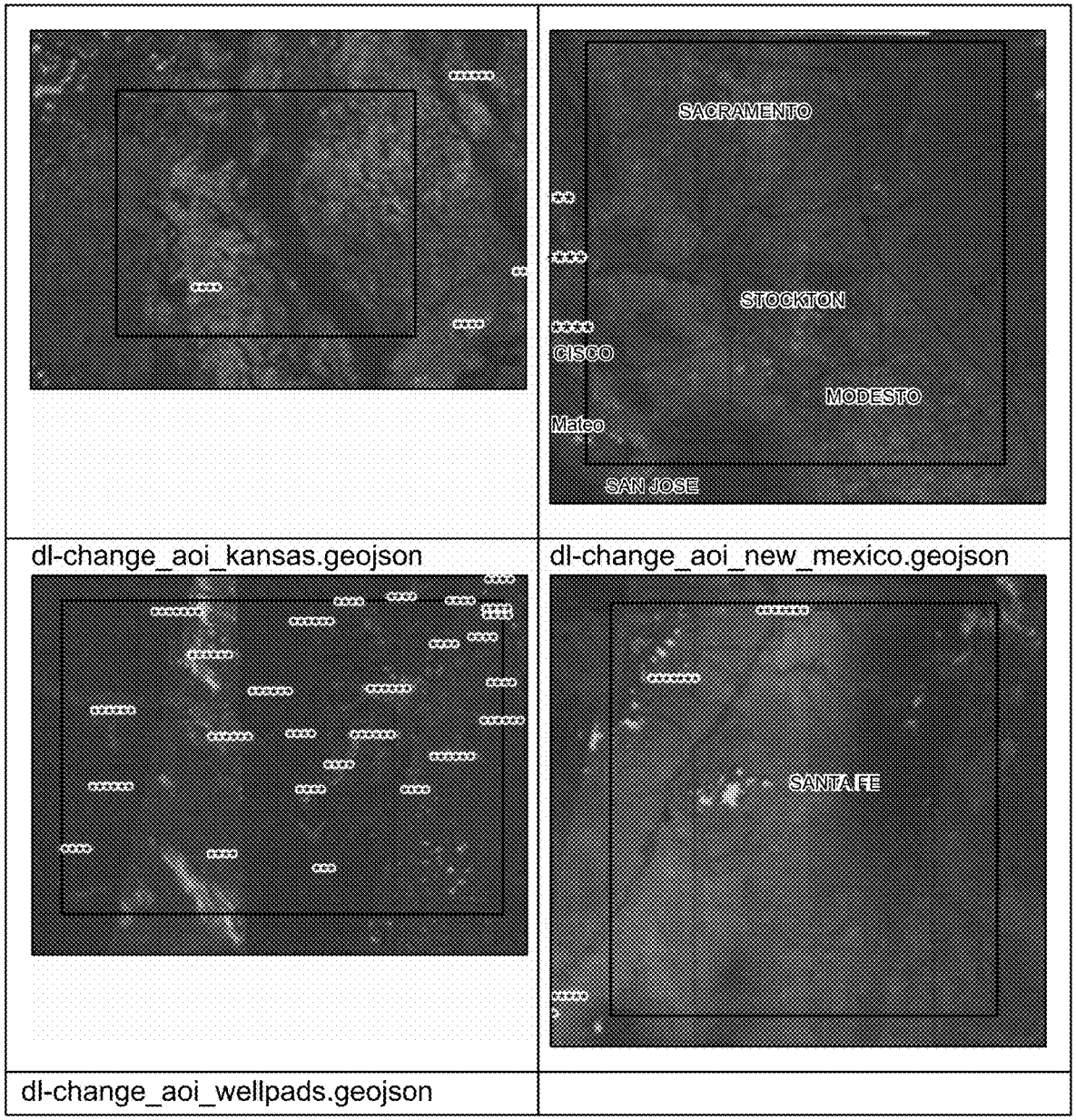
FIG. 30 illustrates examples of Areas of Interest (AOIs).

In some embodiments, specifying the synthetic training sample parameters includes indicating a type of imagery for which training data is to be generated. The type of imagery may be specified according to several characteristics, such as source, spectral bands, resolution, etc. In this example, the user indicates:

- A type of synthetic imagery to be generated. This includes indicating the spectral bands and resolution for the sample images to be generated. This may include indicating a source of imagery data from which augmented images are to be generated. One example of a type of imagery is Sentinel-2 RGB (Red Green Blue) imagery. Based on this specification, the platform determines that the spectral bands of interest are Red, Green, and Blue (RGB) and that the resolution of the images is 10 meter resolution (which is the resolution of Sentinel-2 RGB imagery). Other types of multiband imagery may be used as well with the models described herein. Imagery of any number or type of spectral bands may be inputted.
- An area of interest (AOI): As will be described in further detail, locations are sampled from the user-specified AOI. In this example, the user selects an area of interest that defines a large area or portion of the United States of America. FIG. 30 illustrates examples of Areas of Interest (AOIs). In some embodiments, the various AOIs distributed around the Earth are predefined, and the user may make a selection from the predefined AOIs.

Location Image Sampling

As described above, two example components of a labeled training sample include a reference image as well as a modified image that is a version of the reference image that has applied a structural change, where the structural change has been harmonized with the reference image. The following are example details of obtaining the reference image, as well as determining what structural changes to apply.

From the AOI selected by the user, a location (e.g., with some latitude/longitude) is randomly sampled. An image tile at the location is obtained.

Figure 31:
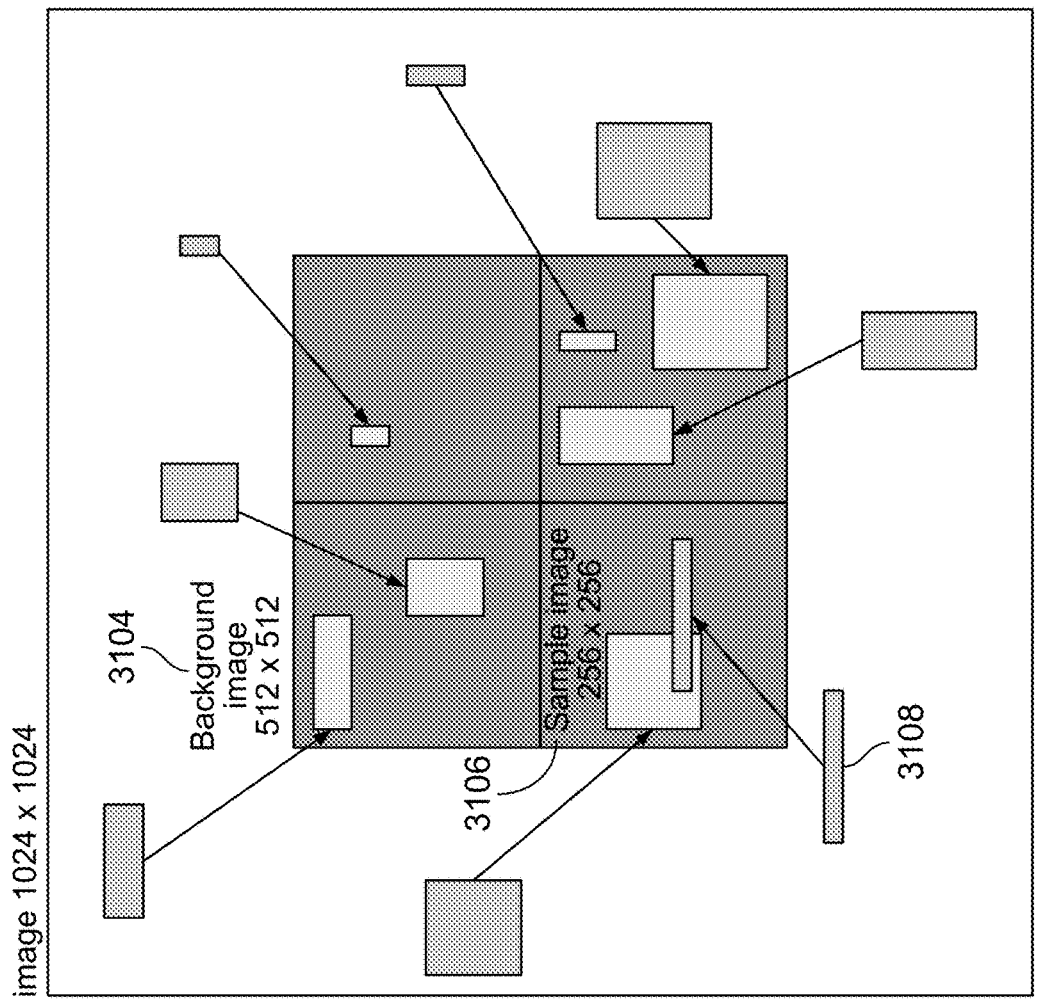
FIG. 31 illustrates an embodiment of a location image tile used to generate a background image and to determine sample patches.

FIG. 31 illustrates an embodiment of a location image tile used to generate a background image and to determine sample patches. In the example of FIG. 31, a location image tile 3102 is obtained. In some embodiments, as part of selecting the location image tile, cloud detection is performed to determine whether there are clouds in the image. For example, a cloud detector, such as that described above, is run to ensure that there are no clouds in the samples used herein (or, for example, that the fraction of clouds in the scene is below a threshold). In some embodiments, if there are clouds present in the location image tile, the location image tile is discarded, and an image at another location is selected.

The following is an example of obtaining a full image tile. A position (e.g., longitude, latitude) within a given AOI is selected (e.g., randomly). A search for a most recent cloud free scene within a given date range is performed. In some embodiments, a search for a second cloud free scene that is within a threshold amount of time or threshold time difference of the first image is performed. In some embodiments, this time-shifted second image is used as a reference image with no change (or absent of any change), as will be described in further detail below.

In some embodiments, selecting a cloud-free scene includes using a corresponding cloud mask product to determine a cloud fraction. The determined cloud fraction may be compared against a cloud fraction threshold. In some embodiments, the time difference threshold parameter may be selected by a user or a default value may be used. In some embodiments, if no cloud free scenes are found at the given location in the given date range, a new location is sampled.

As will be described in further detail below, various sub-portions of the location image tile 3102 (also referred to herein as a "full image") are used to generate synthetic training samples. In the example of FIG. 31, a full image tile of 1024×1024 pixels is obtained. The center 512×512 portion of the full image (3104) is referred to as a background training image, as during harmonization, which will be described in further detail below, the background training image is used in some embodiments to train a generative adversarial network (GAN) to generate harmonized images. The background image is a portion of the original full image that does not have any patches pasted into it or any change made to it. In this example, the background image is divided into quadrants of 256×256 images (such as sample image 3106), which will ultimately be included in a change detector training sample. As shown in this example, patches (e.g., patch 3108) are sampled from the area between the background image 3104 and the full image 3102 and pasted into the quadrants of the background image.

While image sizes are provided in the examples described herein for illustrative purposes, other image sizes may be used as appropriate. For example, the sizes of the various images may be constrained by the maximum amount of memory available on a CPU or GPU. For example, the background image size may be selected as the largest size that fits into memory. Further, while the background image will be split into quadrants in order to generate multiple change detection training samples from a single training of the harmonization model, as will be described in further detail below, other divisions may be used. In other embodiments, such sub-division is not performed.

Patch Sampling and Pasting

In some embodiments, automated generation of synthetic training data includes sampling patches that are to be pasted into the background image. The patch sampling may be automated. The patch sampling is performed to generate patched images that have pasted objects in the background image. After a harmonization model such as a GAN pyramid is trained on the background image, the harmonization model is used to harmonize patched images to remove any discontinuities from pasting the patch into the background image. The harmonized image is then used as one component of a change detection training sample, as will be described in further detail below. In some embodiments, patch sampling engine 2908 is configured to perform patch sampling.

In some embodiments, the patches are sampled from an area surrounding the location of the background image. Referring to the example of FIG. 31, patches around the background image are sampled. The sampling of patches around the images allows for the context of the scene in the tile to be taken into consideration. In this way, by taking patches from the area surrounding the background image, the patches are contextually relevant and may have similar features. Here, the patches have a similar, but not identical structure to the background image. That is, the patch taken from the surroundings of the background image is similar, but not the same to what is in the background image.

In some embodiments, the patch sampling is performed according to patch sampling parameters. The patch sampling parameters may be provided by users. In some embodiments, the user specifies or selects the number of patches to include in the background image for harmonization. In the example of FIG. 31, the background image is divided into quarters, and the user specifies the number of patches for each quarter. For example, the user may specify that up to four patches may be included in a quadrant of the background image. Based on the specification of the maximum number of patches that may be included, for each quadrant, between one and four patches will be randomly sampled and pasted into the quadrant. In some embodiments, the patches are selected from random locations around the background image, between the background image and the full image (where sampling of patches from within the background image is prohibited). The size of a patch is also randomly selected (where, for example, a patch's size or dimensions is limited so that it fits within the quadrant). By performing randomization based on the patch sampling parameters described above, different sizes of change are injected at different locations. Random sampling of the patches also ensures that different types of features will be obtained from the surroundings of the background image into which the patches are pasted.

In some embodiments, the patches are sampled based on frequency. For example, this optimization may be performed when patches are sampled from areas that are different from the area into which the patches are to be pasted. In some embodiments, frequency-based patch sampling includes (randomly) sampling patches from high (low) frequency areas and pasted into low (high) frequency areas. That is, patches sampled from high frequency areas are pasted into low frequency areas, and patches sampled from low frequency areas are pasted into high frequency areas. In some embodiments, determining a high frequency area includes transforming an image into a space such as a Fourier space, where a filter is applied (e.g., low pass filter), and the image is transformed back into the real space. The difference between the filtered and unfiltered images indicates the high frequency areas. After the areas of high frequency are determined, the patch sampler selects a random point for which a patch at a given size contains at least a certain fraction of the high frequency area (e.g., above a threshold proportion). The location at which to paste the patch may then be determined in a similar way, where, for example, the high frequency map is inverted to determine the low frequency areas. Patches are sampled randomly at either high or low frequency areas. In some embodiments, when the patch is sampled, the center region of the area where the patch will be pasted, as well as the borders of the patch's width and height, are excluded from the sampling area.

The sampled patches are then pasted into the background image, where the added patches are labeled as a change. Examples of sampling and pasting of patches into a background image are shown in the example of FIG. 31. Further details regarding the harmonization of pasted images by a trained harmonization machine learning model are described below.

Harmonization

After training of the harmonization model (described in further detail below), a patched image (e.g., background image with patches pasted) is provided as input to the harmonization model for harmonizing to generate a synthetic harmonized patched image (also referred to herein as the harmonized image). After injecting a sample patch into the original background image, harmonization is performed to smooth out any discontinuities, such that the sample patch is seamlessly blended into the background image to generate the harmonized image included in the change detection training sample. For example, there may be discontinuities at the edges of the patch when pasted into the background image. Harmonization is performed to remove such discontinuities, so that more realistic and natural training samples are generated, thereby improving the effectiveness of the change detector that is trained on the training samples.

As one example, the harmonization is performed automatically using a deep learning model such as a pyramidal GAN (Generative Adversarial Network). The harmonization model may be applied to various different types of imagery. For example, the deep learning approach described herein may be variously adapted to accommodate multispectral imagery with multiple spectral bands (e.g., RGB and beyond, such as RGB plus thermal bands or other types of multiband images).

Training the Harmonization Model

In some embodiments, the harmonization model is used to generate images out of noise. In this example, the harmonization model is a neural network that takes noise as input and then generates an image that is visually similar to the image that the network was trained with, but with different scenery, etc. In this example, the GAN is able to process images with any numbers of spectral bands as input.

Figure 32:
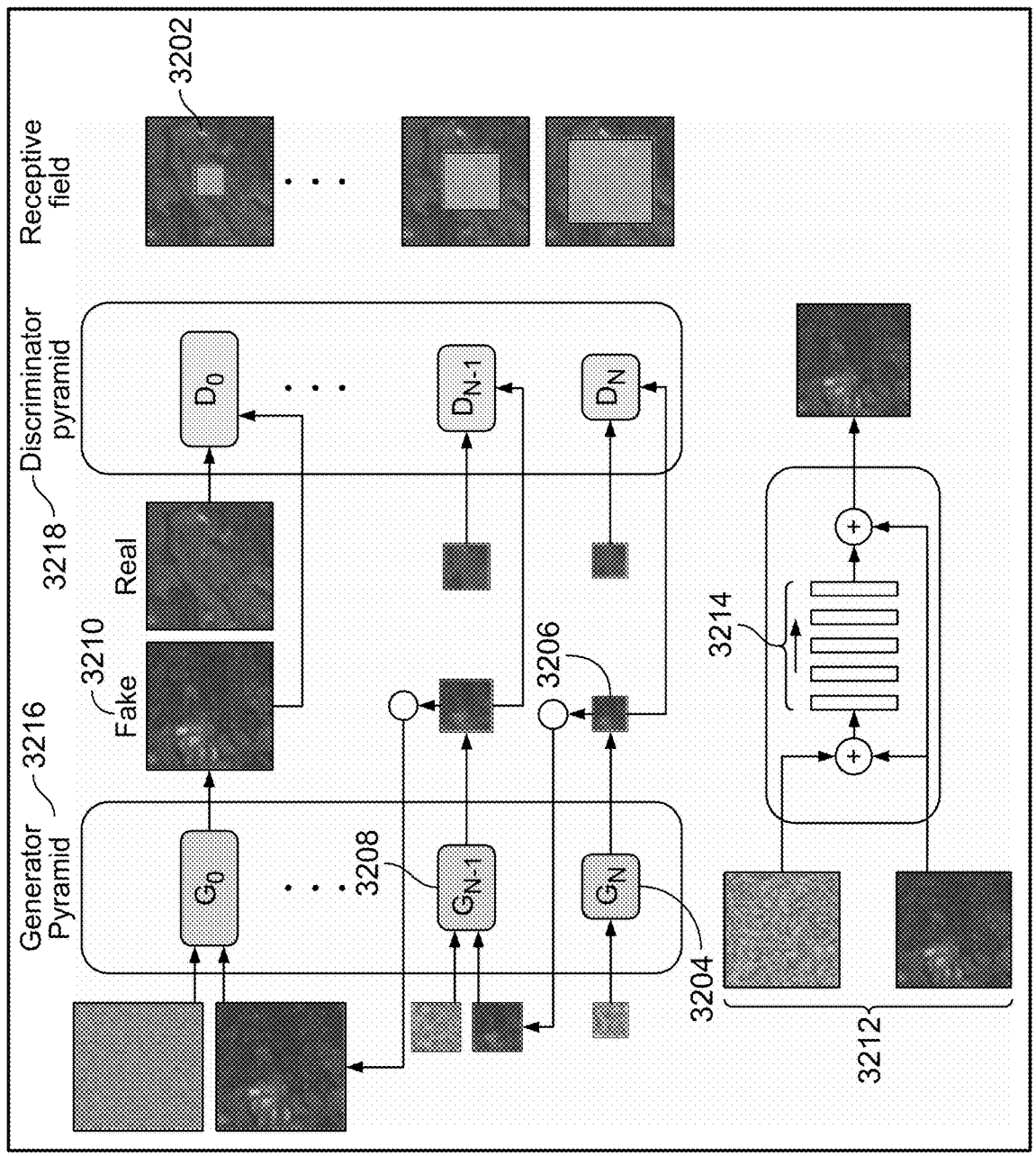
FIG. 32 illustrates an embodiment of a pyramidal GAN-based harmonization model.

In this example, the harmonization model is a type of GAN that is able to reconstruct, from a noise map, the original image that it was trained with. That is, noise is injected, and the output is the original image that the harmonization model was trained with, along with a reconstruction noise map. As will be described in further detail below, the harmonization model is trained on a background image (e.g., 512×512 background image described above). In this example, the harmonization model, which as one example is a pyramidal GAN, has different stages of resolution. An example of a pyramidal GAN is shown in the example of FIG. 32, and described in further detail below. In this way, change (e.g., the patches described above) may be injected into the harmonization process, where the harmonization model will attempt to "fix" the appearance of the overall image according to its training on reproducing the background image—that is, to make the image appear "real." In some embodiments, harmonization model training engine 2910 is configured to train the harmonization model.

The following are further example details regarding training of a harmonization model.

FIG. 32 illustrates an embodiment of a pyramidal GAN-based harmonization model. Here, the GAN is trained on one image, the 512×512 background harmonization training image 3104 of FIG. 31. That is, the entire GAN is able to be trained by using only this one image. In this example, the GAN is a pyramid of GANs (e.g., 10 GANs), where each GAN is a stage. Each stage is responsible for a specific resolution of the image, where, for example, the individual GANs are arranged from coarser to finer resolution, or vice versa. The number of GAN stages is adjustable.

As one example of training of the harmonization model, the generator network pyramid 3216 produces fake images from a given input (e.g., either noise or the upscaled output from a lower stage). The discriminator network pyramid 3218 then processes the fake image and the real image (the background image) to learn to tell them apart. Here, the harmonization model is trained on the one background image.

During training, the generator attempts to generate a fake image (e.g., create a reproduction of the original background image), while the discriminator attempts to distinguish the synthetic reproduction image from the real image (e.g., background image). Here, the two networks compete against each other and are adversarial to each other, where the generator attempts to fool the discriminator, and the discriminator attempts to improve on identifying differences. With the feedback between the two adversarial networks, the generator develops realistic images.

In the forward pass, the discriminator, which has access to the real, original background image, attempts to distinguish the output of the generator from the real image. In the backward pass, the weights of the generator and discriminator networks are updated to improve the tasks of the generator and discriminator (e.g., to generate fake imagery and identify discrepancies, respectively).

In some embodiments, at training time, each generator and discriminator is trained individually, keeping the weights of the previous stages constant. The number of stages of the GAN pyramid is adjustable.

The output of the training is a harmonization model that is trained on the 512×512 background image. In some embodiments, the output of the training includes a reconstruction map that, when provided as input back to the harmonization model, is used to reproduce the original background image. As one example, the reconstruction map is a specific map of noise that, when input into the harmonization model, causes the original background image to be generated by the harmonization model.

Additional Harmonization Model Training Optimizations

The training of a model such as a GAN may be time consuming, relative to the process of harmonizing images. As an example reference, using a single GPU to train the GAN on a single 512×512 image may take approximately seven hours (while the harmonization process, described in further detail below, may be performed much faster). In some embodiments, parallelization is performed to increase the speed of training the harmonization model.

As one example, the GAN described above is implemented in TensorFlow. In some embodiments, when training the different GAN stages, the training of the stages is done independently of other stages. For example, the first GAN is trained, then that first GAN is fixed, the second GAN is then trained, and then fixed, etc. However, in order to obtain input data for each of the stages, the image must be fed through the lower stages. For example, suppose that stage three is being trained. The training process must start at the lowest stage, where the image is fed through the first stage, then the second stage, before arriving at the third stage, in order to have input data for the third stage.

In some embodiments, an optimization is performed such that the feed-through process through the lower stages is done in a pre-processing step. For example various data augmentations may be applied as pre-processing that is performed on an image on the fly. In order to generate a batch of data for model training, each of the images in the batch is processed through pre-processing stages, where such processing is decoupled from the training process. While the model is trained (e.g., performing one forward pass and one backward pass), in the background, new samples of data are being prepared.

In some embodiments, the pre-processing includes a feed forward through all of the lower stages in order to arrive at the input to the intermediate stage being trained. This improves the speed of the model training. That is, during training of the harmonization model, in order to obtain input data for, say, stage 3, the image being trained on must be fed through stages one and two. Here, an optimization is performed such that the feeding through of the images through stages one and two is performed as a pre-processing step. This makes data loading more efficient, and allows parallelizing the pre-processing.

The harmonization described herein may be variously adapted to be performed on GPUs, TPUs (Tensor Processing Units), or any other processing unit as applicable. For example, the harmonization may be performed on TPUs, where the implementation on TPUs reduces the amount of training time as compared to, for example, using GPUs. The following are details regarding harmonization training using TPUs (e.g., where the model is implemented using TensorFlow, as described above). This includes implementing the training loop for each GAN stage for use on TPUs.

TPUs are efficient at processing a large number of samples. In some embodiments, training a model is performed in batches. Typically, a batch is filled as large as fits into memory.

One advantage of a TPU is that the batch size may be much larger as compared to if a GPU were being used, because the TPU has multiple cores. For example, the smallest TPU may have eight cores, where each of the cores receives a batch of samples and performs the model optimization, bringing back the update steps for the model optimizations which are accumulated, where weights are then updated and then the next batch is processed and split out onto cores. That is, TPUs are optimized for processing large batches of images, and are much faster than GPUs.

In the above example of harmonization model training, there is only one image (512×512 image) as input, where the one image is passed through the generator network and the discriminator network (e.g., as shown in the example of FIG. 32). In the GPU case, only one image need be inputted for training. For a TPU, at least eight images would be needed (using the smallest, eight core TPU), because there may be a minimum batch size (e.g., eight images). The following are example details of how to take advantage of TPU core parallelization.

One challenge of implementing the harmonization on a TPU is the noise map. The noise map that generates the original image is generated once. The generator and discriminator networks of the GAN are trained in such a way that they learn their tasks. It is also enforced that there is a noise map, the reconstruction noise map, that generates the original image. For example, loss functions, etc., may be set up to enforce that there should be one map that generates that original image. While the noise map that generates the original message is not necessarily used in the harmonization process, during training, the noise map forces the network to ensure that it can reconstruct the original image.

On a TPU with eight cores, there will be eight noise maps generated during training. In this example, each core behaves as its own harmonization implementation instance. Rather than performing training of the harmonization model once, it is performed eight times, where the harmonization model is replicated eight times and run eight times independently on the eight cores (that is, what would be done on one GPU is being performed eight times in parallel). This training would result in eight reconstruction noise maps being generated, and weight updates from the eight cores. Ultimately, training of the harmonization model should result in one reconstruction noise map, with one set of weights decided upon.

That is, in the case of a single core running an instance of the model, a noise map would be generated, an update of weights would be performed, another map would be generated, etc., where the last noise map that is generated is used as the reconstruction noise map. Here, where there are eight cores, eight noise maps are generated. An aggregation is performed to determine a final reconstruction map based on the eight reconstructions maps that are generated.

The following is an example process for aggregating the generated noise maps that would generate the original images from the eight different cores. In some embodiments, aggregating the noise maps includes determining an optimal noise map from the multiple reconstruction noise maps that are generated, where the optimal noise map is one that results in the smallest error between the real image and the synthetic reproduction of the background image (i.e., the noise map that generates the best fake image that looks closest to the real image).

In some embodiments, the aggregating includes determining an average of the noise maps. It may also include selecting a noise map from a specific core. The optimal noise map may also be selected randomly. The noise map to be selected may also be determined based on empirical data and observation (e.g., determining that the noise map generated by the first core historically has the smallest difference between the real and fake images).

Implementing the harmonization model on a multi-core TPU further includes parallelizing the implementation of the training of the harmonization process across the cores. This includes implementing the forwards and backwards passes and updating of weights to work on eight parallel cores.

While the eight cores work independently of each other, when training, an input is taken and fed (and upsampled) through the model, and then the back propagation determines the model updates that should be applied for a forward pass. Multiple forward and backward passes are then performed to minimize loss. If there were only core, this would be done multiple times until a minimum is reached. In the example of having multiple processes running on multiple cores, one forward pass and one backward pass is performed on each core (by the respective instances of the model running on the core). After each cycle of one forward pass and one backward pass, the weight updates from all eight cores are aggregated and then applied to the model. That is, the copies of the model on the eight instances on the eight cores are synchronized, where they update their weight synchronously.

Here, the aggregation of the weight updates may include averaging of the weight updates received from the training of the different model instances (which may have generated different weight updates at the end of a backwards pass). The average weight update is then sent back to the eight copies of the model, which update themselves accordingly. Here, rather than performing eight steps in series, eight steps are performed in parallel. In this way, eight times less steps are performed to reach the same result (determination of the final weights for the harmonization model) as if a single core were being used. This optimization, together the above mentioned data pre-processing, reduces training time of the harmonization model significantly (e.g., from seven hours to approximately 50 minutes).

Using the Harmonization Model to Generate Synthetic Change Detection Training Samples The trained GAN may be used in a variety of modes.

When the harmonization model is operated in reconstruction mode (e.g., to reconstruct the original background image from the corresponding reconstruction noise map generated as part of the training), the lowest GAN stage is configured to attempt to reconstruct a down-sampled version of the original image. That is, this lowest stage GAN does not deal with the fine details of the image, but still maintains the overall structure of the image, while producing a version of the image that has been down-sampled to a much lower resolution. Here, the lowest stage GAN is configured to attempt to produce images that represent the overall appearance of the image. The output of one GAN stage is then upsampled and fed into the next GAN stage, which takes the down-sampled version of the image and outputs a version with more detail (e.g., adds more detail to the inputted version), which is then upsampled and fed into the subsequent GAN stage. This process is repeated until the original resolution of the image is reached.

That is, in one embodiment of using the GAN model, for each 512×512 background image on which the harmonization model trained, there is a noise map that generates the original image. During training, the GAN algorithm is forced to learn that there is one specific noise map that is able to reconstruct the real background image (the reconstruction noise map). If that particular noise map is injected at the lowest GAN state, and the processing is performed through the entire GAN pyramid, this results in the original image being reproduced. For example, the noise map is injected into the first stage of the GAN, which produces a coarse image. The output is upsampled and fed into a next stage of the GAN, which adds finer grain details.

Here, in the reconstruction mode, the original background image is reconstructed using the reconstruction noise map. During training, the GAN learns the statistics of the original image, such as the details or features to be included, which are encoded in the GAN stages, allowing the GAN pyramid to reconstruct the image. For example, if the reconstruction noise map were injected into the first GAN stage, a down-sampled version of the input image would be recreated by the first stage. For example, if the reconstruction noise map generated during training were injected into stage 3204, stage 3204 would generate a coarse (down-sampled) version of the original background image. The coarse image would then be inputted to the next stage 3208 which generates an image of finger grain, and so on. The reconstruction noise map enforces the harmonization algorithm to be trained to be able to generate the original image from the reconstruction noise map.

In another mode, a noise map different from the reconstruction noise map may be injected at the lowest stage 3204, producing a very coarse resolution image 3206. The coarse resolution image is then upsampled fed up to the next stage 3208. The next stage fills in details that are missing in the lower stage image. As the process progresses up the stages, more and more details are filled in until the full resolution image is arrived at. In this way, a fake image 3210 can be generated that has the same internal statistics as the background image on which the harmonization model was training, but with a different appearance. This is one embodiment of an implementation using a pyramidal GAN, where noise is injected and a fake image is created that has the same appearance as the real image.

In this example, to perform harmonization, the trained pyramidal GAN is operated in a harmonization mode to generate training data for a change detector model. Here, the harmonization model is used to generate realistic-looking (but synthetic or fake) geospatial imagery that has structural change embedded. In some embodiments, harmonization model 2912 is configured to perform harmonization of patched images.

In some embodiments, after having trained the GAN pyramid on the background image as described above, the patches to paste are sampled from the surrounding of the background image, also as described above. Such sampling of patches as described above ensures that the internal statistics of the patches are not dramatically different from the background image, and will lead to improved harmonization results.

As described above, as part of patch sampling, a location image tile is obtained, where the background image used to train the GAN pyramid is a portion (e.g., central portion) of the full image tile. For example, the size of the image retrieved at location (longitude, latitude) is chosen to be twice the size of the background image used to train the GAN pyramid. In the example of FIG. 31, the central part of the image was designated as the background image and used to train the GAN pyramid. In some embodiments, the patches are sampled with a random width and height, where the minimum and maximum sizes are adjustable parameters. As described above, in some embodiments, for each sub-image (e.g., quadrant of the background image), a random number of patches is chosen to paste in or apply, where the minimum and/or maximum number of patches are adjustable parameters. As described above, each sampled patch is pasted at a random location within the background image in such a way that the patch fits into the image. This may cause certain patches to overlap, which is allowed.

After the patches have been pasted into the background image for which the GAN pyramid has been trained, the trained GAN pyramid is used to harmonize the patched image. As will be described below, in some embodiments, the harmonization is performed on the patched background image before being subdivided into smaller sample images that are included in respective change detection training samples.

Referring to the example GAN of FIG. 32, the following is an embodiment of using a GAN to generate a harmonized image.

In some embodiments, for the harmonization, the down-sampled background image with patches is inserted into a specific stage of the GAN pyramid (also referred to herein as the start scale), and random noise is added. In some embodiments, the upper stages of the GAN pyramid then fill in the details to obtain the image at full resolution. After the patched image has been harmonized, it may be subdivided into a specified number of images to be included in change detector samples, as will be described in further detail below.

That is, when operated in harmonization mode, to perform harmonization of a background image with injected patches, rather than starting with only a random noise map, the patched image is inserted into an intermediate GAN stage, such as the third stage, In some embodiments, a down-sampled version of the patched image (background image including the patches) corresponding to the resolution of the intermediate stage is provided as input. At this point, the change will not look continuous and will be disjoint from the background. When such an image is fed into the pyramidal GAN (that was trained on the original, unedited image), because the GAN is attempting to reconstruct the original background image (without anything pasted into it), but the background image has now had change pasted into it, the pyramidal GAN will attempt to correct or fix any discontinuities. This results in the GAN outputting a harmonized image that has the change incorporated in a realistic manner.

That is, in some embodiments, when performing the harmonization, the GAN is used starting at a specific intermediate stage of the pyramidal GAN. For example, returning to the example of FIG. 32, a patched image (e.g., background image with patches pasted in) is injected as input into the GAN at an intermediate stage (e.g., third stage). Other harmonization start scales may be selected.

When performing harmonization, the stages below the stage at which the patched image (background image with pasted patch) is injected are neglected. For example, if the modified image with the pasted patches was injected into stage three, the stages one and two are neglected entirely. In some embodiments, the modified image that is inputted to the third stage is a down-sampled version of the un-harmonized patched image that is at the resolution of that stage. The output will be a harmonized image that has the appearance of the injected patches having been natively a part of the image.

An example assumption is made that if the harmonization model were run with the original reconstruction noise map, then at that point, the down-sampled version of the original background image would have been generated (because that reconstruction map that generates that down-sampled version was used). Here, during harmonization mode processing, the input to the third stage is not an image generated by the lower stage, but rather, the down-sampled augmented version of the original 512×512 background image (at the resolution of the input stage of the generator pyramid of GAN) that has the patch included. In some embodiments, the patched image is inputted along with random noise to the start scale.

3212 illustrates an example of the processing performed by a generator stage of the generator pyramid 3216. In this example, the input patched image is added with the random noise. The sum is fed through a neural net 3214 and whatever is learned is added back with the input patched image to generate an output image. Here, a residual value is learned from the sum of the noise and the input image, which is then added back to the input image. For example, if the residual value learned by the neural net during training is all 0s, then adding all 0s will not change the input image, and the output image is the same as the input image. By adding noise, the neural network is allowed to produce a different version of the input image.

In a middle stage, what is input is the version of the image that was generated by the previous stage, along with noise. The task of the generator model is then to use those inputs to "fix" the details in the input image, where in the case of the input image being the background image plus inserted patches, the "fixing" includes making the combined image look real. That is, given an input image at a certain level of coarseness, the stage of the generator will include details to generate a finer version of the input image (e.g., to generate what the model predicts, according to its training, to be a higher resolution version of the input image).

While in the above example, the patched 512×512 image was inputted at the third stage, the stage from which the generator starts running may be changed. As one example, suppose the GAN pyramid has 10 stages. The stage number at which the patched image is inputted affects the details that are changed. The higher up the pyramid that the patched image is injected, the more details are being modified. Here, the lower stages of the GAN fix or set the overall appearance of the generated image, where higher stages fix smaller details.

If the patched image were inputted at the highest stage, the generator would make only minor changes of small details. Whereas if the patched image were inputted at a lower stage, more of the patched image would be modified. For example, if the patched image were injected at the lowest stage, this would modify the structure of the patch heavily (while the upper stages would only fix smaller details).

In some embodiments, the stage at which the patched image is inputted is empirically determined so that the structure and appearance of the patch inserted into the background image is maintained. In this way, it is predominantly the edges (e.g., discontinuities introduced due to patching) that are fixed or smoothed out. If the patched image is inputted at too high a stage, the edges would not be fixed. In this way, the harmonization model generates, based on its training, a higher resolution version of the coarser, lower resolution inputted patched image (effectively harmonizing the sampled patch and the background image).

In this example, the output of the model is a harmonized image that is a version of the 512×512 background image with the patches harmonized in. In some embodiments, the harmonized background image is further subdivided into 256×256 pixel training sample images that are smaller than the harmonization training image (background image) used to train the GAN model. This may be done for efficiency purposes so that one pass of harmonization training may be used to generate multiple output change detector training images (four in this example case). For example, the training of the harmonization model may be lengthy. A harmonization training image is chosen that is as large as possible for training so that many different patches may be injected. For example, once the GAN is trained on the 512×512 training image of FIG. 31, all of the patches shown in FIG. 31 may be injected at once. The harmonization process described above is then performed. The output is a harmonized 512×512 output image that is then split into four smaller images. In this way, after training the GAN once on a background image, a forward pass through the GAN generates four harmonized sample images (e.g., the four sample images of FIG. 31). That is, the GAN is trained on a single background image. The number of training samples produced may be increased by training a large background image and splitting it afterwards. The multiple samples with different patches from the same background image are then created.

In some embodiments, more than four images may be outputted through the application of different samplings. Here, training on the 512×512 image is performed only once, then one set of patches is sampled, harmonized with the image, and then the harmonized image is split. Multiple sets of patches may be sampled and pasted to the same background image, where different samples are of different locations, and the harmonization process is repeated again. In this way, each time harmonization is performed, four images are obtained that have the same background, but have different patches injected.

In some embodiments, the amount of sampled patches is random, and the locations for which they are sampled are random, and the locations where the patches are being inserted are also random. In this way, each pass of the patch sampling, injection, and harmonization yields a different harmonized image. This is one example way of speeding up the generation of harmonized sample images to include in change detection training samples. That is, by only training the GAN on one 512×512 background image, multiple 256×256 sample images may be obtained. For example, for a given background image, each round of sampling and harmonization with injected patches yields four sample images. For the same background image, different sets of patches in different locations may be sampled and pasted into the background with harmonization performed. If five passes of harmonization are performed (where each pass involves the random injection of a random set of patches in the background image), then this yields 20 sample images that can be obtained from the training of the GAN on one background image, before sampling a new location. That is, for the same background image (on which the model is trained), 20 samples with different patch arrangements are generated.

The harmonization process is relatively fast compared to the training of the harmonization model. Once the patched images are generated, in some embodiments, the harmonization to generate the higher resolution harmonized image is one forward pass of the model. To generate change detector training sample images for different environments, the model is trained with other background images.

Synthetic Training Samples

In some embodiments, the harmonized sample images generated by the GAN are used to generate the training samples for training the change detector model described herein. As described above, in some embodiments, a change detector training sample includes three components:

A harmonized image, which for example is a sub-portion of the harmonized full image described above. This harmonized sample image is used as one of the inputs to train the change detector, as will be described in further detail below.

A corresponding reference image for the harmonized sample with the applied patches (structural changes). In some embodiments, the reference image is the same as the harmonized sample, but without inserted patches. As one example, the reference image is the portion of the unmodified background image corresponding to the harmonized sample.

In another embodiment, the reference image is an unmodified image of the same scene as the harmonized sample (e.g., same region of the Earth), but from a different date (e.g., different date from the background image). The selection of a time shifted reference image is so that when training the change detector model, the change detector is trained using reference images that are slightly different from the original background image used to train the harmonization model (and therefore influenced the harmonization process used to generate the harmonization model), and will therefore learn to ignore the pixel-wise variations between two different observations, and instead be trained to look for structural change. As one example, the reference image is not more than 30 days separated in time from the original background image (based on which the change detector training sample was created). The window of time may be selected to minimize the chance of structural change occurring (e.g., the building of a structure). In this way, by choosing a reference image from a different date, the change detector model may be trained to be invariant under pixel changes, and better able to detect structural changes. As the conditions change between scenes from different dates, the original background harmonization training image and the reference image are likely to have slightly different pixel values.

A corresponding target mask is also included in the triplet, where the target mask indicates the areas or known locations in the harmonized sample image where the patches were inserted.

Figure 33:
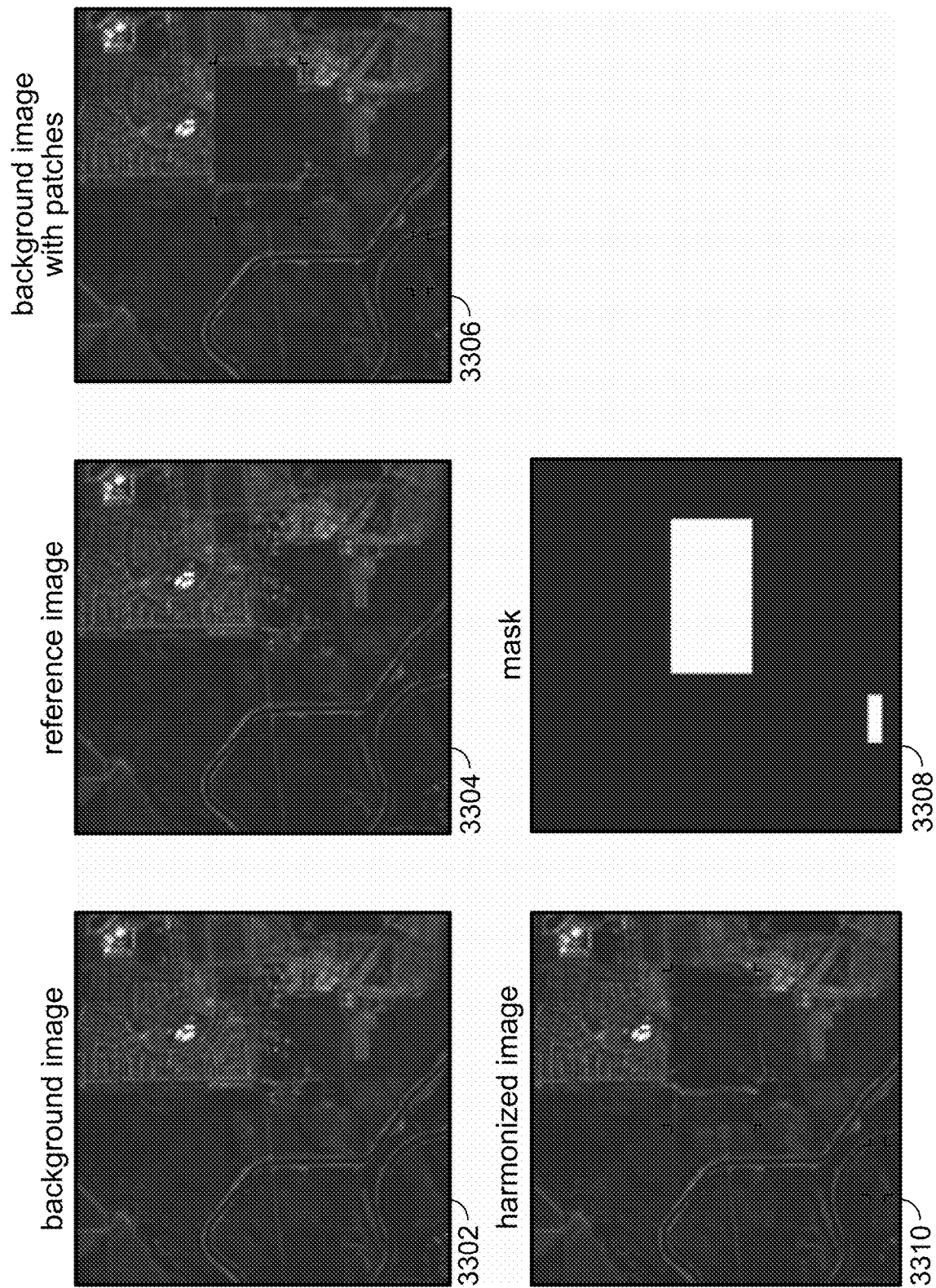
FIG. 33 illustrates an embodiment of a synthesized sample set.

FIG. 33 illustrates an embodiment of a synthesized sample set for training a change detection model. The images in FIG. 33 represent various images associated with the synthetic sample generation process, where some of the images are included in a training sample that is used to train a change detection model. In this example, the images shown in FIG. 33 are 256×256 pixels. There is an unmodified image 3302. For example, the unmodified image 3302 is a portion of the background image used to train the GAN, and does not include any patches. There is a reference image 3304 that is, for example, the same as unmodified image 3302, but shifted in time, as described above. Image 3306 is the patched image that includes an un-harmonized version of the background training image with patches (prior to harmonization). Image 3306 provides the mask 3308, so that the change detection platform knows the locations of where the patches were inserted, the size of the inserted patches, etc. Harmonized image 3310 is the harmonized version of image 3306 that is a realistic version of image 3306 with the sharp edges removed and the patches seamlessly integrated with the background image. In some embodiments, for the change detector, what is provided as an input is the harmonized image 3310, the reference image 3304, and the mask 3308. These three images are components of one change detector training sample.

Here, in order to improve the effectiveness of the change detector model described in further detail below, the training sample generator synthesizes training images of the same type and same characteristics as that will be fed as input to the change detector. For example, the image resolution and/or spectral bands of the images on which change detection will be performed are the same for the images on which the change detector model is trained. That is, the change detector model is specific to a type of imagery with certain spectral and resolution characteristics (e.g., specific resolution and/or certain number of input bands) (but not specific to detection of certain types of objects). Applying a trained model to imagery with a different resolution to the training samples the model was trained on may reduce the efficacy of the change detection. While the models described herein are tuned and trained for a particular type of imagery that has certain image characteristics (e.g., with particular spectral bands and/or resolutions), generic change is able to be detected within that type of imagery using the change detection techniques described herein.

Synthetic training samples (that do not exist in the real world) for various types of imagery may be generated using the techniques described above. For example, multiband imagery with any number of spectral bands may be generated. As another example, training samples for low resolution or high resolution imagery may also be automatically generated using the techniques described herein. For example, when a user would like to create a change detector model for the certain type of imagery that they have, they can train the harmonization model on imagery of the same type using the techniques described above.

Performing Change Detection

Figure 34:
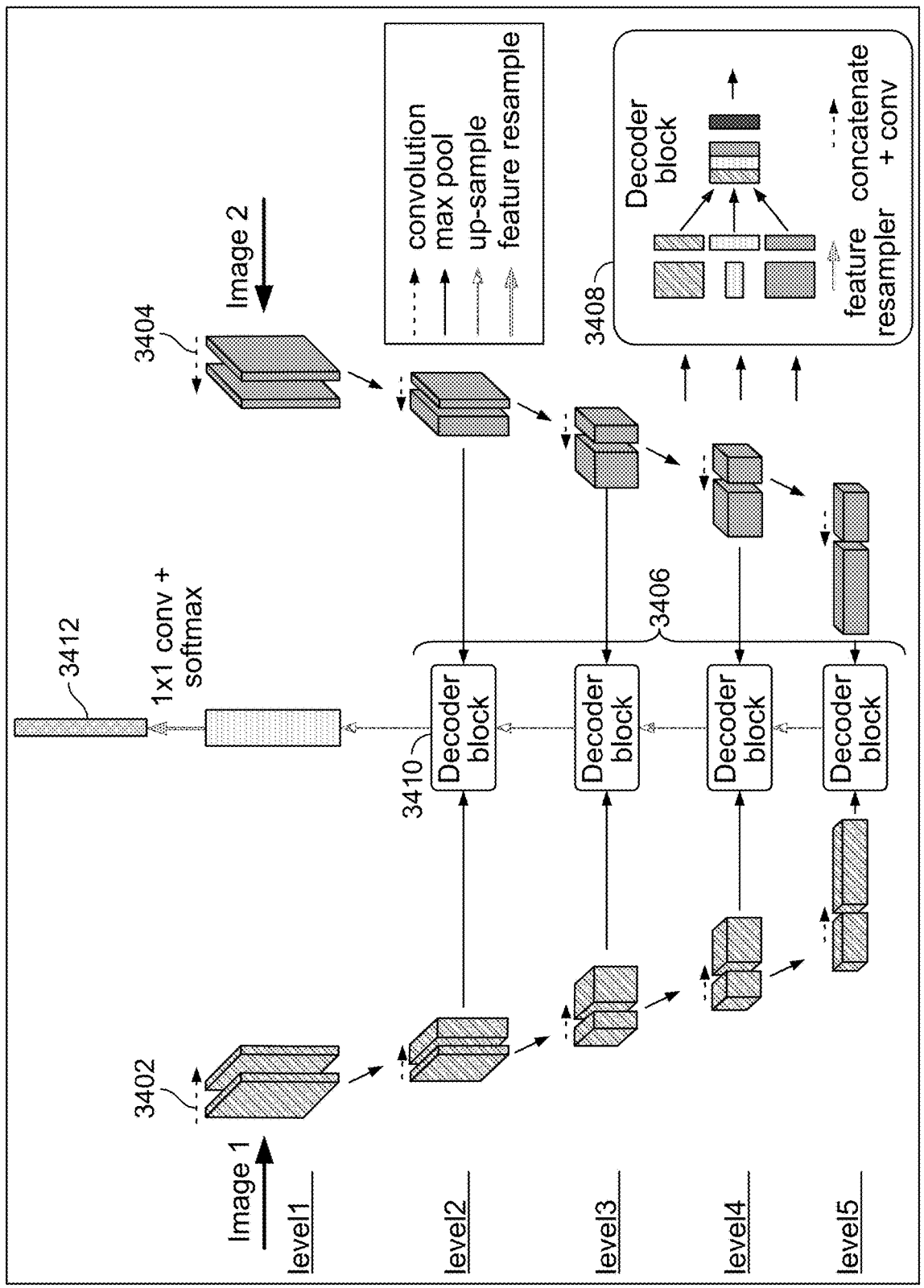
FIG. 34 illustrates an embodiment of a model architecture for change detection.

The following are details and embodiments regarding performing change detection using a change detector model. As one example, the change detector model is implemented using a convolutional neural net. The following is an overview of an embodiment of a change detector model architecture FIG. 34 illustrates an embodiment of a model architecture for change detection. The architecture shown in FIG. 34 is referred to herein as a "WNet," where the network includes two encoders (3402 and 3404) and a decoder 3406 with decoder blocks (which in the example of FIG. 34 forms a "W" shape). The change detector model is used to determine generic structural change between two images.

Convolutional neural networks are effective at extracting features from an image. Typically, an image is provided as input to a neural net, and the neural net attempts to extract important features from that image to perform downstream tasks. For example, if a user would like to classify an input image (e.g., is the image a cat or a dog), the image is fed through the neural network or image encoder, which attempts to extract all of the valuable information from the image in order to classify what that image represents.

When using convolutional nets, a set of filters is run over the image or feature maps that cause neurons to be activated if they are evaluating an important structure that is informative to the type of object that is in the image. These filters are learned by the model training. That is, the convolutional neural net takes an input image and runs a filter over the input image. The output of the convolutional neural nets are activation maps that highlight or otherwise indicate important features in the image. The filtering is typically done in steps, where the first several filters run over the full resolution image and pick out detailed structural information. A max-pooling operation is performed using the activation map. The activation map is scaled down and only the most important features are extracted (e.g., scaled by factor 2). This corresponds to level 1 and level 2 of FIG. 34. At level 2, features are extracted from the down-sampled version. Here, receptive fields are increased and core structures are evaluated which are then processed and down-sampled once more. Here, the activation maps at each of these levels extract structures and features of the image.

In some embodiments, the model architecture shown in the example of FIG. 34 performs generic change detection as follows. The feature maps described above include extracted information from an image that represents structure. Here, rather than comparing two images based on their input appearance (e.g., performing a pixel-by-pixel comparison), the feature maps of the two images are compared to determine the difference between features of the two images.

As described above, the synthetic change detector training sample generator provides as output change detector training samples by using the harmonization model described above. As described above, in some embodiments, a change detector training sample includes: a harmonized image; a reference image; and a target mask.

As one example of using the change detector of FIG. 34, two images are input to the WNet model. In this example, a first image, image 1, is input to the first encoder (3402). A second image, image 2, is input to the second encoder (3404). The images are encoded by the encoders. In this example, encoders 3402 and 3404 are both the same encoder network that is used to extract the features.

At the different levels, the features of the two images are compared. For example, the encoded feature maps are picked out at various stages of the network and compared against each other to determine a difference in the extracted features. That is, in contrast to, for example, performing a pixel by pixel level comparison, a comparison is performed of the abstract features extracted by the encoders from the input images. If the input images were the same, the encoders would extract the same features. Anything that is different structurally will appear as a difference in the feature maps. The differences are an abstracted version of features (and would not necessarily be human-recognizable).

In the WNet architecture shown in the example of FIG. 34, there is one common decoder path 3406. The decoder path includes a series of decoder blocks (one at each level of the decoder path). An example of a decoder block is shown at 3408. The decoder block is configured to take the feature maps of both encoded networks at the corresponding level, as well as the output of the previous decoder block as inputs and perform an operation on the two feature maps. In some embodiments, the inputs are resampled to the resolution of the corresponding level. In some embodiments, each decoder block corresponds to a down-sampled resolution.

As described above, the decoder block has three inputs. In addition to the feature maps from the corresponding level of the two encoders, the output of a lower decoder block is also provided as input. This input from the lower decoder block is at a lower resolution. In some embodiments, the lower resolution output of the lower decoder block is up-sampled so that it is at the same resolution as the feature map inputs (where each level of the W-Net corresponds to a resolution).

In some embodiments, the decoder block is configured to stack the three inputs and feed the three inputs through a neural network to generate an output. The decoder block is configured to collapse the three inputs to generate a version of the three inputs. For example, the decoder block determines the differences between the features and feeds that information up into the next level, which then takes the next feature differences and then compresses them into a representation that is then fed up into the next stage and so on until the last stage is reached. As one example, the output is another feature map. The collapsed information output is then provided as input to the next decoder block in the path.

The output of the last decoder block (3410) is a change map 3412. The output of the last decoder block is at the original resolution. Ultimately, there is one map that has taken all of the encoding and decoding information from the previous stages and that indicates the differences between the two images and the locations of those changes.

The following are further details regarding the training and use of such a change detection model.

Training a Change Detection Model using Synthetic Training Data

In some embodiments, the training samples generated using the synthetic training sample generation techniques described above are used to train a change detector model with an architecture such as that shown in FIG. 34. In some embodiments, change detection model training engine 2914 is configured to perform training of a change detection model.

In the example model architecture of FIG. 34, the change detector model includes two encoder paths. In some embodiments, the encoders used to extract features from maps are pre-trained encoders that have been previously trained on a large set of natural data. Examples of encoder networks and architectures include convolutional neural networks such as ResNet. Different encoder networks may be used in various embodiments.

In other embodiments, the pre-trained encoders need not be used. The encoders may also be trained. In some embodiments, a hybrid encoder model is used, where pre-trained encoders are augmented with additional layers to account for other types of imagery of interest that the pre-trained encoders were not trained on. For example, the encoders may be trained using certain types of imagery (e.g., with certain spectral bands that match the input type). As one example, if the pre-trained encoders are only trained on RGB data, this may result in a mismatch if the images to be inputted into the change detector model have different spectral bands (e.g., more than RGB). In some embodiments, to accommodate for different spectral bands, the encoders are modified to include additional layers at the input that are trained to handle input with more than three bands. The added layers for additional spectral bands may be added to a pre-trained encoder network, where the new layers are trained (with weights updated), but the layers of the pre-trained encoder need not be trained.

In some embodiments, training the change detector model includes fixing the weights of the encoder networks and training the decoders, where the decoder is trained or taught to use the features extracted from the pre-trained encoders to determine a change map.

The following is an example of using a training sample that, as described above, includes a reference image, a harmonized image, and a corresponding target mask, to facilitate training of the decoder of the change detection model.

The reference image is inputted to one encoder, and the harmonized image is inputted to the other encoder. The encoder networks generate feature maps at the various levels. The decoder network, taking the feature maps at the various levels, generates a change map as output. The change map is then compared to the target mask (which has the known location of the patch). The weights of the decoder are then updated based on the comparison. Multiple iterations are performed to improve the efficacy of the decoder (e.g., to minimize the difference between the change map and the target mask). This is done to reduce or minimize a loss function that is the difference between what the change detection network generates and what the target mask indicates as the known change locations. The training is run over multiple training samples to improve the ability of the change detector to determine the structural change (e.g., output mask that indicates locations of changes or feature differences between the two images).

In some embodiments, on-the-fly data augmentations are applied to the change detection network to make the network more robust. One example data augmentation that is performed is flipping the order in which the images are injected. For example, instead of only inputting reference images down encoder path X, and harmonized images down encoder path Y, the encoder path in which a given type of image is inputted is randomly flipped. That is, in some embodiments, the selection of which encoder path a harmonized image or reference image is inputted into is randomized.

For example, in one pass, the reference image is placed down path 3402, while in another pass, the reference image is randomly inputted down path 3404. This randomization of which encoder path a certain type of image is inputted down makes the network more robust, so that it does not develop a bias or expectation during deployment that one encoder is used only to extract features from images of one type, while the other encoder is used only to extract features from images of the other type. During deployment, images that are separated in time are provided, without necessarily defining some property that harmonized or reference images might have.

Using the Trained Change Detector Model

Once the change detection model is trained, as described above, the trained change detection model may be deployed to detect structural differences between two input images as described above. For example, two input images from the same place, but separated in time, are provided as input. The output is the change or difference between the two images (e.g., change map as described above). In some embodiments, change detection model 2916 is configured to perform change detection.

Example Reports and Applications of the Output of a Generic Structural Change Detector The following are examples of output that may be provided using the change maps (or other indications of differences between two images) outputted by the generic change detector described above.

FIG. 35A illustrates an embodiment of inputs to a change detector. In this example, the change detector was deployed over an area of interest (AOI), where images 3502 and 3504 illustrate two images taken three months apart. The images illustrate wellpads.

Figure 35B:
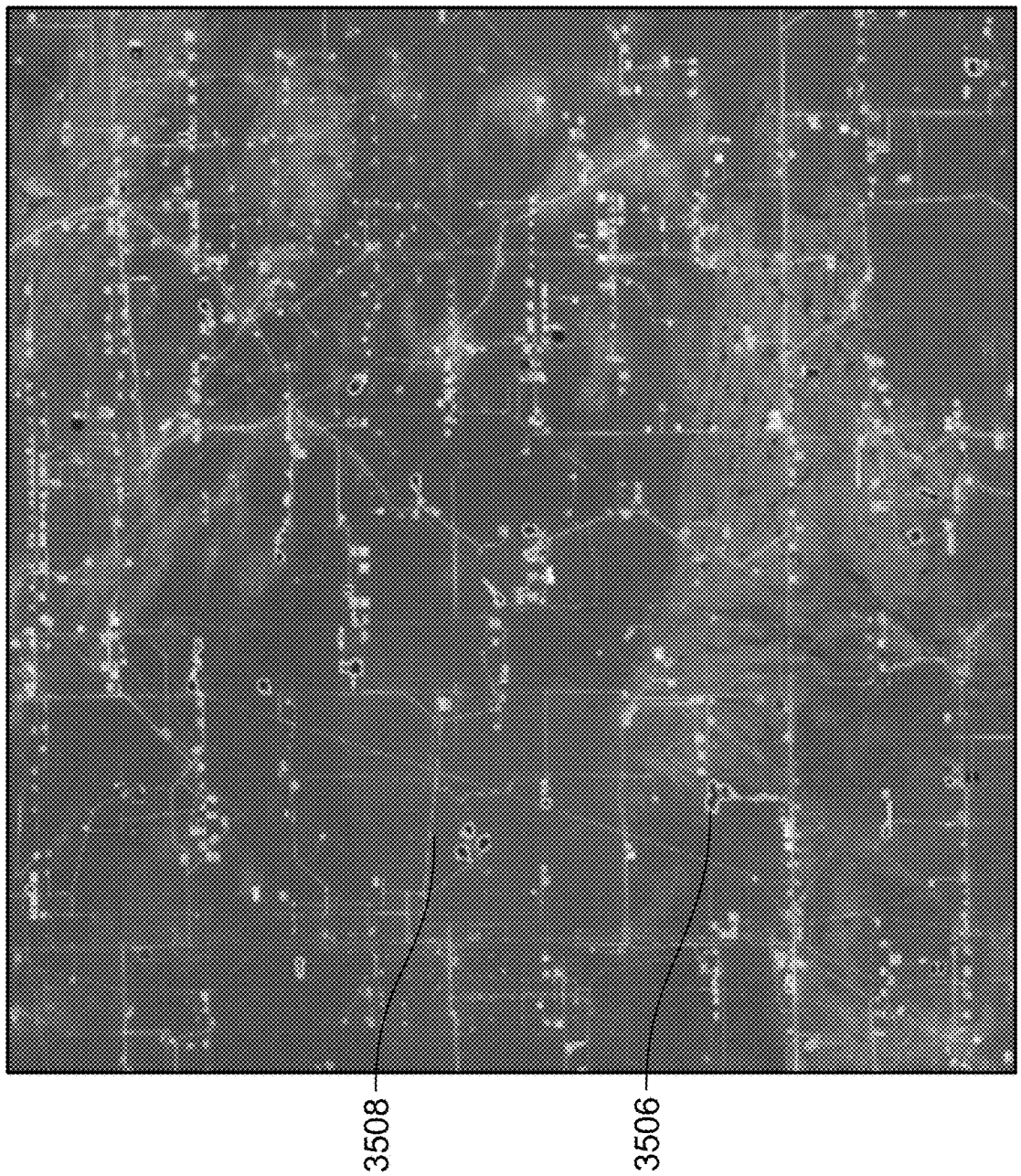
FIG. 35B illustrates an embodiment of output of a change detector.

FIG. 35B illustrates an embodiment of output of a change detector. In this example, a change map is outputted by the change detector, where the change map indicates the locations of differences or changes between the two images inputted to the change detector.

In this example, the change map is overlaid over the second image (3504) to highlight the changes. A degree of confidence of a change having been detected may also be presented. For example, the overlay may be done as a heat map or color map, where different colors indicate different probabilities of change (e.g., red indicates a higher probability of change having been detected, where blue indicates a lower probability of change having been detected). Examples of identified changes include those at 3506 and 3508, among others. While the changes identified using the change detector in this example correspond to what are recognizable as new wellpads, using the techniques described herein, the generic change need not be explicitly directed to identify changes in wellpads or any other specific type of object.

In some embodiments, the selection of scenes when deploying the model over an area is automated. This includes defining various criteria for a scene to be selected. As one example, the scenes are sorted into groups of the same day. After grouping, the scenes are filtered according to criteria such as: the fraction of clouds in a scene that is below a threshold amount of percentage of clouds; the tile coverage is greater than a threshold amount of tile coverage; as well as criteria related to NDVI (normalized difference vegetation index) where an environment is similar to avoid seasonal differences. The criteria may be computed on lower resolution images to speed up processing. The filtered scenes are then passed through a model, where each scene is associated with a time stamp.

Figure 36:
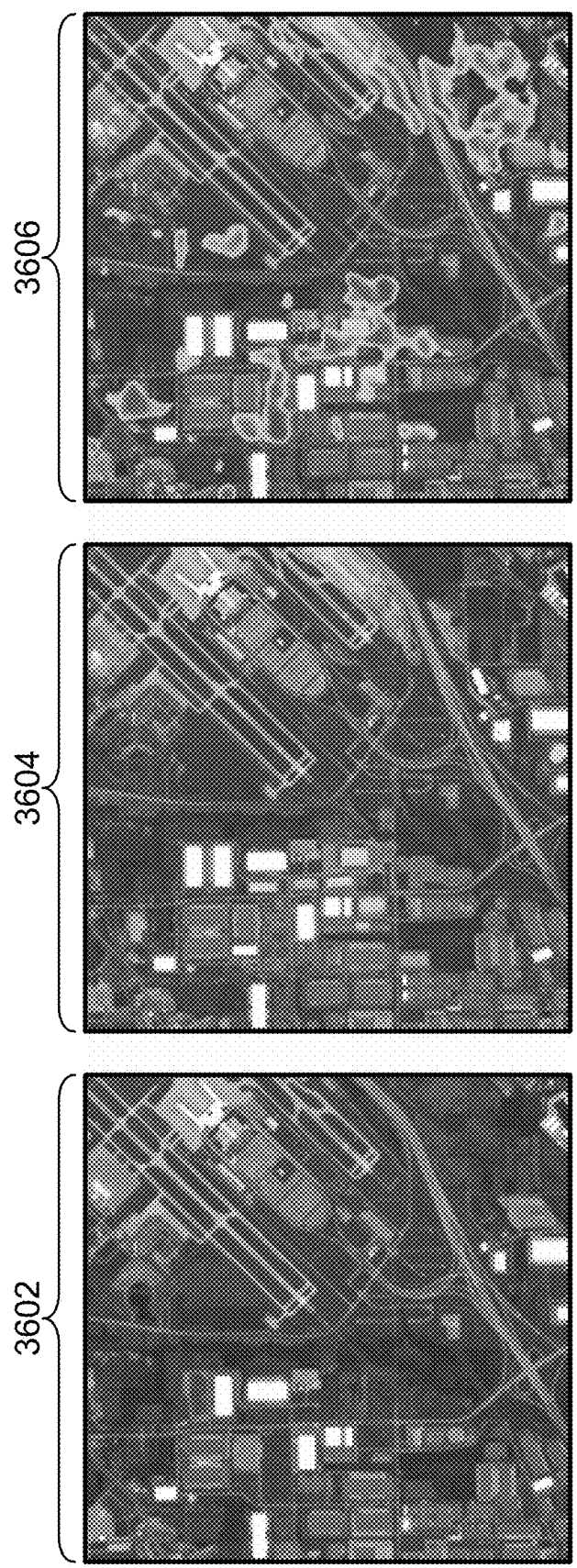
FIG. 36 illustrates an embodiment of change detection.

FIG. 36 illustrates an embodiment of change detection. In this example, the left image 3602 is an earlier scene. The middle image 3604 is of the same scene as 3602, but at a later date. In this example, images 3602 and 3604 are satellite imagery of a portion of an airport, taken at different times. Images 3602 and 3604 are used as input to the generic change detector described above. Based on the output, a change map is generated, which is overlaid on top of the latest scene, as shown in the rightmost image 3606. Here, structural changes to land, such as the construction of buildings, are identified, without the generic change detector having been explicitly trained to detect the absence or presence of specific types of objects.

Batch Mode Processing of Image Stacks

In the above examples of FIGS. 35A-B and 36, detection of changes in two time-shifted images of a same location of the Earth was described. In some embodiments, and as described above, the change detection model described herein is configured to process batches of data. One example of a batch of data that may be processed includes a stack of images, such as a stack of images of the same location taken multiple times by a satellite over a period of time. The processing of such image stacks allows the evaluation and visualization of time series of changes. In this way, temporal aspects of detected change may be incorporated into the change detection model by batch inference.

Figure 37:
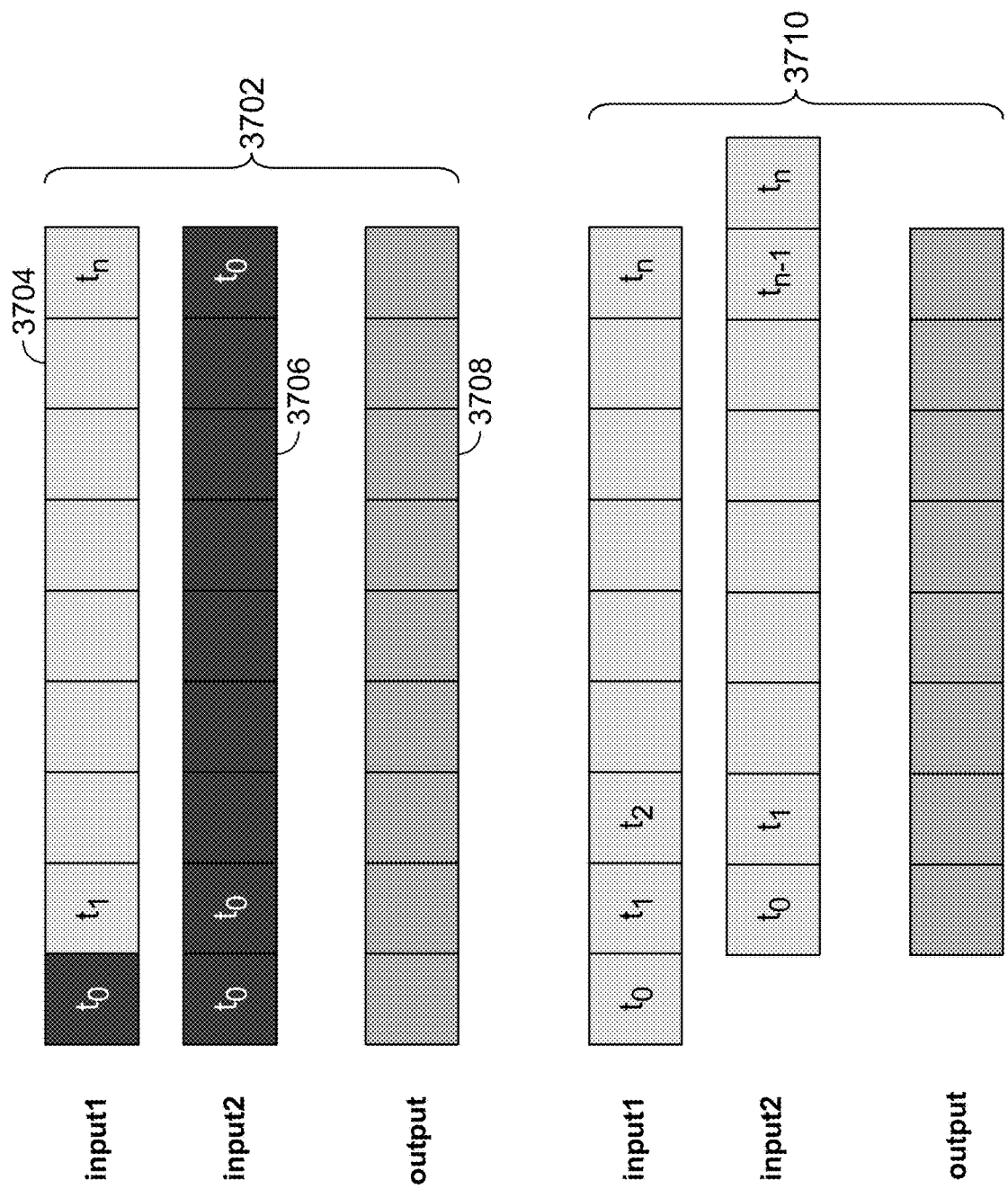
FIG. 37 illustrates an embodiment of batch change detection.

FIG. 37 illustrates an embodiment of batch change detection. Shown at 3702 is an example of detecting aggregate or cumulative change. In this example mode of 3702, two stacks of images of a location over a period of time are provided as input.

In this example, input stack 3704 is shown with images at time 0 (t0), time 1 (t1), etc. up to tn. Input stack 3706 includes only copies of the first image at t0. Feeding the input stacks into the change detector described above produces a batch of corresponding change maps 3708 with a change map at each corresponding time step. Here, there is a change map indicating the differences between each of the time steps compared to the t0 image. That is, in this example mode 3702, one input is a stack of images that are ordered temporally. The other input is a stack of images that is a repeat of the first image in the image stack. This results in the creation of a change map of each image in the stack as compared to the first image. As one example, one input is an array, where the first image of a sequence of images is repeated n times in a batch dimension, where n is the number of images in the image sequence. The other input is images in a sequence. In this example, this stack of change maps is provided with a single forward pass of the change detector. In this example, the model need not be applied multiple times on each pair of images. The stack of outputs is received all at once. As one example, the output of the model is an array of probability maps, where a probability map indicates the change when comparing an image at some index i in the array to the image at t0. The cumulative processing allows a user to view the evolution of the changes relative to t0.

Shown at 3710 is an example batch processing mode for detecting incremental change. In this example, there are two time stacks, shifted by one time step. That is the output change maps show how to compares to t1, how t1 compares to t2, etc. For example, in the mode 3710, the image stack of the second input is shifted relative to the first input. This creates change maps of the inputs relative to the shift. This allows the incremental change between time steps to be highlighted.

Figure 38:
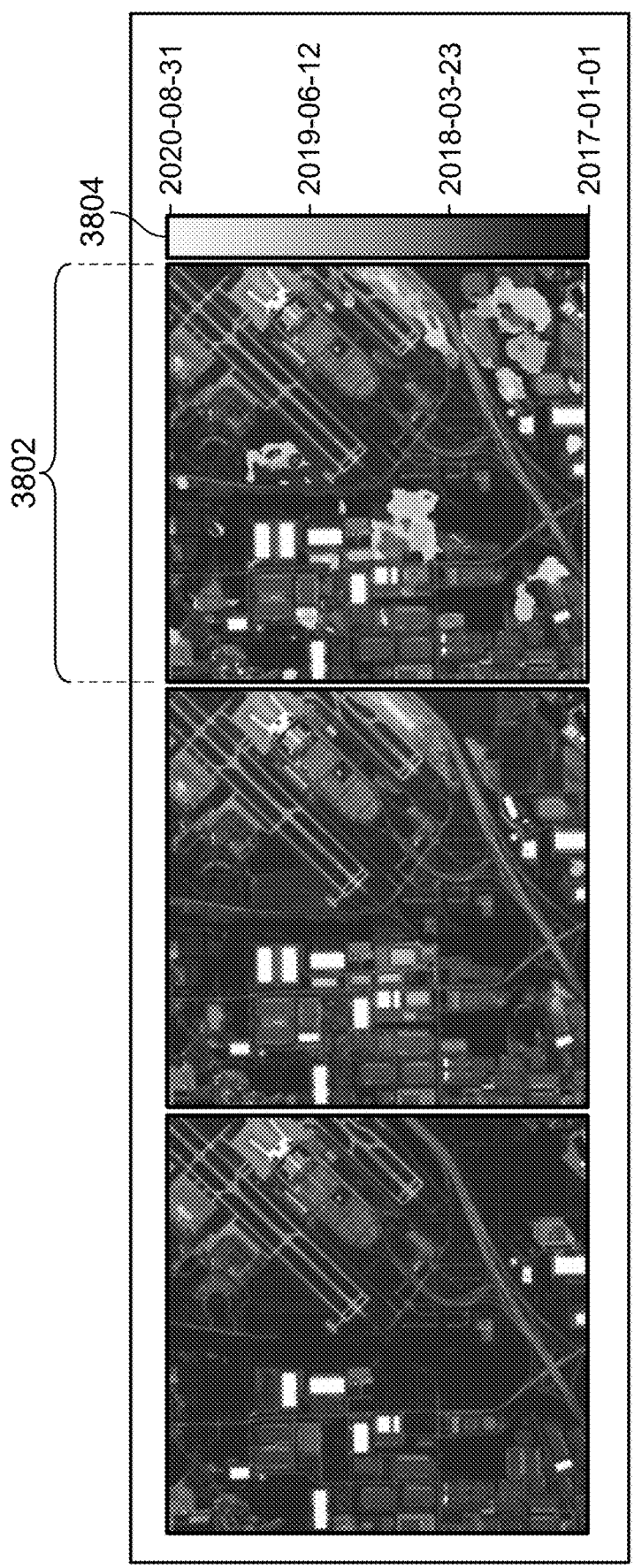
FIG. 38 illustrates an embodiment of tracking change over time.

The following are further details regarding tracking time series of changes. FIG. 38 illustrates an embodiment of tracking change over time. In this example, a user may choose a time window, evaluate every valid scene (e.g., without clouds, similar seasons, etc.), and compare the entire time stack to the first image in a temporal sequence. The output is a sequence of change maps, such as in the first example mode 3702 of FIG. 37, where a comparison is made to the image at t0.

Then, all of the change maps are converged back into a single map to indicate when in time the changes happen. That is, the change maps in the sequence are overlaid on top of each other, where the order of a change map in the sequence determines how the change map is displayed. For example, a heat map or color map may be used to indicate when a change was first detected relative to t0 (initial time of stack).

In some embodiments, an assumption is made that once the change has occurred, the change should remain present in subsequent images of the location. Here, the stack of change maps is collapsed down by the amount of times that change was detected. The change detector may then refer back to the point in time when the change was first observed.

The areas of change and when they occur may be visualized in a variety of ways. As one example, the changes over time are visualized using a heat map or color map, where, as shown in the example of FIG. 38, the intensity of the color of a change may indicate when it was first detected relative to other indicated changes. That is, the color represents the time at which changes happened. An example of this is illustrated at 3802. A legend, such as that shown at 3804, indicates what color corresponds to what date/time. This allows a user to visually comprehend not only where changes occurred, but also when.

In some embodiments, the time at which a change was first detected may be recorded or determined and maintained as follows. Consider a sequence of images that are in sequential temporal order (e.g., first image at t0, second image at t1, third image at t2, etc.). The change map between a first image and a second image is obtained. Suppose that there is a change in the second image. The third image (at the third time step) should have the same change if the change persists. As the change detector is trained to predict the presence of a change, there may be cases where a change is not detected when it should be, or where a change is detected when there was not a change. Further details regarding tracking changes and identifying false positives and/or false negatives are described below.

Figure 39:
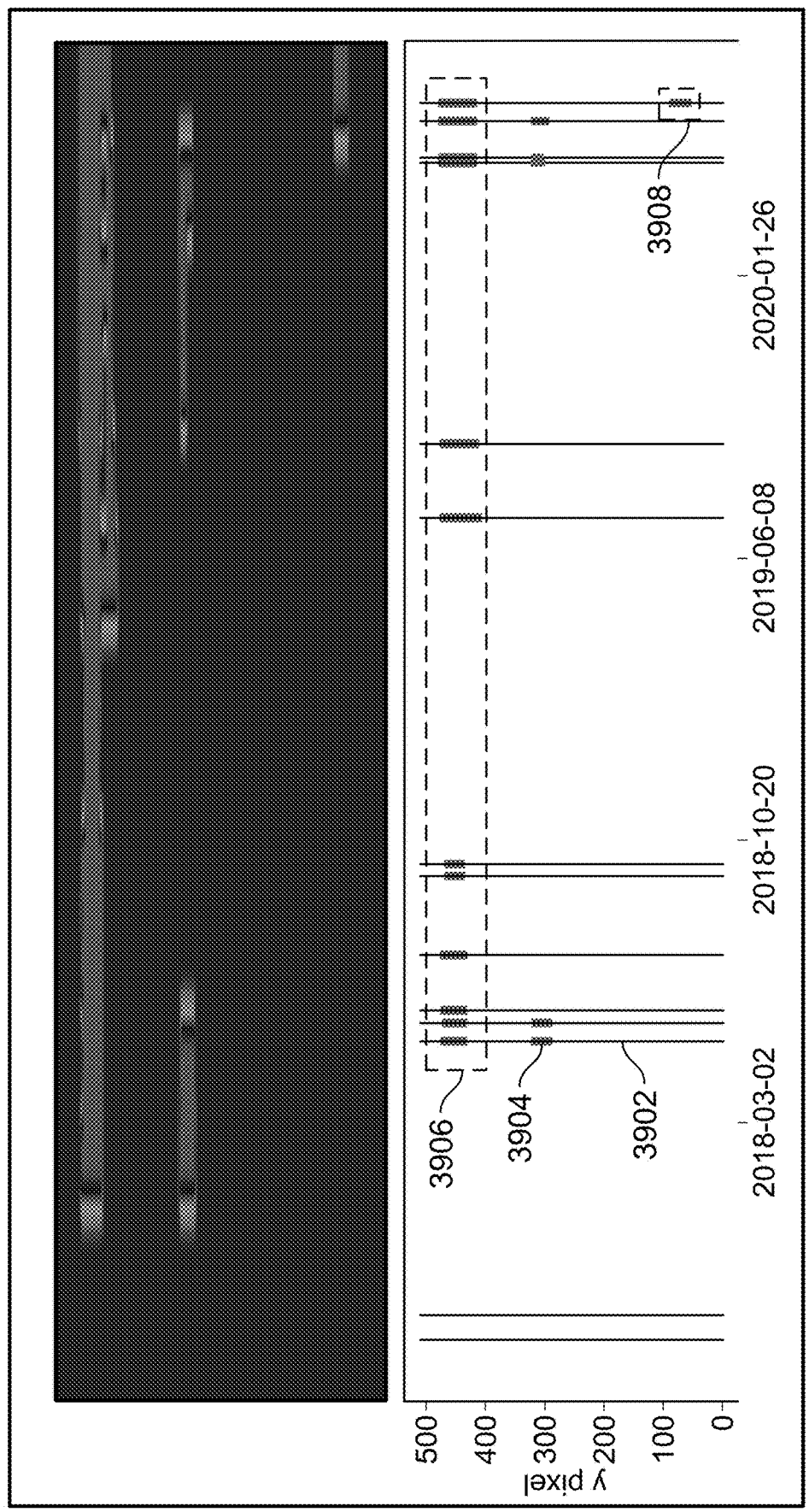
FIG. 39 illustrates an embodiment of a change tracking process.

FIG. 39 illustrates an embodiment of a change tracking process. In this example, each line corresponds to or represents a scene that is available at a particular point in time (e.g., a date). In this example, a line such as line 3902 corresponds to a slice along the y-axis of an image (e.g., y-axis pixels of an image), where, for example, the x-axis pixel position is fixed. The y-axis pixels where changes are detected are highlighted, such as at 3904. Here, the plot of FIG. 39 illustrates a model output with the y-pixel on the y-axis, and the time an image was taken on the x-axis, where the x-pixel value for the image is fixed.

In this example, portion 3906 of FIG. 39 is a marker that shows where a change first occurred, and that the change also occurred in all subsequent scenes. In contrast, the change indicated at 3908 was only detected at the last (most temporally subsequent) scene. In this example, the change detected at 3904 was not detected for a period, but was then detected again at a subsequent time. That is, the distribution of the times of a scene is not uniform, and some changes that were detected in one scene might not be detected in some of the subsequent scenes. This presence, then absence, then presence of a change in a scene over time may be indicative of false positives in change being detected, and in some embodiments are filtered out. Such false positives may occur because of the presence of clouds. For example, interruptions in the sequence of a feature may indicate that the detected change was only temporary, which may occur when there is a change in the appearance of an agricultural field or a cloud was not filtered. Interruptions may also be indicative of a false negative, in which case the interruption or gap is accounted for. This can be achieved by filling in missing change detections in subsequent scenes if the fraction of subsequent scenes that contain the detected change is above a certain threshold.

In some embodiments, if a change is not detected in at least a threshold percentage (50%) of the scenes after it was first detected, then it is determined that what was detected is not actual change, and the change is filtered out. If the change is detected in more than 50% of the subsequent scenes (or the fraction of scenes that contain the detected change is above another threshold), then it is determined that changes were missed or not detected, and the missing change detections are filled in. This may be implemented by calculating the fraction of times a change was detected subsequent to the first time it was detected (e.g., by effectively performing an integration). The final change map may then be generated and used, for example, to provide the visualizations at 3802 and 3804 shown in the example of FIG. 38 (where the tracking is done for each x-pixel position of the images being compared, and then aggregated.).

Figure 40:
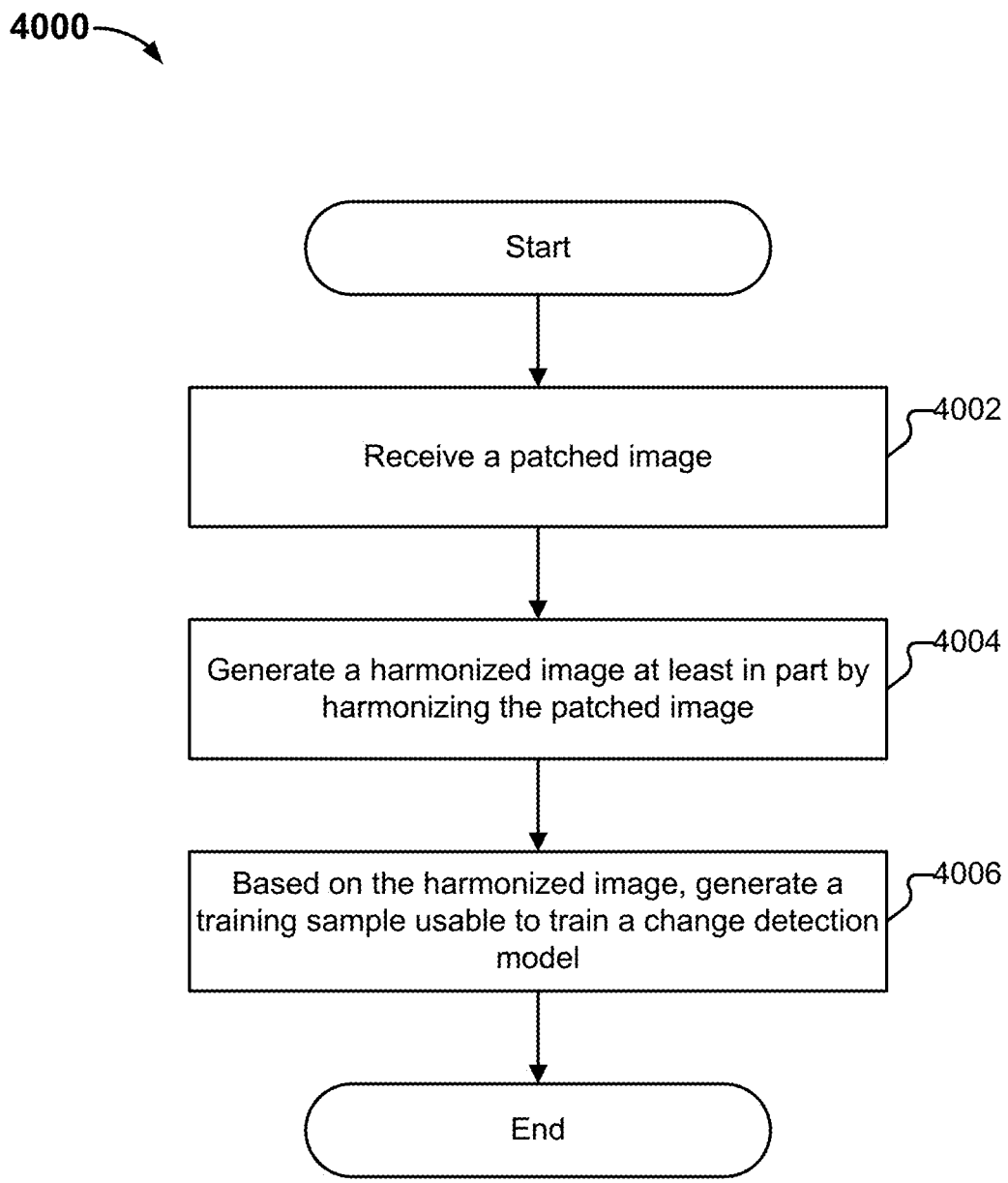
FIG. 40 is a flow diagram illustrating an embodiment of a process for generating a synthetic training sample for training a change detector model.

FIG. 40 is a flow diagram illustrating an embodiment of a process for generating a synthetic training sample for training a change detector model. In some embodiments, process 4000 is executed by harmonization model 2912 of platform 2900 of FIG. 29. The process begins at 4002 when a patched image to be harmonized is received. For example, as described above, the patched image includes a version of a background image modified to include a patch. In some embodiments, the patched image is generated using process 4200 of FIG. 42.

At 4004, a harmonized image is generated. As described above, in some embodiments, the harmonized image is a version of the patched image (e.g., higher resolution) in which the patch is harmonized with the background image (e.g., to remove discontinuities). As described above, in some embodiments, the harmonizing is performed by providing the batched image as input to a harmonization model. In some embodiments, the harmonization model is trained on the original background image onto which patches are sampled. For example, the harmonization model is trained using process 4100 of FIG. 41. In some embodiments, the harmonization model is implemented using a pyramidal GAN. In some embodiments, and as described above, the patched image is inserted at an intermediate stage of the pyramidal GAN, along with noise. In some embodiments, the patched image is provided at a resolution corresponding to the intermediate stage or start scale.

At 4006, output is provided based on the harmonized image. For example, as described above, a change detector training sample is provided as output, where the change detector training sample includes, as one component, at least a portion of the harmonized image. For example, a quadrant of the harmonized image is obtained, as described above. As described above, the change detector training sample also includes a reference image corresponding to the harmonized image. For example, the reference image is an unmodified image of the same scene as the harmonized image, without any patches (e.g., corresponding portion of a background image, as described above). The reference image may also be a time-shifted version of the unmodified image, as described above. In some embodiments, the change detector training sample further includes a target mask that indicates the location and size of the introduced structural changes between the reference image and the synthetically generated harmonized image.

Figure 41:
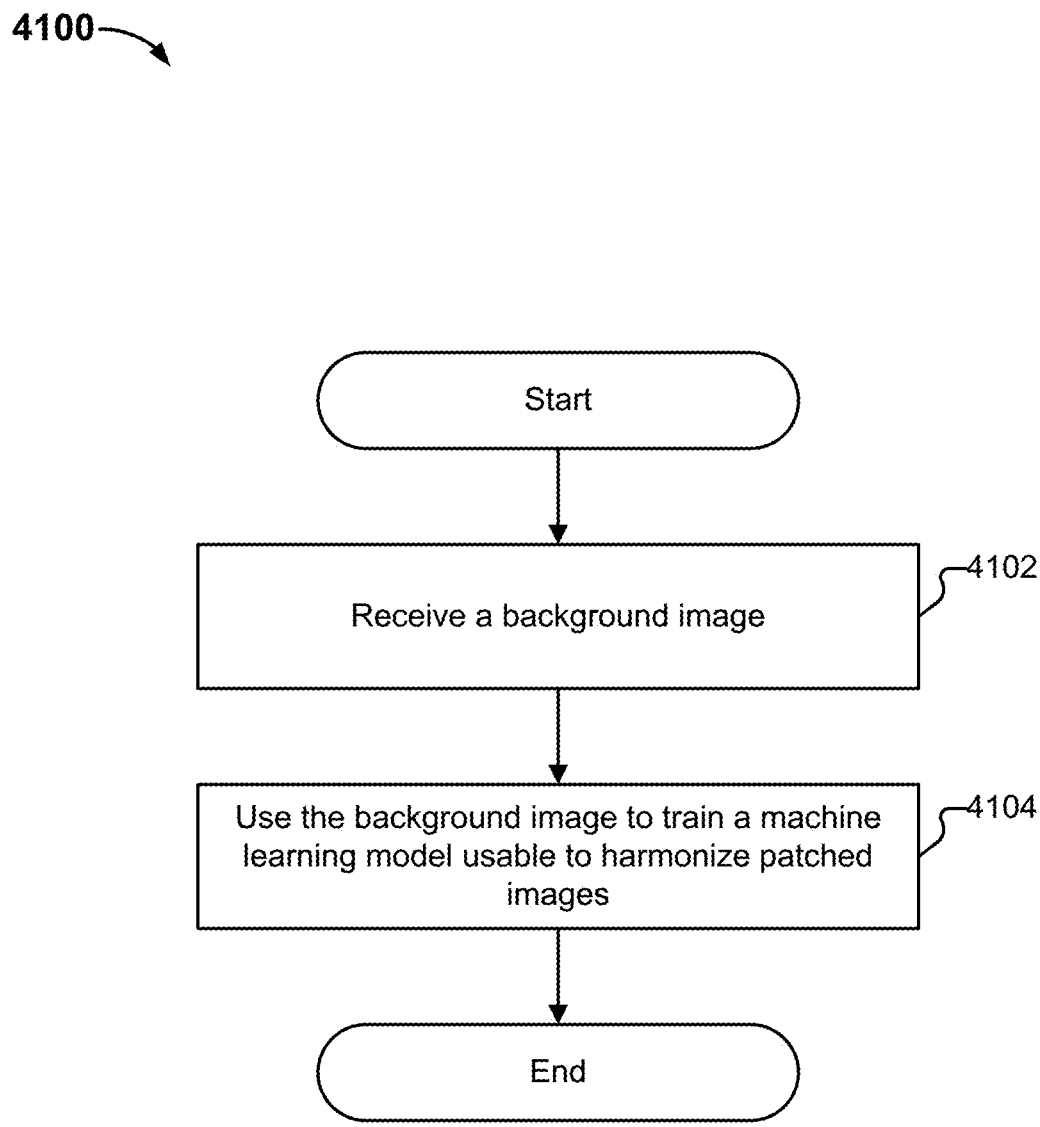
FIG. 41 is a flow diagram illustrating an embodiment of a process for training a harmonization model.

FIG. 41 is a flow diagram illustrating an embodiment of a process for training a harmonization model. In some embodiments, process 4100 is executed by harmonization model training engine 2910 of platform 2900 of FIG. 29. The process begins at 4102 when a background image is selected. Further details regarding selection of a background image are described above. At 4104, the background image is used to train a model that is usable to harmonize patched images. In some embodiments, the model is trained to reconstruct the background image. For example, a pyramidal generative adversarial network (GAN) is trained, as described above. The trained model may then be used to perform harmonization (e.g., using process 4000 of FIG. 40).

Figure 42:
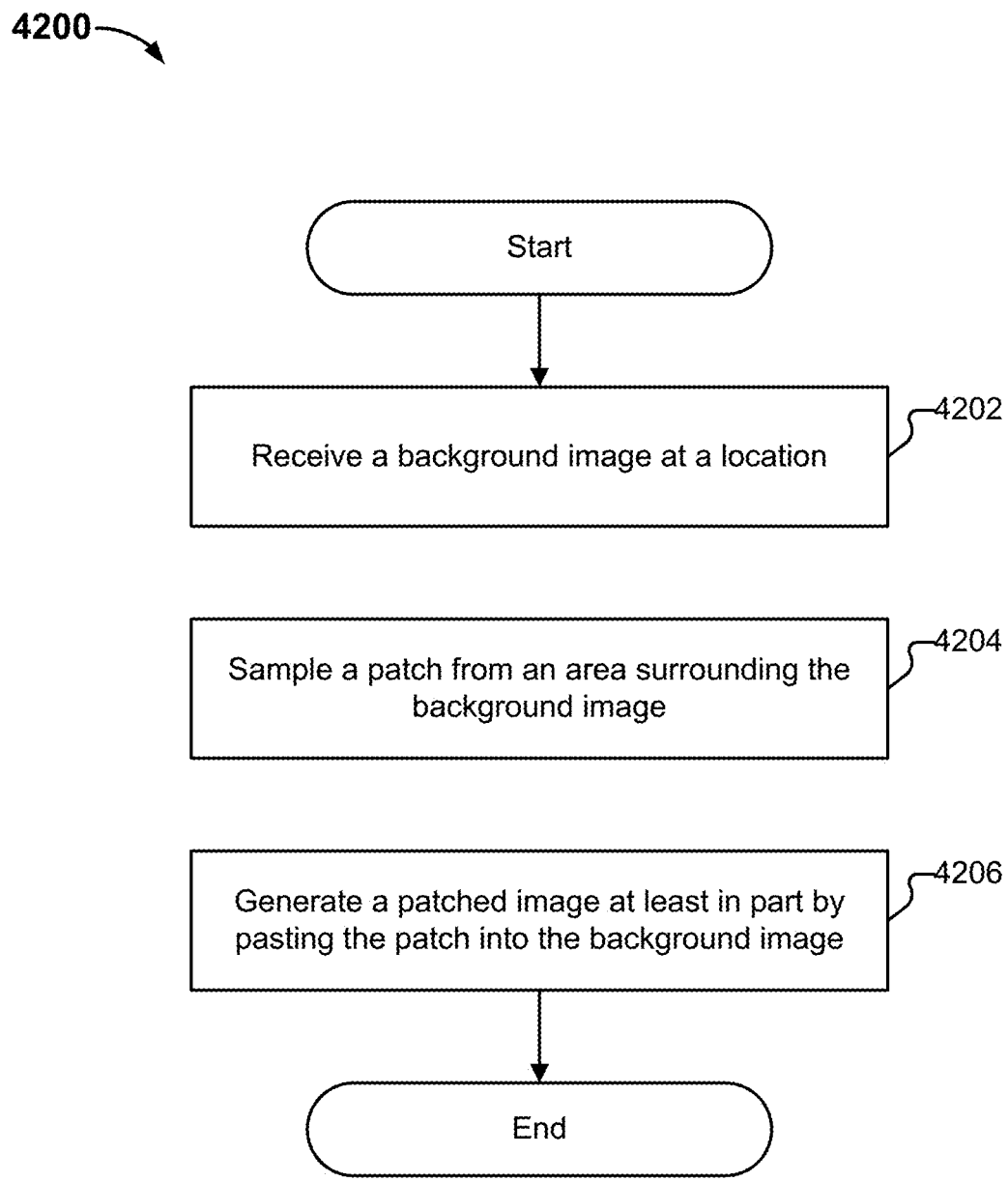
FIG. 42 is a flow diagram illustrating an embodiment of a process for generating a patched image.

FIG. 42 is a flow diagram illustrating an embodiment of a process for generating a patched image. In some embodiments, process 4200 is executed by path sampling engine 2908 of platform 2900 of FIG. 29. The process begins at 4202 when a background image is received. For example, a user indicates an AOI. An image tile of a random location in the AOI is obtained. The background image is a portion of the image tile (e.g., central portion, as described above). Further details regarding obtaining a background image are described above. At 4204, a patch from an area surrounding the background image is sampled. At 4206, the patch is pasted into the background image. For example, as described above, a background image is delineated within a full image. A patch or set of patches is obtained from the area between the background image and the full image. The set of patches is then pasted into the background image to generate a patched image. In some embodiments, the patched image is used at step 4002 of process 4000 as an input to a harmonization model to harmonize the pasting of the patch into the background image.

Figure 43:
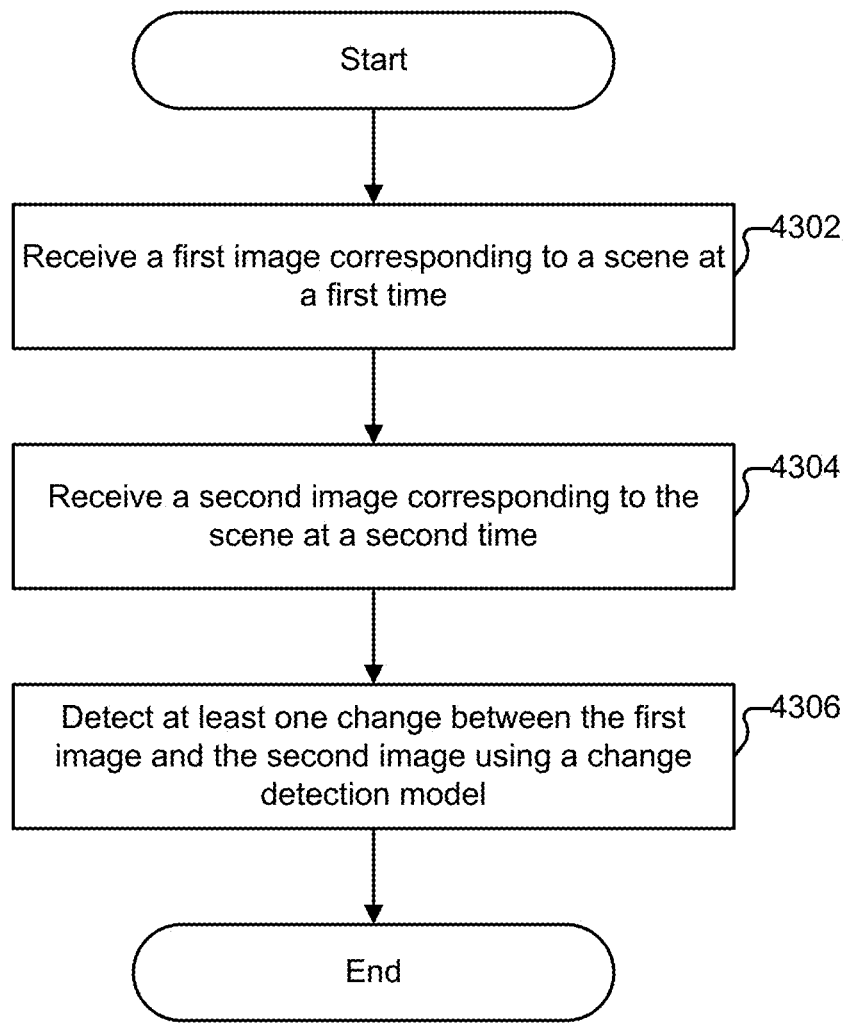
FIG. 43 is a flow diagram illustrating an embodiment of a process for generic structural change detection.

FIG. 43 is a flow diagram illustrating an embodiment of a process for generic structural change detection. In some embodiments, process 4300 is executed by change detection model 2916 of platform 2900 of FIG. 29. The process begins at 4302 when a first image corresponding to a scene at a first time is received. At 4304, a second image corresponding to the scene at a second time is received. At 4306, a change is detected between the first image and the second image using a change detection model. For example, as described above, the identified change is based on features of the images extracted by the change detection model. In some embodiments, the model is trained by using a training sample that includes the following components: a reference image, a harmonized image that is a version of the reference image with a patch applied, and a target mask indicating a location of the patch. For example, the change detector model is trained using process 4400 of FIG. 44, where the change detector model is trained using synthetic training samples generated using process 4000 of FIG. 40.

Figure 44:
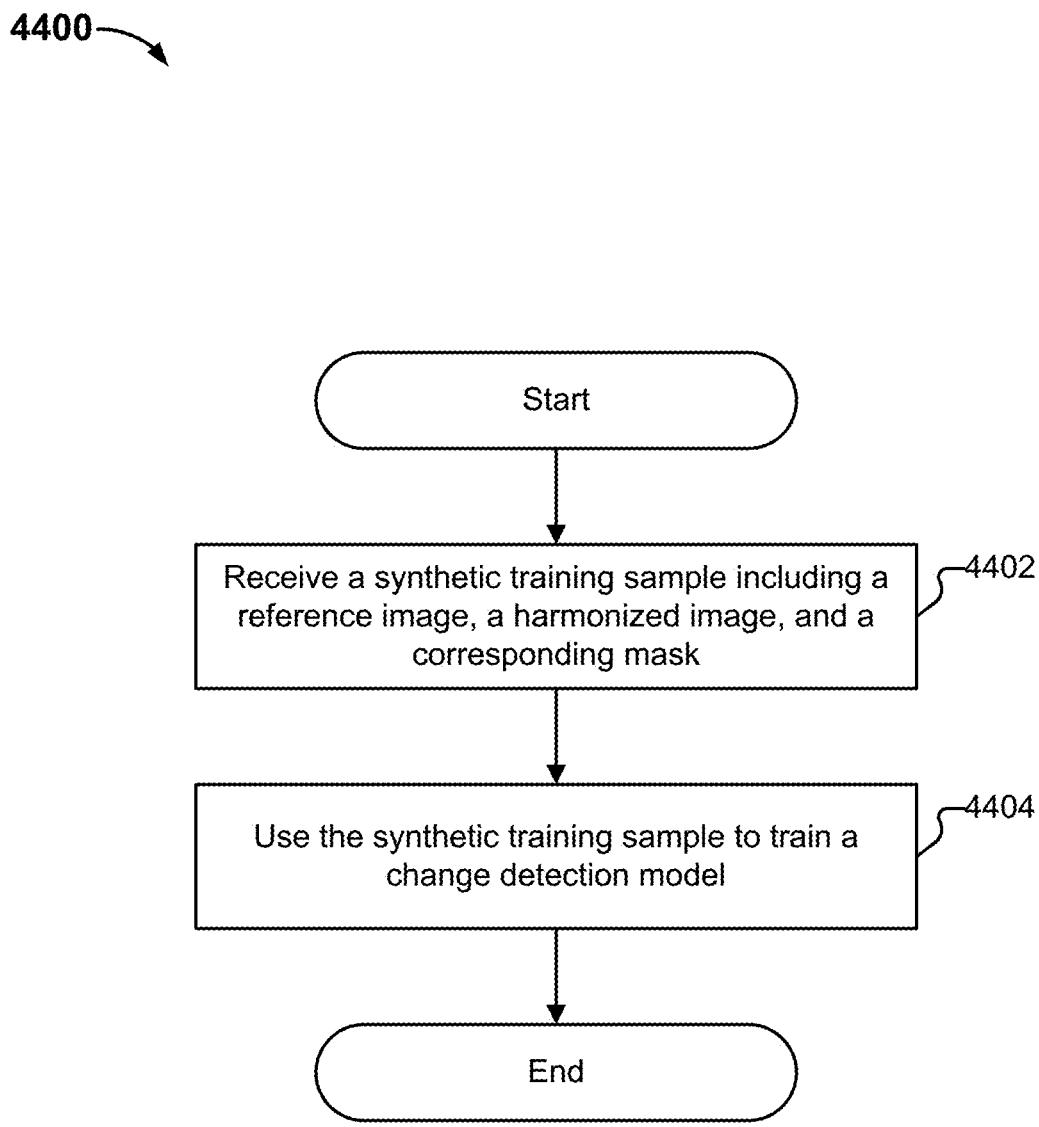
FIG. 44 is a flow diagram illustrating an embodiment of a process for training a change detector model.

FIG. 44 is a flow diagram illustrating an embodiment of a process for training a change detector model. In some embodiments, process 4400 is executed by change detection model training engine 2914 of platform 2900 of FIG. 29. The process begins at 4402 when a training sample is received. In some embodiments, the training sample includes: a reference image; a harmonized image that is a version of the reference image with a patch applied; and a target mask indicating a location of the patch in the reference image. For example, the training sample is a synthetic training sample generated using process 4000 of FIG. 40.

At 4404, at least a portion of the change detection model is trained using the training sample. For example, the reference image and the harmonized image are provided as inputs to the change detector model. A change map is received as output from the model. The change map is compared against the target mask. Based on the comparison between the change map and the target mask, a set of weights is updated for a portion of the change detector model (e.g., decoder of the W-Net architecture described above). Further details regarding training of a change detection model are described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive a patched image comprising a background image with a patch pasted into the background image, wherein the patch is sampled from an area surrounding the background image;
synthesize a harmonized patched image at least in part by harmonizing the patched image comprising the patch that is sampled from the area surrounding the background image and pasted into the background image, wherein the harmonizing comprises using a harmonization model trained on the background image; and
generate, based at least in part on the synthesizing using the harmonization model, a synthetic training sample comprising:
a reference image;
at least a portion of the harmonized patched image synthesized using the harmonization model; and
a corresponding target mask, wherein the target mask indicates a location in the harmonized patched image where the patch was inserted;
wherein, using the synthetic training sample that is generated based at least in part on the synthesizing using the harmonization model, a change detection model is trained at least in part by:
providing the reference image and the at least portion of the harmonized patched image as input to the change detection model;
comparing a change map outputted by the change detection model to the target mask included in the synthetic training sample; and
updating weights of the change detection model based on a difference determined between the change map outputted by the change detection model and the target mask included in the synthetic training sample that indicates the location where the patch was inserted in the harmonized patched image synthesized using the harmonization model; and
a memory coupled to the one or more processors and configured to provide the one or more processors with instructions.

2. The system recited in claim 1, wherein the patch is randomly sampled.

3. The system recited in claim 1, wherein the patch is sampled with a random size.

4. The system recited in claim 1, wherein the patch is pasted at a random location within the background image.

5. The system recited in claim 1, wherein training the harmonization model comprises training the harmonization model to reconstruct the background image.

6. The system recited in claim 1, wherein the reference image comprises a portion of the background image corresponding to the at least portion of the harmonized patched image.

7. The system recited in claim 1, wherein the background image comprises at least a portion of an image of a scene at a first time, and wherein the reference image comprises at least a portion of an image of the scene at a second time.

8. The system recited in claim 1, wherein the one or more processors are configured to receive the background image, and wherein receiving the background image comprises performing cloud detection.

9. The system recited in claim 1, wherein the harmonization model used to synthesize the harmonized patched image comprises a pyramidal generative adversarial network (GAN).

10. The system recited in claim 9, wherein the patched image is provided as input to an intermediate stage of the pyramidal GAN.

11. The system recited in claim 1, wherein the change detection model is configured to identify a change between a first image corresponding to a scene at a first time and a second image corresponding to the scene at a second time.

12. The system recited in claim 1, wherein the change detection model takes as input a batch of images.

13. The system recited in claim 1, wherein the change detection model takes as input multiband satellite imagery.

14. The system recited in claim 1, wherein the change detection model comprises two encoder networks and a decoder network.

15. The system recited in claim 14, wherein the two encoder networks are pre-trained, and wherein training the change detection model comprises:
fixing weights of the two encoder networks during training; and
training the decoder network.

16. A method, comprising:
receiving a patched image comprising a background image with a patch pasted into the background image, wherein the patch is sampled from an area surrounding the background image;
synthesizing a harmonized patched image at least in part by harmonizing the patched image comprising the patch that is sampled from the area surrounding the background image and pasted into the background image, wherein the harmonizing comprises using a harmonization model trained on the background image; and
generating, based at least in part on the synthesizing using the harmonization model, a synthetic training sample comprising:
a reference image;
at least a portion of the harmonized patched image synthesized using the harmonization model; and
a corresponding target mask, wherein the target mask indicates a location in the harmonized patched image where the patch was inserted;
wherein, using the synthetic training sample that is generated based at least in part on the synthesizing using the harmonization model, a change detection model is trained at least in part by:
providing the reference image and the at least portion of the harmonized patched image as input to the change detection model;
comparing a change map outputted by the change detection model to the target mask included in the synthetic training sample; and
updating weights of the change detection model based on a difference determined between the change map outputted by the change detection model and the target mask included in the synthetic training sample that indicates the location where the patch was inserted in the harmonized patched image synthesized using the harmonization model.

17. A computer program product embodied in a non-transitory computer readable storage medium and comprising computer instructions for:
receiving a patched image comprising a background image with a patch pasted into the background image, wherein the patch is sampled from an area surrounding the background image;
synthesizing a harmonized patched image at least in part by harmonizing the patched image comprising the patch that is sampled from the area surrounding the background image and pasted into the background image, wherein the harmonizing comprises using a harmonization model trained on the background image; and
generating, based at least in part on the synthesizing using the harmonization model, a synthetic training sample comprising:
a reference image;
at least a portion of the harmonized patched image synthesized using the harmonization model; and
a corresponding target mask, wherein the target mask indicates a location in the harmonized patched image where the patch was inserted;
wherein, using the synthetic training sample that is generated based at least in part on the synthesizing using the harmonization model, a change detection model is trained at least in part by:
providing the reference image and the at least portion of the harmonized patched image as input to the change detection model;
comparing a change map outputted by the change detection model to the target mask included in the synthetic training sample; and
updating weights of the change detection model based on a difference determined between the change map outputted by the change detection model and the target mask included in the synthetic training sample that indicates the location where the patch was inserted in the harmonized patched image synthesized using the harmonization model.

* * * * *